US007421418B2

(12) United States Patent
Nakano

(10) Patent No.: US 7,421,418 B2
(45) Date of Patent: Sep. 2, 2008

(54) METHOD AND APPARATUS FOR FUNDAMENTAL OPERATIONS ON TOKEN SEQUENCES: COMPUTING SIMILARITY, EXTRACTING TERM VALUES, AND SEARCHING EFFICIENTLY

(75) Inventor: Russell Toshio Nakano, Sunnyvale, CA (US)

(73) Assignee: Nahava Inc., Sunnyvale, CA (US)

( * ) Notice: Subject to any disclaimer, the term of this patent is extended or adjusted under 35 U.S.C. 154(b) by 648 days.

(21) Appl. No.: 10/781,580

(22) Filed: Feb. 18, 2004

(65) Prior Publication Data

US 2004/0162827 A1     Aug. 19, 2004

Related U.S. Application Data

(60) Provisional application No. 60/448,508, filed on Feb. 19, 2003.

(51) Int. Cl.
*G06F 9/44* (2006.01)
*G06N 7/02* (2006.01)
*G06N 7/06* (2006.01)

(52) U.S. Cl. ........................................ 706/52
(58) Field of Classification Search .................... 706/52
See application file for complete search history.

(56) References Cited

U.S. PATENT DOCUMENTS

| | | | | |
|---|---|---|---|---|
| 4,661,913 A * | 4/1987 | Wu et al. | | 702/19 |
| 4,769,756 A * | 9/1988 | Webber, Richard L. et al. | | 382/174 |
| 4,839,853 A | 6/1989 | Deerwester et al. | | |
| 5,283,737 A * | 2/1994 | Van Praag | | 704/9 |
| 5,301,109 A | 4/1994 | Landauer et al. | | |
| 5,648,919 A * | 7/1997 | Yamauchi et al. | | 703/6 |
| 5,721,939 A * | 2/1998 | Kaplan | | 704/9 |
| 5,802,361 A * | 9/1998 | Wang et al. | | 382/217 |
| 6,018,736 A * | 1/2000 | Gilai et al. | | 707/6 |
| 6,038,561 A * | 3/2000 | Snyder et al. | | 707/6 |
| 6,167,398 A | 12/2000 | Wyard et al. | | |
| 6,189,002 B1 * | 2/2001 | Roitblat | | 707/1 |
| 6,362,589 B1 * | 3/2002 | Inoue et al. | | 318/568.2 |
| 6,523,019 B1 | 2/2003 | Borthwick | | |
| 6,662,159 B2 * | 12/2003 | Komori et al. | | 704/255 |
| 6,671,683 B2 | 12/2003 | Kanno | | |
| 6,826,300 B2 * | 11/2004 | Liu et al. | | 382/159 |
| 7,016,882 B2 * | 3/2006 | Afeyan et al. | | 706/13 |
| 7,035,461 B2 * | 4/2006 | Luo et al. | | 382/167 |
| 7,062,438 B2 * | 6/2006 | Kobayashi et al. | | 704/260 |
| 7,117,190 B2 * | 10/2006 | Sabe et al. | | 706/45 |
| 7,177,851 B2 * | 2/2007 | Afeyan et al. | | 706/13 |
| 7,249,116 B2 * | 7/2007 | Fiske | | 706/46 |
| 7,274,822 B2 * | 9/2007 | Zhang et al. | | 382/224 |

OTHER PUBLICATIONS

Zobel, "Exploring the Similarity Space", 1998.☐☐*
Nemadic et al., Term Clustering Using a Corpus-Based Similarity Measure, 2002.☐☐☐☐*
On the kernel Music algorithm Shimotahira, H.; Acoustics, Speech, and Signal Processing, 1995. ICASSP-95., 1995 International Conference on vol. 2, May 9-12, 1995 pp. 909-912 vol. 2 Digital Object Identifier 10.1109/ICASSP.1995.480322.*

(Continued)

*Primary Examiner*—Michael B Holmes
(74) *Attorney, Agent, or Firm*—Heimlich Law; Alan Heimlich, Esq.

(57) ABSTRACT

A method and apparatus for fundamental operations on token sequences: computing similarity, extracting term values, and searching efficiently have been disclosed.

53 Claims, 80 Drawing Sheets

OTHER PUBLICATIONS

Probabilistic matching for face recognition Maghaddam, B.; Pentland, A.; Image Analysis and Interpretation, 1998 IEEE Southwest Symposium on Apr. 5-7, 1998 pp. 186-191 Digital Object Identifier 10.1109/IAI.1998/666883.*

Robert Beard, "Lexical morpheme hypothesis," in <http://www.facstaff.bucknell.edu/rbeard/wrdsyn.html>, Bucknell University, Lewisburg PA, date unknown.

Philip Clarkson and Ronald Rosenfeld, "Statistical Language Modeling Using the CMU-Cambridge Toolkit", EuroSpeech97, Cambridge UK.

Philip R. Cohen and Hector J. Levesque, "Performatives in a Rationally Based Speech Act Theory", In Meeting of the Association for Computational Linguistics, 1990, pp. 79-8, <citeseer.nj.nec.com/cohen90performatives.html>.

Claire Cardie, "Course: Natural Language Processing," Spring 2004, Cornell University, Ithaca, New York.

Claire Cardie, "Course: Natural Language Processing: Lecture Notes and Reading," Spring 2004, Cornell University, Ithaca, New York.

Christopher D. Manning and Hinrich Schuetze, Foundations of statistical natural language processing, The MIT Press, Cambridge, MA, 2001. p. 83. Also see <http://www.cs.cornell.edu/courses/cs674/2004sp/materials/lexical-semantics1-4up.pdf>.

Scott Deerwester et.al, "Indexing by latent semantic analysis," J. Society for Information Science, 41(6), pp. 391-407, also available at http://lsi.research.telcordia.com/lsi/papers/JASIS90.pdf, date unknown.

Ronald Fagin and Ravi Kumar and D. Sivakumar, "Efficient similarity search and classification via rank aggregation", IBM Almaden Research Center, San Jose, 2003, <http://citeseer.nj.nec.com/fagin03efficient.html>.

Piotr Indyk and Rajeev Motwani, "Approximate nearest neighbors: towards removing the curse of dimensionality", 1998, pp. 604-613, <http://citeseer.nj.nec.com/article/indyk98approximate.html>, Stanford University, Stanford, CA.

Arthur Gingrande, "Processing unstructure forms on the fly," KM World, Feb. 2003, 12 (2), <http://www.kmworld.com/publications/magazine/index.cfm?action=readarticle&Article_ID=1433&Publication_ID=84>.

Susan Blackford, "LAPACK-Generalized Nonsymmetric Eigenproblems (GNEP)" .pdf at <http://www.netlib.org/lapack/lug/node35.html> Oct. 1, 1999.

E. Anderson et.al, LAPACK Users' Guide, 3rd edition, Society for Industrial and Applied Mathematics, Philadelphia, 1999, p. 18, 19, 21, "LAPACK-Nonsymmetric Eigenproblems (NEP)", pdf at <http://www.netlib.org/lapack/lug/node31.html> Oct. 1, 1999.

Susan Blackford, "LAPACK-Singular Value Decomposition (SVD)".pdf at <http://www.netlib.org/lapack/lug/node32.html> Oct. 1, 1999.

iParadigms, Inc., This online service looks for plagiarims in student term papers. <http://www.plagiarism.org/solution.html> 1998.

Saul Schleimer, et.al. "Winnowing: local algorithms for document fingerprinting," SIGMOD Jun. 9-12, 2003, <http://theory.stanford.edu/~aiken/publications/papers/sigmod03.pdf>. See also <http://www.cs.berkeley.edu/~aiken/moss.html>.

Peter Smithth, "Stylometric Analysis Using Discriminant Analysis: A Study of Sherlock Holmes Stories." New Directions in Humanities Computing. Joint International Conference of the Association for Literary and Linguistic Computing and the Association for Computers and the Humanities, ALLC/ACH 2002, University of Tübingen, Jul. 24-28, 2002 <http://www.uni-tuebingen.de/cgi-bin/abs/abs?propid=27>.

Alex Aiken, "A System for Detecting Software Plagiarism" at <http://www.cs.berkeley.edu/~aiken/moss.html> 1994.

David Yarowsky and Richard Wicentowskli. "Minimally supervised morphological analysis by multimodal alignment". In Proceedings of the 38th Meeting of the Association for Computational Linguistics (ISBN: 1-55860-731-5), pp. 207-216, 2000 <http://www.cs.swarthmore.edu/~richardw/pubs/acl2000.ps> Baltimore MD.

Bill Yerazunis, "CRM114—the Controllable Regez Mutilator," <http://crm114.sourceforge.net/> 2002.

Thomas K. Landauer and Darrell Laham, "Learning Human-like Knowledge by Singular Value Decomposition: A Progress Report" at <http://lsa.colorado.edu/papers/nips.pdf> Oct. 20, 2003.

Michael W. Berry, et al., "Computational Methods for Intelligent Information Access", 1995 by the Association for Computing Machinery, Inc. (ACM) at <http://www.supercomp.org/sc95/proceedings/473_MBER/SC95.PDF>.

Zun Zhang et al., "Face Recognition: Eigenface, Elastic Matching, and Neural Nets" Proceedings of the IEEE, vol. 65, No. 9, Sep. 1997 at <http://lcv.stat.fsu.edu/research/geometrical_representations_of_faces/PAPERS/survey_zhang.pdf>.

Lillian Lee, "CS775: Statistical Natural Language Processing: Models and Methods" at <http://www.cs.cornell.edu/courses/cs775/2001sp/default.html> Cornell University, Ithaca, New York Spring 2001.

Thomas Mandl "Implementation of Large Backpropagation Networks for Text Retrieval", MIT GmbH (ed.) (1999): Proceedings of the 3rd International DataAnalysis Symposium, pp. 19-22 at <http://www.uni-hildesheim.de/~mandl/Publikationen/MANDL_intl_user_meeting99.PDF>.

Erica Klarreich, "Bookish math: statistical tests are unraveling knotty literary mysteries," Science News, Dec. 20 and 27, 2003, 164, also at <http://www.sciencenews.org/20031220/bob8.asp>.

Christopher D. Manning and Hinrich Schuetze, Foundations of statistical natural language processing, The MIT Press, Cambridge, MA, 2001, pp. 554-566 also at <http://www.stanford.edu/class/cs276a/handouts/fsnlp-svd.pdf>.

Telcordia Technologies, Inc., "References to Papers on Latent Semantic Indexing Software (LSI)", 1997 at <http://lsi.research.telcordia.com/lsi/LSIpapers.html>.

Aapo Hyvarinen, et al. "Independent Component Analysis", 2001, pp. 124-143, John Wiley & Sons, Inc., New York, US, ISBN 0-47-40540-X.

Christopher D. Manning and Hinrich Schuetze, Foundations of Statistical Natural Language Processing, The MIT Press, Cambridge, MA, 2001, pp. 81-83 and pp. 123-135.

Jose Binongo, "Who Wrote the 15th Book of Oz? An Application of Multivariate Analysis to Authorship Attribution", Chance, Spring 2003, pp. 9-17, vol. 16, No. 2, Springer-American Statistical Association.

Li Y H et al : "Classification of text documents", Computer Journal. Oxford University Press, Surrey, GB, vol. 41, No. 8, 1998, pp. 537-546, XP002116464 ISSN : 0010-4620 paragraph '05.3!

Furnas G W ed Chiaramella Y Association for Computing Machinery : "Information Retrieval Using a Singular Valuedecomposition Model of Latent Semantic Structure" Proceedings of the International Conference on Research and Development in Information Retrieval. (SIGIR). Genoble, Jun. 13-15, 1998, New York, ACM, US, vol. Conf. 11, Jun. 13, 1995, pp. 465-480, XP000295052 paragraph '02.3!—paragraph '02.4!.

Nicholas C et al : "Spotting topics with the singular value decomposition" Principles of Digital Document Processing. 4th International Workshop, PODDP'98 Proceedings Springer-Verlag Berlin, Germany, Mar. 29, 1998, pp. 82-91, XP008945764 ISBN : 3-540-05086-5 the whole document.

Bellegarda J R : "Exploiting Latent Semantic Information in Statistical Language Modeling" Proceedings of the IEEE, IEEE. New York, US, vol. 88, No. 8, Aug. 2000, pp. 1279-1296, XP002219343 ISSN : 0018-9219 the whole document.

Bellegarda J R ed—European Speech Communication Association (IESCA): "A Latent Semantic Analysis Framework for Large-Span Language Modeling" 5th European Conference on Speech Communication and Technology, Eurospeech '97, Rhodes, Greeze, Sep. 22-25, 1997, European Conference on Speech Communication and Technology. (Eurospeech), Grenoble : ESCA, FR, vol. vol. 3 of 5, Sep. 22, 1997 ; pp. 1451-1454, XP001045096 the whole document.

* cited by examiner

- Target clause:
  - This Materials and/or Equipment Contract is effective on the <u>22nd day of January 2003</u> ("Effective Date") between Conoco Inc., formerly Continental Oil Company, a corporation organized and existing under the laws of the state of Delaware (hereinafter "Company") and <u>Advanced Tire Products Inc.</u>, a corporation organized and existing under the laws of the state of Nevada (hereinafter "Supplier").

*Effective date* → (22nd day of January 2003)

*Supplier* → (Advanced Tire Products Inc.)

FIG. 5

Overview

- Importing contracts into a contract management system encourages adoption.

Problems with current approaches

- Compare tools are fragile
  - Small changes can cause comparisons to fail
  - Disparate documents don't compare at all
- Manual processing is expensive n a h a v a , i n c.    Contractdemo-prov.ppt

Scenario Overview

- Import a contract...
  - A never-seen-before contract.
  - A modification of a generated contract.
  - A combination of the above.
- Step 1: Recognize the kind of contract.
- Step 2: Match the clauses against clause library.
- Step 3: Recognize, tag & import new clauses into your system n a h a v a , i n c.   Contractdemo-prov.ppt

FIG. 24

Different internal structures

- Outline of target
  1. Purpose
  2. Confidential information and materials (2 parts)
  3. Obligations (3 parts)
  4. Miscellaneous (7 parts)

- Outline of closest match
  1. Purpose
  2. Definition of "confidential information"
  3. Non-use and non-disclosure
  4. Maintenance of confidentiality
  5. No obligation
  6. No warranty
  7. Return of materials
  8. No license
  9. Term
  10. Availability of equitable relief
  11. Severability
  12. Counterparts and facsimiles
  13. Miscellaneous n a h a v a , i n c.    Contractdemo-prov.ppt

FIG. 28

Another close match...

Company's trade secrets consist of information and materials that are valuable and not generally known by Company's competitors, including:

(a) Any and all information concerning Company's current, future or proposed products, including, but not limited to, computer code, drawings, specifications, notebook entries, technical notes and graphs, computer printouts, technical memoranda and correspondence, product development agreements and related agreements.

(b) Information and materials relating to Company's purchasing, accounting and marketing, including, but not limited to, marketing plans, sales data, unpublished promotional material, cost and pricing information and customer lists.

(c) Information of the type described above which Company obtained from another party and which Company treats as confidential, whether or not owned or developed by Company.

(d) Other: _____

Another match from Nolo's "Interview Nondisclosure Agreement."

Contractdemo-prov.ppt nahava, inc.

FIG. 31

The best match is...

In consideration of Company's disclosure of Software to Customer, Customer will treat Software with the same degree of care and safeguards that it takes with its own trade secrets, but in no event less than a reasonable degree of care. Customer will not, without Company's prior written consent:

(a) reverse engineer, decompile or disassemble Software or any portion of it;
(b) copy any portion of Software;
(c) download Software in a retrieval system or computer system of any kind except as authorized by this Agreement; or
(d) disclose any portion of Software to any third party.

Customer will limit use of Software to those employees, agents and consultants of Customer who are performing the evaluation for Customer. Customer must advise such people that Software is Company's trade secret and they must be under an express written obligation to maintain its confidentiality.

The restrictions and obligations contained in this clause will remain in effect until Software no longer constitutes a trade secret or until Company sends Customer written notice releasing it from this Agreement, whichever occurs first.

From Nolo's "Nondisclosure Agreement for Licensee, Nondisclosure part." [emphasis added]

Contractdemo-prov.ppt nahava, inc.

FIG. 33

The original target is...

(a) All Confidential Information shall be used by the recipient solely for the Purpose set forth above. Nothing in this NDA, nor any disclosure of Confidential Information, shall grant any express or implied right to or waiver by either party of their respective proprietary interests, including without limitation, patents, copyrights, trademarks or trade secrets.
(b) For a period of three (3) years following the date of its disclosure, neither party shall disclose the other party's Confidential Information and each party shall take reasonable security precautions, at least as great as the precautions it takes to protect its own confidential information, to prevent the disclosure of any Confidential Information to any third party, person or firm. Dissemination of Confidential Information shall be limited to only those employees or consultants of the receiving party as are necessary to perform the Limited Purpose of this NDA, provided, however, that such employees or consultants have executed appropriate written agreements sufficient to enable the parties to comply with all the provisions of this NDA.
(c) Each party agrees to return all materials, including software programs, which may have been furnished as part of this NDA, together with any copies thereof, promptly upon the written request of the other party.

From standard library "Mutual Nondisclosure Agreement, Obligations part." [emphasis added]

n a h a v a , i n c.  Contractdemo-prov.ppt

FIG. 34

Summary

- We've shown how to "import" contracts.
  - Create profiles from contract and clause library.
  - Recognize at the contract level.
  - Recognize at the clause level.

n a h a v a , i n c.   Contractdemo-prov.ppt

FIG. 35 nahava

Annotated Training Document

MATERIALS AND/OR EQUIPMENT CONTRACT
This Materials and/or Equipment Contract is effective on the [value: effective-date] ("Effective Date") between [value: buyer-name], a corporation organized and existing under the laws of the state of [value: buyer-state] (hereinafter "Company") and [value: seller-name] a corporation organized and existing under the laws of the state of [value: seller-state] (hereinafter "Supplier").
WITNESSETH:
WHEREAS, from time to time, Company may require the materials and/or equipment provided by Supplier in connection with Company's business; and
WHEREAS, Company wishes to enter into a Materials and/or Equipment Contract with Supplier setting forth the general terms and conditions to apply should Company request Supplier to provide materials and/or equipment; and
WHEREAS, Supplier is in the business of providing such materials and/or equipment and desires to enter into such a Materials and/or Equipment Contract;
NOW, THEREFORE, in consideration of the mutual promises set forth herein, Company and Supplier hereby agree as follows:

Usage scenario-prov.ppt

FIG. 37

Annotated Training Document (cont'd)

nahava

TERM

[section: TERM OF CONTRACT]. The term of this Contract shall be from [value: term] and shall continue thereafter in full force and effect until terminated as provided in this Contract.

4.2 TERMINATION OF CONTRACT.

4.2.1 TERMINATION BY EITHER PARTY. This Contract may be terminated by either party upon ninety (90) days written notice to the other party at its address set out in Section 3.2, ADDRESSES. Such termination shall not be effective as to any Materials and/or Equipment being provided pursuant to a Purchase Order and shall not relieve either party to the Purchase Order of its obligations and liabilities arising from or incidental to the materials and/or equipment that Supplier committed to provide prior to such termination.

4.2.2 TERMINATION FOR CAUSE. Notwithstanding Section 4.2.1, TERMINATION BY EITHER PARTY, if Supplier (a) goes into liquidation (other than voluntarily for the purpose of re-organization or reconstruction), (b) makes an arrangement, composition or compromise with its creditors, (c) has a receiver appointed in respect of the whole or any part of its assets, or the equivalent of (a), (b) or (c) above occurs, Company may at any time thereafter immediately terminate this Contract without any liability to compensate Supplier for such termination. Such termination shall be without prejudice to Company's rights under this Contract or its rights under the law to claim damages against Supplier.

Usage scenario-prov.ppt

FIG. 38 nahava

Progress Report: The BTV Extraction Technology

January 24th, 2003

FIG. 40

Where We Are
- Developed initial BTV recognition technology
- Still in the process of developing appropriate extraction parameters and testing
- Integration with core clause recognition technology Progress report 01-24-03b-prov.ppt

FIG. 41

Developing a Training Set: The Intro Paragraph

- This Purchase Agreement is effective as of [effective-date] is made by and between [buyer]. (Buyer), a [buyer-state] corporation, having principal offices at [buyer-address] and [supplier] (Supplier), a [supplier-state] corporation, having principal offices at [supplier-address]. [source: Supplier Agreement]

Progress report 01-24-03b-prov.ppt

FIG. 43

The "Intro Paragraph" Training Set

- This Purchase Agreement shall be effective [effective-date] is made ("Agreement Date"), by and between [buyer], ("Buyer"), a [buyer-state] corporation, having principal offices at [buyer-address] and [supplier] and [supplier], having principal offices at [supplier-address]... [Source: AGREEMENT Purchasing Short]]

- This Volume Purchase Agreement ("VPA") is made this [effective-date] by and between [buyer], ("Buyer"), a [buyer-state] corporation, having principal offices at [buyer-address] ("Buyer") and [supplier] ("Supplier"), having principal offices at [supplier-address]... [Source: volume purchase agreement]]

- This Purchase Agreement is effective as of [effective-date] is made by and between [buyer], ("Buyer"), a [buyer-state] corporation, having principal offices at [buyer-address] and [supplier] (Supplier), a [supplier-state] corporation, having principal offices at [supplier-address]. [Source: Supplier Agreement]

- This Agreement is entered into this [effective-date] by and between [buyer], ("Buyer") a [buyer-state] corporation with its principal place of business located at [buyer-address] ("Buyer") and [supplier] a [supplier-state] corporation with its principal place of business located at [supplier-address] (the "Supplier"). [Source: Acme Agreement]

- This contract is by and between [seller], a [seller-state] corporation, the "Seller," and, the "Buyer," Seller and Buyer are collectively referred to in this contract as the "Parties." [Source: Contract for Sale of Goods]]

- THIS EQUIPMENT LEASE ("Lease") is made and effective [effective-date], by and between [buyer], ("Lessor") and [seller] ("Lessee"). [Source: EQUIPMENT LEASE]

- This Sales Agreement is executed on [effective-date (Month, Day, Year)] by and between [seller (Name of Seller)], a [seller-state], a Corporation, with its principal place of business / residing at [seller-address (Address)] ("Seller") and [buyer (Name of Buyer)], a [buyer-state (State of organization or residence)] Corporation with its principal place of business at [buyer-address (Address)]. [Source: Sales Of Goods Contract]

- THIS EQUIPMENT LEASE ("Lease") is made and effective [effective-date], by and between [buyer], ("Lessor") and [seller] ("Lessee"). Lessor desires to lease to Lessee, and Lessee desires to lease from Lessor, certain tangible personal property. [Source: SAMPLE EQUIPMENT LEASE CONTRACT]]

- This Materials and/or Equipment Contract is effective on the [effective-date] ("Effective Date") [buyer], a corporation organized and existing under the laws of the state of [buyer-state] (hereinafter "Company") and [seller], a corporation organized and existing under the laws of [seller-state] (hereinafter "Supplier"). [Source: Master Materials and/or Equipment]

- This Services Contract is effective on the [effective-date] ("Effective Date") between [buyer], a corporation organized and existing under the laws of the state of [buyer-state] (hereinafter "Company") and [seller], a corporation organized and existing under the laws of the state of [seller-state] (hereinafter "Contractor"). [Source: Services Contract]

Progress report 01-24-03b-prov.ppt

FIG. 44

Target Clause

- This Materials and/or Equipment Contract is effective on the 22nd day of January 2003 ("Effective Date") between Largeco Inc., formerly Offshore Oil Company, a corporation organized and existing under the laws of the state of Delaware (hereinafter "Company") and Advanced Tire Products Inc., a corporation organized and existing under the laws of the state of Nevada (hereinafter "Supplier").

Progress report 01-24-03b-prov.ppt

FIG. 45

Effective Date

- This Materials and/or Equipment Contract is effective on the 22nd day of January 2003 ("Effective Date") between Largeco Inc., formerly Offshore Oil Company, a corporation organized and existing under the laws of the state of Delaware (hereinafter "Company") and Advanced Tire Products Inc., a corporation organized and existing under the laws of the state of Nevada (hereinafter "Supplier").

22nd day of January 2003

TstTermValue result:
effective-date day of january [11, 3, 0.500535821819741]
effective-date day of january 2003 [11, 4, 0.428603225128187]
effective-date 22nd day of january [10, 4, 0.419129564522541 35]
effective-date the 22nd day of january [9, 5, 0.416232510841466]
effective-date the 22nd day of january 2003 [9, 6, 0.350289234891063]

Progress report 01-24-03b-prov.ppt

FIG. 46

Supplier

- This Materials and/or Equipment Contract is effective on the 22nd day of January 2003 ("Effective Date") between Largeco Inc., formerly Offshore Oil Company, a corporation organized and existing under the laws of the state of Delaware (hereinafter "Company") and Advanced Tire Products Inc., a corporation organized and existing under the laws of the state of Nevada (hereinafter "Supplier").

Advanced Tire Products Inc.

TstTermValue result:

supplier delaware hereinafter "company" and advanced tire products inc a corporation organized and  [36, 12, 1.2299644799245686]
supplier delaware hereinafter "company" and advanced tire products inc a [36, 9, 1.2149368778460085]
supplier the state of delaware hereinafter "company" and advanced tire products inc a  [33, 12, 1.1068158853188022]
supplier delaware hereinafter "company" and advanced tire products inc a corporation organized and existing under  [36, 14, 1.0515502017070896]

Progress report 01-24-03b-prov.ppt

FIG. 47

Another Example – Agreement Term nahava

- Billing company will invoice Buyer only after Buyer receives Products. Payment terms are as follows: [payment-term]. Buyer will pay Supplier by Check. The total amount due for this contract is : [total-contract-amount-dollar]. The term is for [agreement-term]. [source: AGREEMENT Purchasing Sheet]

- Unless terminated earlier as provided herein, this VPA shall have a term of [agreement-term]. The term of this VPA will be renewed for additional successive one (1) year periods, unless written notice of non-renewal is received by the other party no later than sixty (60) days prior to the Expiration Date of the then-current term. [source: volume purchase agreement]

- This Agreement shall remain in effect for a period [agreement-term], or may be terminated by either party at any time upon ninety (90) days written notice to the other party. The Recipient's obligations under this Agreement shall survive termination of the Agreement between the parties and shall be binding upon the Recipient's heirs, successors and assigns. The Recipient's obligations hereunder shall continue in full force and effect with respect to non-technical sales, marketing, and financial Confidential Information for one (1) year from the date of disclosure of such Confidential Information. The Recipient's obligations with respect to all technical Confidential Information shall be terminated only pursuant to Section 5. [source: Supplies Agreement]

- This Agreement shall continue [agreement-term] (the "Term"). Program licenses granted under this Agreement shall continue in effect for the duration of the term as specified on the applicable Schedule ("License Term"), subject only to the provisions of TERMINATION and DEFAULT herein. [source: Acme Agreement]

- The term of this Lease shall be [agreement-term]. [source: EQUIPMENT LEASE]

- The term of this Lease shall commence on [agreement-term-start-date] and shall expire [agreement-length-months] months thereafter. [source: SAMPLE EQUIPMENT LEASE CONTRACT]

- This Agreement shall [agreement-term] ("Execution Date"), or may be terminated by either party at any time upon ninety (90) days written notice to the other party. The Recipient's obligations under this Agreement shall survive termination of the Agreement between the parties and shall be binding upon the Recipient's heirs, successors and assigns. The Recipient's obligations hereunder shall continue in full force and effect with respect to non-technical sales, marketing, and financial Confidential Information for one (1) year from the date of disclosure of such Confidential Information. [source: Sales Agreement]

Progress report 01-24-03b-prov.ppt

FIG. 48

Agreement Term

- 4.1 TERM OF CONTRACT. The term of this Contract shall be from 2 Feb 2003 through 20 Jun 2008, and shall continue thereafter in full force and effect until terminated as provided in this Contract.

from 2 Feb 2003 through 20 Jun 2008

TsfTermValue result:
- agreement-term from 21feb 2003 through 20 jun 2008 and shall continue thereafter in [12, 13, 0.1424498790566431 6]
- agreement-term feb 2003 through 20 jun 2008 and shall continue thereafter in [14, 11, 0.1424498790566431 6]
- agreement-term through 20 jun 2008 and shall continue thereafter in [16, 9, 0.1424498790566431 6]
- agreement-term jun 2008 and shall continue thereafter in [18, 7, 0.1424498790566431 6]
- agreement-term 2008 and shall continue thereafter in [19, 6, 0.1424498790566431 6]
- agreement-term and shall continue thereafter in [20, 5, 0.1424498790566431 6]

Progress report 01-24-03b-prov.ppt

FIG. 49

Next Steps

- Improve precision of term value identification
  - Use taxonomies (e.g. list of cities, list of states, etc)
  - Use "multiple-resolution" profiles
  - Self-defined training set

- Use common recognition engine...
  - Term-value extraction
  - Clause similarity Progress report 01-24-03b-prov.ppt

FIG. 50

Contract Cross-Match

| Services Contract | | Materials and/or Equipment | | Similarity score |
|---|---|---|---|---|
| Clause | Contents | Clause | Contents | |
| 22 | Warranty. Contractor warrants and represents that it shall ... perform the work in a good and workmanlike manner... | 21 | In witness thereof the parties have caused this contract... | 11.6 |
| 37 | In witness thereof the parties have caused this contract to be executed by their duly authorized representativa... | 21 | In witness thereof the parties have caused this contract to be executed by their duly authorized representatives... | 11.5 |
| 22 | Warranty. Contractor warrants and represents that it shall ... perform the work in a good and workmanlike manner... | 14 | Freight terms and shipping instructions. | 10.8 |
| 32 | Minority and women business utilization. Contractor shall... | 23 | Nondiscrimination and toxic controls act. | 5.8 |
| 32 | Minority and women business utilization. Contractor shall... | 17 | Proprietary rights. Supplier shall indemnify defend and hold company harmless... | 5.5 |
| 42 | Materials and equipment contract number... | 27 | Exhibit B. Supplier's proposal exhibit... | 4.0 |
| 26 | Governing law. Except as otherwise expressly provided... | 18 | Governing law. This contract shall... | 3.1 |
| 31 | Force majeur. Except for the obligation... | 18 | Governing law. This contract shall... | 2.1 |

Contract2-prov.ppt

FIG. 52

Services Contract

7.0 WARRANTY

Contractor warrants and represents that it shall (1) perform the Work in a good and workmanlike manner consistent with applicable industry standards and practices; (2) use sound engineering and/or technical principles where applicable; (3) perform the Work in compliance with specifications provided or approved by Company; (4) use or furnish materials and equipment that are merchantable, fit, and new, and (5) where mutually agreed, use or furnish merchantable, fit, and used material and equipment. To the extent assignable, all rights and remedies available to Contractor or its subcontractors shall be passed directly to Company. Company shall also have the rights and remedies provided by the Uniform Commercial Code. At no cost to Company, Contractor shall remedy nonconforming workmanship or replace nonconforming material and equipment, including removal and replacement of facilities to (1) reveal and (2) repair or replace nonconforming Work. If Contractor does not remedy nonconforming Work immediately, Company may do so at Contractor's expense. If Contractor fails to pay this expense, Company may deduct all expenses from any proceeds due to Contractor. At no cost to Company, Contractor shall diligently and promptly remedy nonconforming workmanship, material and equipment appearing (a) within one (1) year from the date of final acceptance or (b) within such longer period of time as provided by manufacturer's warranty.

[Services Contract, block #22]

Contract2-prov.ppt

Materials and/or Equipment

[Materials and/or Equipment, block #21]

FIG. 57

Services Contract

- 4.0
- TERM
- 4.1 TERM OF CONTRACT. The term of this Contract shall commence on the Effective Date set forth above and shall continue until terminated as provided in this Contract.

- 4.2 TERMINATION OF CONTRACT
- 4.2.1 TERMINATION BY EITHER PARTY. This Contract may be terminated by either party upon ninety (90) days written notice to the address set out above. Such termination shall not be effective as to any of the Work in progress pursuant to a Request for Services and shall not relieve either party to the Request for Services of its obligations and liabilities arising from or incidental to the Work performed prior to such termination

[Services Contract, block #7]

Contract2-prov.ppt

FIG. 58

Materials and/or Equipment

- 4.3 TERM OF AN ORDER. The term of an Order shall commence on the date set forth in the Order and shall continue until terminated as provided in the Order.

- 4.4 TERMINATION OF AN ORDER.

- 4.4.1 Company may at any time, without cause, terminate an Order in whole or in part upon written notice to Supplier. In such event, Supplier shall be entitled to a reasonable termination charge consisting of a percentage of the order price reflecting the percentage of the Materials and/or Equipment provided to Company's satisfaction prior to termination. Such termination charge shall be Supplier's sole remedy. Upon Company's written request, Supplier shall preserve, protect and deliver to Company at Company's expense Materials and/or Equipment on hand, work in progress, and completed work, both in its own and in its suppliers' plants.

[Materials and/or Equipment, block #9]

Contract2-prov.ppt

FIG. 59

Services Contract

- 4.3 TERM OF REQUEST FOR SERVICES. The term of a Request for Services shall commence on the date set forth in the Request for Services and shall continue until terminated as provided in the Request for Services.

- 4.4 TERMINATION OF REQUEST FOR SERVICES.

- 4.4.1 TERMINATION AT COMPANY'S OPTION. Company may, at any time, upon issuance of written notice to Contractor, in whole or in part, terminate or suspend the Work under a Request for Services at any time during the term of a Request for Services for any reason. In the event of such termination or suspension, Contractor will be entitled to recover from Company:

[Services Contract, block #9]

Contract2-prov.ppt

FIG. 60

Materials and/or Equipment

230  GOVERNING LAW
This Contract shall be governed by the laws of the state of Texas, excluding the Texas rules on conflicts of laws. For Materials and/or Equipment supplied offshore, the provisions of this Contract shall be construed in accordance with the General Maritime Law of the United States or, if impermissible, with the laws of the state applicable to the Order.

240  NON-BINDING MEDIATION
If a dispute arises between Contractor and Company under this Contract and cannot be resolved by negotiation, the dispute shall be submitted to mediation before resorting to litigation. In such event, promptly following one party's written request for mediation, Contractor and Company shall choose a mutually acceptable mediator and share the costs of mediation services equally. Contractor and Company shall each have present at the mediation at least one individual who has authority to settle the dispute. Contractor and Company shall make reasonable efforts to ensure that the mediation occurs within sixty (60) days of the date of the mediation request. Notwithstanding the above, either party may file a complaint (1) if the parties are unable, after reasonable efforts, to commence mediation within sixty (60) days of the date of the mediation request, (2) for statute of limitations or venue reasons, or (3) to seek a preliminary injunction or other provisional judicial relief if, in its sole judgment, an injunction or other provisional relief is necessary to avoid irreparable damage to or to preserve the status quo. Despite such actions, the parties shall continue to try to resolve the dispute by mediation.

250  FORCE MAJEURE
Except for the obligation to make payment for Materials and/or Equipment delivered or any related services performed or other financial obligations due under this Contract, neither party shall be liable for nonperformance under this Contract to the extent caused by circumstances beyond the control of the non-performing party including, but not limited to, governmental decrees, laws, acts of God, strikes or other concerted acts of workers, bomb threats, fires, floods, explosions, riots, war, and sabotage. The non-performing party shall diligently attempt to remove the cause(s) of the force majeure. If Supplier is affected by an event of force majeure, it shall notify Company immediately in writing of the occurrence and the extent to which the occurrence will impact Supplier's performance under this Contract. If Supplier does not give such notice, it may not claim force majeure as a defense. If in Company's opinion, an event of force majeure will delay Supplier's performance for a period of more than seven (7) days, Company may terminate this Contract without giving rise to any claim for compensation from Supplier other than for services completed up to the time of termination.

[Materials and/or Equipment, block #18]

Contract2-prov.ppt

FIG. 61

Business Term Value Extraction

- Target clause:
  - This Materials and/or Equipment Contract is effective on the 22nd day of January 2003 ("Effective Date") between Largeco Inc., formerly Offshore Oil Company, a corporation organized and existing under the laws of the state of Delaware (hereinafter "Company") and Advanced Tire Products Inc., a corporation organized and existing under the laws of the state of Nevada (hereinafter "Supplier").

*Effective date*

*Supplier*

Contract2-prov.ppt

FIG. 62

Extraction of business terms

- Effective date  "22nd day of January 2003..."
- Seller  "Advanced Tire Products Inc a"

FIG. 63 nahava

Business Term Value Extraction

- Training clause:
  - This Materials and/or Equipment Contract is effective on the [effective-date] ("Effective Date") [buyer] a corporation organized and existing under the laws of the state of [buyer-state] (hereinafter "Company") and [seller] a corporation organized and existing under the laws of the state of [seller-state] (hereinafter "Supplier").. [source: Master Materials and/or Equipment]

Contract2-prov.ppt

FIG. 64

More training clauses

- This Purchase Agreement shall be effective [effective-date]; is made ("Agreement Date"), by and between [buyer]. ("Buyer"), a [buyer-state] corporation, having principal offices at [buyer-address] and [supplier], having principal offices at [supplier-address].. [source: AGREEMENT Purchasing Short]

- This Volume Purchase Agreement ("VPA") is made this [effective-date] by and between [buyer], having principal offices at [buyer-address] ("Buyer") and [supplier] ("Supplier"), having principal offices at [seller-address].. [source: volume purchase agreement]

Contract2-prov.ppt

FIG. 65 nahava

One embodiment of the invention:
An example

Overview
0. Preliminaries
1. Pick a text block.
2. Compute profile.
3. Show the profile.
4. Use the same block as target.
5. Compute similarity score.

FIG. 66

0. Preliminaries

- Tokenization convention
  - Input words convert to lower case.
  - Upper case tokens denote punctuation.
    - Period (".") is TT_TERM
    - TT_TERM may also be used to mark beginning of first sentence.

FIG. 67

1. Pick a text block

- Text is "Our essential skill."
- Tokenizes to "our essential skill TT_TERM"

2. Compute profile

- Identify the tokens
- Identify the tuples
- Form the transition probability matrix
- Compute eigensystem (i.e. eigenvalues, left eigenvectors, right eigenvectors)

Tokens, tuples

- Tokens are...
  - { "our", "essential", "skill", "TT_TERM" } assigned indices
  - 0 – "our"
  - 1 – "essential"
  - 2 – "TT_TERM"
  - 3 – "skill"
- Tuples are...
  - { "TT_TERM.TT_TERM", "TT_TERM.our", "essential.skill", "our.essential" }
  - 0 – "TT_TERM.TT_TERM"
  - 1 – "TT_TERM.our"
  - 2 – "essential.skill"
  - 3 – "our.essential"

FIG. 70

3. Show the profile
4. Use the same text as target
5. Compute the similarity score testSimple1nj.srp

```xml
<?xml version='1.0' encoding='ISO-8859-1'?>
<?xml-stylesheet type='text/xsl' href='profile.xsl'?>

<profile rundate="Fri Feb 14 01:53:46 PST 2003" size="7" threshold="0.0" tool-version="com.nahava.utils build 393 Thu Feb 13 14:01:27 PST 2003">
    <tokens count="7" expanded-count="6">                        ⎫
        <v id="0">our</v>                                         |
        <v id="1">TT_TERM</v>                                     |
        <v id="2">skill</v>                                       ⎬ 1
        <v id="3">simple</v>                                      |
        <v id="4">to</v>                                          |
        <v id="5">show</v></tokens>                               ⎭
    <tuples count="7" expanded-count="7">                        ⎫
        <v id="0">TT_TERM.TT_TERM.</v>                            |
        <v id="1">our.simple.</v>                                 |
        <v id="2">simple.skill.</v>                               ⎬ 2
        <v id="3">TT_TERM.to.</v>                                 |
        <v id="4">show.our.</v>                                   |            3
        <v id="5">to.show.</v>                                    |
        <v id="6">TT_TERM.our.</v></tuples>                       ⎭
    <components count="7">  ◄
        <component count="9" eim="0.0" ema="1.0000000000000018"    ⎫ 7
ere="1.0000000000000018"                                           ⎭
         id="0">
           <lt count="5">                                                                        ⎫
              <v id="0" im="0.0" ma="0.4472135954999585" ph="-3.141592653589793"                 ⎬ 8
              re="-0.4472135954999585" sym="TT_TERM.TT_TERM."></v>                               ⎭
              <v id="5" im="0.0" ma="0.4472135954999585" ph="-3.141592653589793"
              re="-0.4472135954999585" sym="to.show."></v>
              <v id="3" im="0.0" ma="0.4472135954999804" ph="-3.141592653589793"
       5      re="-0.4472135954999804" sym="TT_TERM.to."></v>
              <v id="4" im="0.0" ma="0.4472135954999765" ph="-3.141592653589793"
10            re="-0.4472135954999765" sym="show.our."></v>
              <v id="6" im="0.0" ma="0.4472135954999573" ph="-3.141592653589793"
              re="-0.4472135954999573" sym="TT_TERM.our."></v></lt>
           <rt count="4">
              <v id="0" im="0.0" ma="0.755928946018455" ph="-3.141592653589793" re="-
       0.755928946018455"
              sym="our"></v>
       6      <v id="4" im="0.0" ma="0.3779644730092272" ph="-3.141592653589793"
              re="-0.3779644730092272" sym="to"></v>
              <v id="3" im="0.0" ma="0.37796447300922686" ph="-3.141592653589793"
              re="-0.37796447300922686" sym="simple"></v>
              <v id="5" im="0.0" ma="0.37796447300922686" ph="-3.141592653589793"
              re="-0.37796447300922686" sym="show"></v></rt></component>
20 ►    <component count="9" eim="0.8138345589017515" ema="0.8225600173237577"
        ere="0.11949181075225304" id="1">
           <lt count="5">
              <v id="6" im="0.0" ma="0.5388393139119474" ph="0.0"
re="0.5388393139119474"
              sym="TT_TERM.our."></v>
              <v id="4" im="0.0" ma="0.5388393139119465" ph="0.0"
re="0.5388393139119465"
              sym="show.our."></v>
              <v id="3" im="-0.43852605535645217" ma="0.4432276753861333" ph="-
1.425012287093083"
              re="0.06438685323864032" sym="TT_TERM.to."></v>
```

FIG. 72 testSimple1nj.srp

```
           <v id="5" im="-0.10480054483317074" ma="0.3645813643439865" ph="-
2.850024574186165"
               re="-0.34919395331189973" sym="to.show."></v>
           <v id="0" im="0.2716633000948112" ma="0.29989005337070956"
ph="1.1334442076894558"
               re="-0.12701612296194356" sym="TT_TERM.TT_TERM."></v></lt>
         <rt count="4">
           <v id="0" im="0.0" ma="0.6060381485670447" ph="-3.141592653589793"
               re="-0.6060381485670447" sym="our"></v>
           <v id="5" im="-0.4932147893166947" ma="0.5444615059884269" ph="-
1.133444207689455"
               re="0.23060247852630336" sym="show"></v>
           <v id="3" im="0.12873713812786217" ma="0.44785226579796084"
ph="0.2915680794036277"
               re="0.428950348230 43926" sym="simple"></v>
           <v id="4" im="0.3644776511888337" ma="0.36838536 75132551"
ph="1.4250122870930824"
               re="-0.05351467818969806" sym="to"></v></rt></component>
      <component count="9" eim="-0.8138345589017515" ema="0.8225600173237577"
30 ─▶     ere="0.11949181075225304" id="2">
         <lt count="5">
           <v id="6" im="0.0" ma="0.5388393139119474" ph="0.0"
re="0.5388393139119474"
               sym="TT_TERM.our."></v>
           <v id="4" im="0.0" ma="0.5388393139119465" ph="0.0"
re="0.5388393139119465"
               sym="show.our."></v>
           <v id="3" im="-0.43852605535645217" ma="0.4432276753861333" ph="-
1.425012287093083"
               re="0.06438688532384032" sym="TT_TERM.to."></v>
           <v id="5" im="-0.10480054483317074" ma="0.3645813643439865" ph="-
2.850024574186165"
               re="-0.34919395331189973" sym="to.show."></v>
           <v id="0" im="0.2716633000948112" ma="0.29989005337070956"
ph="1.1334442076894558"
               re="-0.12701612296194356" sym="TT_TERM.TT_TERM."></v></lt>
         <rt count="4">
           <v id="0" im="0.0" ma="0.6060381485670447" ph="-3.141592653589793"
               re="-0.6060381485670447" sym="our"></v>
           <v id="5" im="-0.4932147893166947" ma="0.5444615059884269" ph="-
1.133444207689455"
               re="0.23060247852630336" sym="show"></v>
           <v id="3" im="0.12873713812786217" ma="0.44785226579796084"
ph="0.2915680794036277"
               re="0.428950348230 43926" sym="simple"></v>
           <v id="4" im="0.3644776511888337" ma="0.36838536 75132551"
ph="1.4250122870930824"
               re="-0.05351467818969806" sym="to"></v></rt></component>
      <component count="9" eim="0.0" ema="0.7389836215045064" ere="-
40 ─▶  0.7389836215045064"
          id="3">
         <lt count="5">
           <v id="4" im="0.0" ma="0.5766609545157906" ph="-3.141592653589793"
               re="-0.5766609545157906" sym="show.our."></v>
           <v id="6" im="0.0" ma="0.5766609545157906" ph="-3.141592653589793"
               re="-0.5766609545157906" sym="TT_TERM.our."></v>
```

FIG. 73 testSimple1nj.srp

```
            <v id="3" im="0.0" ma="0.4261430005483243" ph="0.0"
re="0.4261430005483243"
           sym="TT_TERM.to."></v>
            <v id="5" im="0.0" ma="0.3149126978239976" ph="-3.141592653589793"
           re="-0.3149126978239976" sym="to.show."></v>
            <v id="0" im="0.0" ma="0.23271532589573207" ph="0.0"
re="0.23271532589573207"
           sym="TT_TERM.TT_TERM."></v></lt>
        <rt count="4">
            <v id="5" im="0.0" ma="0.6329937838989217" ph="-3.141592653589793"
           re="-0.6329937838989217" sym="show"></v>
            <v id="0" im="0.0" ma="0.5108976203658555" ph="0.0"
re="0.5108976203658555"
           sym="our"></v>
            <v id="3" im="0.0" ma="0.4677720388154665" ph="0.0"
re="0.4677720388154665"
           sym="simple"></v>
            <v id="4" im="0.0" ma="0.34567587528239946" ph="-3.141592653589793"
           re="-0.34567587528239946" sym="to"></v></rt></component>
     ┌─►<component count="4" eim="0.0" ema="1.0" ere="1.0" id="4">
50 ──┘   <lt count="2">
            <v id="1" im="0.0" ma="0.7071067811865475" ph="-3.141592653589793"
           re="-0.7071067811865475" sym="our.simple."></v>
            <v id="2" im="0.0" ma="0.7071067811865475" ph="-3.141592653589793"
           re="-0.7071067811865475" sym="simple.skill."></v></lt>
        <rt count="2">
            <v id="1" im="0.0" ma="0.7071067811865475" ph="-3.141592653589793"
           re="-0.7071067811865475" sym="TT_TERM"></v>
            <v id="2" im="0.0" ma="0.7071067811865475" ph="-3.141592653589793"
           re="-0.7071067811865475" sym="skill"></v></rt></component>
     ┌─►<component count="4" eim="0.0" ema="1.0" ere="-1.0" id="5">
60 ──┘   <lt count="2">
            <v id="1" im="0.0" ma="0.7071067811865475" ph="0.0"
re="0.7071067811865475"
           sym="our.simple."></v>
            <v id="2" im="0.0" ma="0.7071067811865475" ph="-3.141592653589793"
           re="-0.7071067811865475" sym="simple.skill."></v></lt>
        <rt count="2">
            <v id="1" im="0.0" ma="0.7071067811865475" ph="0.0"
re="0.7071067811865475"
           sym="TT_TERM"></v>
            <v id="2" im="0.0" ma="0.7071067811865475" ph="-3.141592653589793"
           re="-0.7071067811865475" sym="skill"></v></rt></component>
     ┌─►<component count="2" eim="0.0" ema="0.0" ere="0.0" id="6">
70 ──┘   <lt count="1">
            <v id="6" im="0.0" ma="1.0" ph="0.0" re="1.0"
sym="TT_TERM.our."></v></lt>
        <rt count="1">
            <v id="4" im="0.0" ma="0.7071067811865476" ph="-3.141592653589793"
           re="-0.7071067811865476"
sym="to"></v></rt></component></components></profile>
```

FIG. 74 testSimple00-1nj.srp

```
<?xml version='1.0' encoding='ISO-8859-1'?>
<?xml-stylesheet type='text/xsl' href='profile.xsl'?>

<profile rundate="Fri Feb 14 11:57:02 PST 2003" size="0" threshold="0.0" tool-
version="com.nahava.utils build 393 Thu Feb 13 14:01:27 PST 2003">
  <tokens count="0" expanded-count="0"></tokens>
  <tuples count="0" expanded-count="0"></tuples>
  <components count="0"></components></profile>
```

FIG. 75 testSimple00-2nj.srp

```xml
<?xml version='1.0' encoding='ISO-8859-1'?>
<?xml-stylesheet type='text/xsl' href='profile.xsl'?>

<profile rundate="Fri Feb 14 15:13:55 PST 2003" size="6" threshold="0.0" tool-
version="ccm.nahava.utils build 394 Thu Feb 13 14:33:57 PST 2003">
   <tokens count="6" expanded-count="6">
      <v id="0">our</v>
      <v id="1">essential</v>
      <v id="2">TT_TERM</v>
      <v id="3">skill</v>
      <v id="4">to</v>
      <v id="5">show</v></tokens>
   <tuples count="6" expanded-count="6">
      <v id="0">TT_TERM.TT_TERM.</v>
      <v id="1">TT_TERM.to.</v>
      <v id="2">show.our.</v>
      <v id="3">to.show.</v>
      <v id="4">essential.skill.</v>
      <v id="5">our.essential.</v></tuples>
  <components count="6">
     <component count="12" eim="0.0" ema="0.9999999999999999" ere="-
0.9999999999999999"
        id="0">
       <lt count="6">
         <v id="3" im="0.0" ma="0.408248290463863247" ph="-3.141592653589793"
         re="-0.408248290463863247" sym="to.show."></v>
         <v id="1" im="0.0" ma="0.4082482904638632" ph="-3.141592653589793"
         re="-0.4082482904638632" sym="TT_TERM.to."></v>
         <v id="5" im="0.0" ma="0.4082482904638632" ph="0.0"
re="0.4082482904638632"
         sym="our.essential."></v>
         <v id="2" im="0.0" ma="0.408248290463863" ph="0.0"
re="0.408248290463863"
         sym="show.our."></v>
         <v id="0" im="0.0" ma="0.40824829046386296" ph="0.0"
re="0.40824829046386296"
         sym="TT_TERM.TT_TERM."></v>
         <v id="4" im="0.0" ma="0.40824829046386627" ph="-3.141592653589793"
         re="-0.40824829046386627" sym="essential.skill."></v></lt>
       <rt count="6">
         <v id="1" im="0.0" ma="0.40824829046386346" ph="-3.141592653589793"
         re="-0.40824829046386346" sym="essential"></v>
         <v id="2" im="0.0" ma="0.40824829046386346" ph="0.0"
re="0.40824829046386346"
         sym="TT_TERM"></v>
         <v id="5" im="0.0" ma="0.40824829046386313" ph="0.0"
re="0.40824829046386313"
         sym="show"></v>
         <v id="0" im="0.0" ma="0.40824829046386627" ph="0.0"
re="0.40824829046386627"
         sym="our"></v>
         <v id="3" im="0.0" ma="0.40824829046386627" ph="-3.141592653589793"
         re="-0.40824829046386627" sym="skill"></v>
         <v id="4" im="0.0" ma="0.40824829046386627" ph="-3.141592653589793"
         re="-0.40824829046386627" sym="to"></v></rt></component>
     <component count="12" eim="0.8660254037844383" ema="0.9999999999999993"
        ere="-0.49999999999999944" id="1">
```

FIG. 76 testSimple00-2nj.srp

```
        <lt count="6">
            <v id="0" im="0.0" ma="0.40824829046386324" ph="0.0"
re="0.40824829046386324"
            sym="TT_TERM.TT_TERM."></v>
            <v id="2" im="0.35355339059327395" ma="0.40824829046386324"
ph="1.0471975511965974"
            re="-0.20412414523193165" sym="show.our."></v>
            <v id="5" im="-0.35355339059327395" ma="0.4082482904638632" ph="-
2.094395102393195"
            re="-0.20412414523193315" sym="our.essential."></v>
            <v id="4" im="-0.35355339059327373" ma="0.40824829046386313" ph="-
2.0943951023931957"
            re="-0.20412414523193173" sym="essential.skill."></v>
            <v id="3" im="0.35355339059327356" ma="0.40824829046386285"
ph="1.0471975511965974"
            re="-0.20412414523193156" sym="to.show."></v>
            <v id="1" im="8.326672684688674E-17" ma="0.40824829046386246"
ph="2.039609933265780 3E-16"
            re="0.40824829046386246" sym="TT_TERM.to."></v></lt>
        <rt count="6">
            <v id="2" im="0.0" ma="0.4082482904638635" ph="-3.141592653589793"
            re="-0.4082482904638635" sym="TT_TERM"></v>
            <v id="4" im="-0.35355339059327395" ma="0.4082482904638632" ph="-
1.047197551196598"
            re="0.20412414523193145" sym="to"></v>
            <v id="5" im="-0.3535533905932738" ma="0.408248290463863" ph="-
1.0471975511965979"
            re="0.20412414523193145" sym="show"></v>
            <v id="0" im="0.3535533905932738" ma="0.4082482904638296"
ph="1.047197551196598"
            re="0.20412414523193134" sym="our"></v>
            <v id="1" im="0.3535533905932735" ma="0.4082482904638274"
ph="1.0471975511965974"
            re="0.20412414523193148" sym="essential"></v>
            <v id="3" im="-5.511151231257833E-17" ma="0.4082482904638274" ph="-
3.141592653589793"
            re="-0.4082482904638274" sym="skill"></v></rt></component>
        <component count="12" eim="-0.8660254037844383" ema="0.9999999999999993"
        ere="-0.49999999999999944" id="2">
        <lt count="6">
            <v id="0" im="0.0" ma="0.40824829046386324" ph="0.0"
re="0.40824829046386324"
            sym="TT_TERM.TT_TERM."></v>
            <v id="2" im="0.35355339059327395" ma="0.40824829046386324"
ph="1.0471975511965974"
            re="-0.20412414523193165" sym="show.our."></v>
            <v id="5" im="-0.35355339059327395" ma="0.4082482904638632" ph="-
2.094395102393195"
            re="-0.20412414523193315" sym="our.essential."></v>
            <v id="4" im="-0.35355339059327373" ma="0.40824829046386313" ph="-
2.0943951023931957"
            re="-0.20412414523193173" sym="essential.skill."></v>
            <v id="3" im="0.35355339059327356" ma="0.40824829046386285"
ph="1.0471975511965974"
            re="-0.20412414523193156" sym="to.show."></v>
            <v id="1" im="8.326672684688674E-17" ma="0.40824829046386246"
ph="2.0396099332657803E-16"
```

FIG. 77 testSimple00-2nj.srp

```
                  re="0.4082482904638246" sym="TT_TERM.to."></v></lt>
             <rt count="6">
                 <v id="2" im="0.0" ma="0.4082482904638635" ph="-3.141592653589793"
                  re="-0.4082482904638635" sym="TT_TERM"></v>
                 <v id="4" im="-0.35355339059327395" ma="0.4082482904638632" ph="-
1.0471975511965598"
                  re="0.20412414523193145" sym="to"></v>
                 <v id="5" im="-0.3535533905932738" ma="0.408248290463863" ph="-
1.0471975511965979"
                  re="0.20412414523193145" sym="show"></v>
                 <v id="0" im="0.3535533905932738" ma="0.4082482904638296"
ph="1.0471975511965598"
                  re="0.20412414523193134" sym="our"></v>
                 <v id="1" im="0.3535533905932735" ma="0.4082482904638274"
ph="1.0471975511965974"
                  re="0.20412414523193148" sym="essential"></v>
                 <v id="3" im="-5.551115123125783E-17" ma="0.4082482904638274" ph="-
3.141592653589793"
                  re="-0.4082482904638274" sym="skill"></v></rt></component>
         <component count="12" aim="0.8660254037844385" ema="0.9999999999999997"

ere="0.4999999999999998" id="3">
             <lt count="6">
                 <v id="4" im="0.0" ma="0.4082482904638634" ph="0.0"
re="0.4082482904638634"
                  sym="essential.skill."></v>
                 <v id="2" im="-0.35355339059327395" ma="0.4082482904638632" ph="-
1.0471975511965598"
                  re="0.20412414523193145" sym="show.our."></v>
                 <v id="0" im="0.3535533905932734" ma="0.408248290463863"
ph="1.0471975511965959"
                  re="0.20412414523193215" sym="TT_TERM.TT_TERM."></v>
                 <v id="5" im="-1.942890293094024E-16" ma="0.408248290463863" ph="-
3.1415926535897927"
                  re="-0.408248290463863" sym="our.essential."></v>
                 <v id="1" im="-0.3535533905932734" ma="0.4082482904638274" ph="-
2.0943951023931996"
                  re="-0.20412414523193168" sym="TT_TERM.to."></v>
                 <v id="3" im="0.3535533905932735" ma="0.4082482904638627"
ph="1.0471975511965983"
                  re="-0.20412414523193126" sym="to.show."></v></lt>
             <rt count="6">
                 <v id="2" im="0.0" ma="0.4082482904638313" ph="0.0"
re="0.4082482904638313"
                  sym="TT_TERM"></v>
                 <v id="3" im="-2.220446049250313E-16" ma="0.4082482904638313" ph="-
3.1415926535897927"
                  re="-0.4082482904638313" sym="skill"></v>
                 <v id="5" im="-0.35355339059327384" ma="0.408248290463863" ph="-
2.094395102393195"
                  re="-0.2041241452319314" sym="show"></v>
                 <v id="4" im="0.3535533905932739" ma="0.4082482904638296"
ph="1.0471975511965985"
                  re="0.20412414523193123" sym="to"></v>
                 <v id="1" im="-0.3535533905932737" ma="0.4082482904638285" ph="-
1.0471975511965980"
                  re="0.20412414523193134" sym="essential"></v>
```

FIG. 78 testSimple00-2nj.srp

```
        <v id="0" im="0.3535533905932735" ma="0.4082482904638628"
ph="1.0471975511965974"
            re="-0.2041241452319315" sym="our"></v></rt></component>
    <component count="12" eim="-0.8660254037844385" ema="0.9999999999999997"
        ere="0.4999999999999998" id="4">
        <lt count="6">
            <v id="4" im="0.0" ma="0.4082482904638634" ph="0.0"
re="0.4082482904638634"
            sym="essential.skill."></v>
            <v id="2" im="-0.35355339059327395" ma="0.4082482904638632" ph="-
1.047197551196598"
            re="0.20412414523193145" sym="show.our."></v>
            <v id="0" im="0.3535533905932734" ma="0.408248290463863"
ph="1.0471975511965959"
            re="0.20412414523193215" sym="TT_TERM.TT_TERM."></v>
            <v id="5" im="-1.942890293094024E-16" ma="0.408248290463863" ph="-
3.1415926535897927"
            re="-0.408248290463863" sym="our.essential."></v>
            <v id="1" im="-0.3535533905932734" ma="0.40824829046386274" ph="-
2.094395102393196"

re="-0.20412414523193168" sym="TT_TERM.to."></v>
            <v id="3" im="0.3535533905932735" ma="0.4082482904638627"
ph="1.0471975511965983"
            re="-0.20412414523193126" sym="to.show."></v></lt>
        <rt count="6">
            <v id="2" im="0.0" ma="0.40824829046386313" ph="0.0"
re="0.40824829046386313"
            sym="TT_TERM"></v>
            <v id="3" im="-2.220446049250313E-16" ma="0.40824829046386313" ph="-
3.1415926535897927"
            re="-0.40824829046386313" sym="skill"></v>
            <v id="5" im="-0.35355339059327384" ma="0.408248290463863" ph="-
2.094395102393195"
            re="-0.20412414523193314" sym="show"></v>
            <v id="4" im="0.3535533905932739" ma="0.40824829046386296"
ph="1.0471975511965995"
            re="0.20412414523193123" sym="to"></v>
            <v id="1" im="-0.3535533905932737" ma="0.40824829046386285" ph="-
1.047197551196598"
            re="0.20412414523193134" sym="essential"></v>
            <v id="0" im="0.3535533905932735" ma="0.4082482904638628"
ph="1.0471975511965974"
            re="-0.2041241452319315" sym="our"></v></rt></component>
    <component count="12" eim="0.0" ema="0.9999999999999998"
ere="0.9999999999999998"
        id="5">
        <lt count="6">
            <v id="2" im="0.0" ma="0.4082482904638637" ph="-3.141592653589793"
            re="-0.4082482904638637" sym="show.our."></v>
            <v id="4" im="0.0" ma="0.40824829046386324" ph="-3.141592653589793"
            re="-0.40824829046386324" sym="essential.skill."></v>
            <v id="3" im="0.0" ma="0.4082482904638629" ph="-3.141592653589793"
            re="-0.4082482904638629" sym="to.show."></v>
            <v id="1" im="0.0" ma="0.40824829046386285" ph="-3.141592653589793"
            re="-0.40824829046386285" sym="TT_TERM.to."></v>
            <v id="5" im="0.0" ma="0.4082482904638627" ph="-3.141592653589793"
```

FIG. 79 testSimple00-2nj.srp

```
            re="-0.4082482904638627" sym="our.essential."></v>
            <v id="0" im="0.0" ma="0.40824829046386263" ph="-3.141592653589793"
            re="-0.40824829046386263" sym="TT_TERM.TT_TERM."></v></lt>
        <rt count="6">
            <v id="2" im="0.0" ma="0.40824829046386335" ph="-3.141592653589793"
            re="-0.40824829046386335" sym="TT_TERM"></v>
            <v id="3" im="0.0" ma="0.40824829046386335" ph="-3.141592653589793"
            re="-0.40824829046386335" sym="skill"></v>
            <v id="5" im="0.0" ma="0.4082482904638632" ph="-3.141592653589793"
            re="-0.4082482904638632" sym="show"></v>
            <v id="1" im="0.0" ma="0.4082482904638629" ph="-3.141592653589793"
            re="-0.4082482904638629" sym="essential"></v>
            <v id="4" im="0.0" ma="0.40824829046386263" ph="-3.141592653589793"
            re="-0.40824829046386263" sym="to"></v>
            <v id="0" im="0.0" ma="0.4082482904638626" ph="-3.141592653589793"
            re="-0.4082482904638626"
sym="our"></v></rt></component></components></profile>
```

FIG. 80

METHOD AND APPARATUS FOR FUNDAMENTAL OPERATIONS ON TOKEN SEQUENCES: COMPUTING SIMILARITY, EXTRACTING TERM VALUES, AND SEARCHING EFFICIENTLY

RELATED APPLICATION

This patent application claims priority of U.S. Provisional Application Ser. No. 60/448,508 filed Feb. 19, 2003 titled "Method and Apparatus for Operations on Token Sequences: Computing Similarity, Extracting Term Values, and Searching Efficiently", which is hereby incorporated herein by reference.

FIELD OF THE INVENTION

The present invention pertains to fundamental operations on token sequences. More particularly, the present invention relates to a method and apparatus for fundamental operations on token sequences: computing similarity, extracting term values, and searching efficiently.

BACKGROUND OF THE INVENTION

The volume of information content in our modern world is exploding at a staggering pace. In many situations, it is impossible to read, process, summarize, and extract useful meaning fast enough. This is true for text, images, sound, and video.

Information content is stored for two main reasons. First, content is stored for human consumption. For example, web pages, document, music, and email are stored mainly to be redisplayed for their respective human audiences. Second, content is stored for retrieval and processing by machine. Retrieval and processing by machine requires structured information. Structured information has its data items tagged or encoded with values sufficiently uniform for machine handling. For example, XML (extensible markup language) is a kind of structured information format that is amenable for machine processing and transfer. However, most information is unstructured, and cannot be processed by machines. This presents a problem.

For example, consider one form of information that touches many people—email. A denizen of our increasingly interconnected world may send and receive a considerable volume of email. A tiny fraction of this email is structured with tags such as the sender, recipient(s), subject, and receipt time. The structured part of email makes it possible to sort incoming email into categories using search criteria based on the send, recipients, subject line, etc. However, little is done with the email body. The body and the attachment part of the email remain largely unstructured. As plain text, the body is searchable by wildcards, or by regular expressions, while an attachment may be scanned for known viruses. While useful, much more could potentially be done to benefit the user. For example, sorting email by the contents of the body; identifying emails that contain information of future reference value; identifying emails that have only transient value; identifying emails that require a follow-up action; and identifying emails that convey information that should be extracted, logged, and followed up. Most email users may benefit if the body could be meaningfully tagged so that a machine could perform such identifications.

Just as the speed and volume of email impose a daunting challenge to individuals, similar problems afflict modern organizations around the handling of unstructured content. Companies forge agreements, establish commitments, and fulfill obligations. Legal relationships with customers, suppliers, and partners are represented in contracts. The contracts specify business terms, such as effective date, ending date, prices, quantities, and payment terms. Some contain limitation of liability clauses, while others may not. By being able to automatically scan contracts for the presence of specific types of clauses, companies may gain greater control and visibility of supplier obligations and partner commitments. However, the vast majority of contracts are stored as unstructured content. In many cases companies continue to store contracts in paper form. However, with the ability to elicit meaningful interpretations from a contract, it may become a competitive advantage to exploit machine readable contracts as a source of business virtuosity.

Another example is a full-text repository of issued patents which contains tags, for example for the inventor name, assignee name, and patent number. These are portions of the content that is searchable because it is structured information. The claims and description of the patent application are available in electronic form, however they are typically searchable only by Boolean search criteria. The bulk of a patent description is available as unstructured text. Someone searching must form Boolean expressions related to the presence or absence of chosen words. What is lacking is an effective approach to find explanations and claims that are "similar" to other descriptions. This presents a problem.

One technique for coping with unstructured textual content is text data mining. One approach uses latent semantic analysis. This involves filtering the content to remove a list of "stop" words, such as "of," "the," etc. Then the remaining words are deemed to be important keywords, and their relative frequencies of appearance within a document are tallied. The numerical values map the document into a vector space, and a dimensionality reduction technique (for example, singular value decomposition (SVD)) identifies the documents that are most similar. Another approach is based on n-grams of characters and words for computing dissimilarity, equivalently, or similarity of a target text against a reference text.

In another approach used in the realm of plagiarism-detection, student program code is analyzed to detect plagiarism. Similarly, student term papers are analyzed with respect to subject matter, word choice, and sentence structure to identify the possibility that a given paper has partially or substantially plagiarized its content from a number of known online sources of pre-written term papers.

Other algorithms are used for matching images of faces. Others use an algorithm for computing similarity of an email to a spam profile.

The field of stylometry assigns numerical measures to attributes of one or more source texts, and performs analyses in order to gain a better understanding of such texts. For example, one application is to determine authorship of disputed works. Researchers have used principal components analysis (PCA) to analyze word frequencies of disputed texts to shed light on authorship.

Frequency-based approaches may not be able to analyze content at a level of detail to extract term values from textual content. This presents a problem.

BRIEF DESCRIPTION OF THE DRAWINGS

The invention is illustrated by way of example and not limitation in the figures of the accompanying drawings in which:

FIG. 5 illustrates a target clause with the desired business term values underlined;

FIG. 11 through FIG. 35 illustrate one embodiment of the invention as a demonstration;

FIG. 36 through FIG. 39 illustrate one embodiment of the invention showing a usage scenario;

FIG. 40 through FIG. 50 illustrate one embodiment of the invention showing business term value extraction;

FIG. 51 through FIG. 65 illustrate one embodiment of the invention for a contract analysis;

FIG. 66 through FIG. 71 shows an overview of a procedure to compute similarity of two text blocks for one embodiment of the invention;

FIG. 72 through 74 is an XML representation of a profile in one embodiment of the invention;

FIG. 75 is an XML representation of a null profile in one embodiment of the invention; and FIG. 76 through 80 is another example of an XML representation of a profile in one embodiment of the invention.

DETAILED DESCRIPTION

Figure 1:
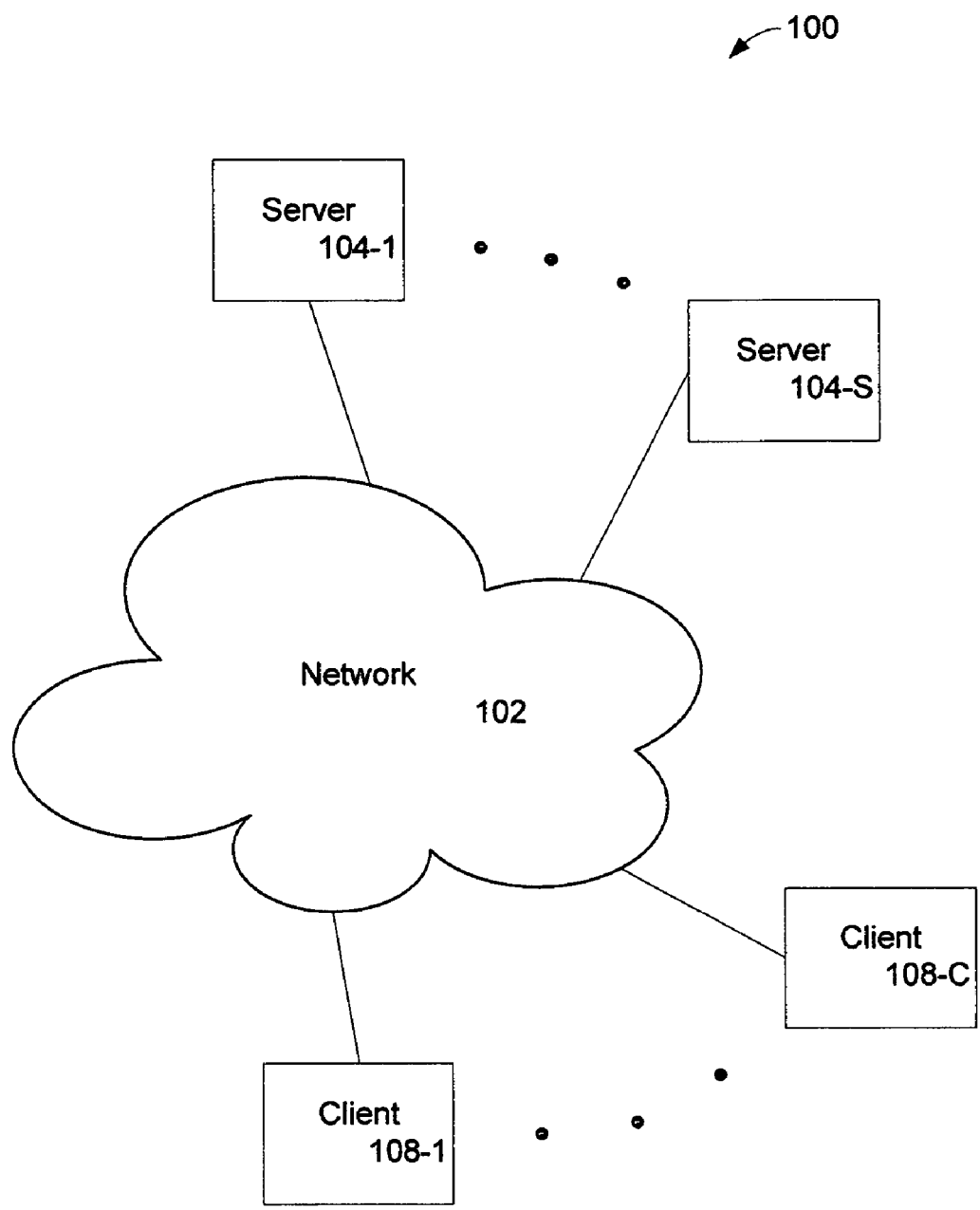
FIG. 1 illustrates a network environment in which the method and apparatus of the invention may be implemented.

The present invention is a method and apparatus for fundamental operations on token sequences: computing similarity, extracting term values, and searching efficiently. Because the title of the invention is of limited length, it should not be construed as limiting the present invention to only the three operations disclosed in the title.

In order to explain the present invention in some of its many possible embodiments a series of explanations will be used. First, is shown how many important classes of problems can be modeled as a sequence of tokens. Second, is shown how to build a probabilistic state transition model (for example, Markov model) that uses a concept of current state that incorporates a history of recently seen tokens, which are denoted as tuples. Third, the probabilistic state transition model optionally uses a novel technique for assigning probabilities to the tokens that define the next state. Fourth, by combining the previous steps, a probabilistic state transition model is generated that captures the essential character of an input sequence in terms of tuples that transition to tokens. Fifth, instead of working in the tuple-token vector space naturally introduced by the probabilistic state transition model, it is shown how to generate a collection of orthogonal basis vectors that summarizes the core behavior of the input sequence—this stored mathematical representation of a sequence is denoted as its profile. Sixth, given a profile and a target sequence of length L, it is shown how to derive a numerical similarity score of the target relative to the profile in big-oh order L time. Seventh, given a profile it is shown how to take an input consisting of many target sequences and to efficiently search for the highest ranking similar sequences in big-oh order $L*\log(N)$ time, where L is the average length of the sequences and N is the number of target sequences.

As exemplified in various embodiments of the invention, analysis of content is done at the token-sequence level. This may yield superior results compared to current approaches that are based on keyword frequencies. For example, frequency-based approaches may not be able to analyze content at a level of detail to extract term values from textual content. Term extraction uses information gleaned from a sequence of tokens to identify a target phrase. For example, find the name of a seller in the introductory clause in a purchase agreement.

Although this particular problem is described in terms of text examples, please observe that text merely happens to represent one instance of a general class of data type. Text is nothing more than a particular sequence of tokens. The techniques described herein can be used to analyze any other input data that can be interpreted as a sequence of tokens. For example, in this document is shown how an XML or HTML expression can be viewed as a sequence of tokens. Similarly, a word can be viewed as a sequence of characters, or a sequence of morphemes. Moving up to the document level, a purely straightforward approach would view a document as a sequence of words, but one will observe that an earlier application of this technique on words within a sentence could map to a speech acts, which in turn leads to treating a document as a sequence of speech acts.

Many kinds of unstructured content can be interpreted as a sequence of tokens. In the realm of text for example, any of the following can be interpreted as a token:
1. A word, capitalization left intact
2. A word, normalized uniformly to say, lower case
3. A word, stemmed or otherwise transformed to its underlying lexeme
4. A morpheme identified within an individual word
5. An individual character within a word
6. An individual character within a word, after applying one of the word-level transformations indicated above.

In some situations, more than one of these interpretations may be used simultaneously to improve overall accuracy and discrimination power.

Overview

To succinctly explain the present invention, as presented here the description proceeds in three parts. First, is introduced a "profiling" module that takes input text and computes a profile, which is a combination of symbolic and numerical information that summarizes essential aspects of the input "text". Second, is shown how a "similarity" module uses a profile to take an arbitrary input text and compute a numerical similarity score. Third, this fundamental capability is applied to solve a number of important problems in information retrieval, including recognizing similar blocks of text, extracting values of terms within a block of text, and fast indexing and retrieval of text blocks.

Nota Bene

Whereas other approaches may characterize an input document according to the frequencies at which predetermined keywords appear, in one embodiment the present invention uses an approach that analyzes the specific sequence of words that appear. This may provide a substantial improvement over keyword frequency approaches because it is able to operate on smaller blocks of text while retaining the ability to discriminate between and to discern similarity among blocks of text.

One of skill in the art will note that the ability to discern similarity of sequences significantly enlarges the range of applicability of this technique. For example, while analysis of words is certainly one domain where sequence matters, recognizing patterns within sequences of non-verbal behaviors is important in many other domains. Fraud detection scrutinizes sequences of financial transactions. Threat detection discerns patterns within sequences of movements of people, messages, and other assets, etc. Consumer preference research studies sequences of credit purchases, movie rental decisions, web browser destinations, radio station selections, television channel choices, etc.

In one embodiment of the present invention is presented a technique of computing similarity of a target token sequence (for example: a document, a text block, etc.) that scales according to O(log (n)), where n is the number of reference sequences in a repository. A logarithmic factor allows support of large repositories. For example, suppose one wants to build an automatic email query classifier, and has a training repository of n reference emails. Given an incoming email, which is called the target, the goal is to find the most similar reference email(s) in the repository to the incoming one. In the most naive approach, one would compute the similarity of each email in the repository against the target. In this naïve approach the time to handle a query grows linearly, or O(n). Because in one embodiment of the present invention the approach scales logarithmically, as O(log(n)), very large repositories become practical. Alternatively, as the repository size grows one can keep response time relatively small.

Theory of Operation

Because the present invention has many possible embodiments, Applicant has provided a brief overview of the theory of operation so that one skilled in the art will have an overview of techniques which may be used in various embodiments of the present invention. Please note that for ease of explanation, certain assumptions are made (for example, stationary processes), and that the invention is not so limited.

Start with a source of tokens, call it S. As has been pointed out, the tokens could be words and relevant punctuation. Alternatively, the tokens may be HTML fragments, channel selections, credit card transactions, incoming orders, troop movements, email actions, or whatever makes sense for a given problem domain. Assume that at time i>=0, S emits a token t.i=S(i). For example, the output sequence {t.i; t.i=S(i)} might represent words from a block of text. Further assume that S is stationary, which means that the underlying statistics are independent of the time i. For example, if a source S generates the words of the indemnification clause from a contract, then a sentence that it generates (from the words that it emits) tend to be independent of whether it is generated early or late in the sequence.

Using these assumptions, one can define a Markov model that defines the probability of emitting a given token t drawn from a set R, given a prior history tuple of tokens of size h, (t.0, . . . , t.h−1). Call Q the set of possible tuples. In other words, one can represent the original source S as a state machine that remembers the most recent history of h tokens emitted as a tuple q=(t.0, . . . , t.h−1) as a member of Q, and expresses the probability of emitting a tuple t from the set R:

$P(t, q)$=probability of emitting token $t$, given the current history $q$.

Introduce a probability vector x, whose length is the number of elements of Q, and where the j-th element x.j represents the probability of being in the state of the j-th tuple. Because we assume the source S to be stationary the probability transition function P can be represented by a real matrix A, where the (j,k)-th element of the matrix is, $A(j, k)$=probability that $S$ emits token $r.k$, given that the current state is given by tuple $q.j$.

In this formulation, one can see that, sum(k; A(j, k))=1 since the token that the source emits must be one of the tokens contained in the set R. That is the typical assumption for a Markov model. As noted later, this assumption is not essential, because in some situations (embodiments of the invention) one can truncate the matrix A by deleting rows and/or columns that are deem non-essential. Another property of a Markov model is 0<=A(j, k)<=1, and for now this remains so in our model, although we do not particularly require it.

The matrix A has the number of rows equal to the number of possible tuples, and the number of columns equal to the number of possible tokens. The matrix A maps a probability vector x in tuple space, where each element x.j represents the probability of the current state being the j-th tuple, to a probability vector y in token space, where y.k represents the probability of the next token being the k-th token. This can be expressed, x.transpose A=y.transpose where x is the probability vector in tuple space, and y is the probability vector in token space.

Since the number of tuples exceeds the number of tokens, in the typical case A will have more rows than columns. If A isn't square, then solving the singular value decomposition (SVD) problem for A yields the factorization, A=U D V.hermitian where D is diagonal, U and V are orthogonal (unitary), and V.hermitian is formed by transposing V and taking the complex conjugate of its elements.

One will observe that A will usually be very sparse, and by renumbering the tuples it is possible to place the tuples that occur most frequently in the low numbered rows. If it also occurs that some tokens are far less frequent than others, then by a similar renumbering of the token assignments to the columns of A one can congregate the non-zero elements of A into the low-numbered columns. Applicant has observed that after renumbering, that A can be reduced to a square matrix by dropping some number of high-numbered rows and columns. Applicant's experience has been that as long as renumbering places the high-valued, non-zero elements in the low-numbered rows and columns, then similarity results tend to be fairly robust to deleting high-numbered rows and columns.

If by this procedure one creates a square matrix A that approximates the original A, one can solve the nonsymmetric eigenproblem (NEP). The eigenproblem also yields a factorization, A=UDV.hermitian where D is diagonal with eigenvalues down the diagonal, U and V are orthonormal.

One will observe that either solving the SVD problem for a non-square A, or solving the NEP for a square A, both formulations provide factorizations with orthogonal U and V. Regardless of which technique is used to solve the problem, the key result is that U and V are orthogonal. We use this property as follows. Premultiply the expression above by U.hermitian and postmultiply by V, and the result is $$U \cdot \text{hermitian } A \ V = U \cdot \text{hermitian } U \ D \ V \cdot \text{hermitian } V$$
$$= (U \cdot \text{hermitian } U) \ D \ (V \cdot \text{hermitian } V)$$
$$= D$$

where one may use the fact that U.hermitian U=I and V.hermitian V=I, where I is the identify matrix.

Now one can diagonalize A by the use of U and V. Whether one uses SVD or NEP is determined more by the pragmatic decisions of whether one truncates A to make it square, or whether one prefers to deal with a non-square A. The other reason for not favoring one technique over the other is that it turns out that neither the eigenvalues (NEP) or the singular values (SVD) come into play later, when we compute the similarity measure. We are interested in U and V because they diagonalize A.

Diagonalizing a matrix has a useful interpretation. Multiplying by U and V have the effect of changing to a new basis, where under the new basis all the "energy" of the matrix has been channeled into independent dimensions.

A key insight from this approach is that U and V provide a custom-constructed basis with which to describe the essential character of the original A. That is why we call U and V the "profile" of A. In a sense, U and V represent an substantially optimal basis for the transformation underlying the matrix A.

Now is introduced the concept of similarity. U-V factorization and interpretation has been previously discussed because that will assist one to understand what similarity is. Suppose one has another matrix B, which arises from the probabilistic transformation model from another source of tokens. For example, this could be derived from the sequence of words in a paragraph of an unknown contract. Compute the similarity of the transformation represented by B by using the profile computed from A, namely the U and V matrices. Specifically, compute the matrix, $$G = U.\text{hermitian } B \ V$$

One knows that if B were identical to A, then U and V would diagonalize B. In other words, all the energy of B would also be forced down the diagonal of G. If B were substantially similar to A, then one may expect that the result G would be nearly diagonal. Applicant's empirical results support this.

This is the rationale behind the similarity measure, defined as, $$\text{Similarity} = \text{sum}(i; \|u.i.\text{conjugate}*b*v.i\|^2)$$

The i-th term in the sum is precisely the i-th diagonal in the matrix G=U.hermitian B V. If A is square, then i ranges from 1 to the size of A. Otherwise i goes up to number of tokens or the number of tuples, whichever is smaller.

So, recapping the overall procedure. Observe a sequence of tokens from the set R, and form the history tuples from the set Q. If it is assumed that the underlying process that generated the tokens is stationary, then one can compute the corresponding A matrix. Next, factor matrix A into the orthogonal matrices U and V. Taken together, R, Q, U and V define the profile of our original sequence. Armed with this profile one can proceed to observe another sequence, from which one may compute its corresponding transition matrix B according to the tokens R and tuples Q. Compute similarity between the first sequence and the second sequence as described earlier. In doing so, one is computing a degree to which U and V diagonalize B. This is the "essence" of similarity.

One of skill in the art will also note that this analysis also tells one that the presence of higher magnitude off-diagonal elements in G, which we might call the "similarity matrix," indicates a greater deviation from the original A matrix.

Profile

In one embodiment of the invention, this is a procedure to compute a profile.

1. Start with an input block of text.
2. Tokenize the text so that words and sentences are defined. Introduce a distinguished token to mark the end of sentence. In the following discussion, the token TERM is used to indicate the end of a sentence. For illustration purposes, convert words in the block of text into lowercase. Any token that contains a capital letter can safely be used as a special token. The result of this step is to represent the input block of text as a sequence of tokens t.i, where some of the tokens are sentence delimiters: {t.i: i=0, . . . , n). (Note that some form of stemming that maps different forms of the same word or verb phrase on to a common root improves the ability of this approach to detect patterns.)
3. Choose a small number h>0, which shall be called our history window. For English text, it has been observed that h=2 works well.
4. Each token t.i for i>h, has h predecessors q.i=(t.i–h, t.i–h+1, . . . , t.i–1). For completeness, define
   q.0 to be (TERM, . . . TERM).
   q.1 to be (TERM, . . . , t0)
   q.h to be (t.0, . . . , t.h–1)
5. Using this approach, for every position t.i in the input sequence i=0, . . . , n, there is a predecessor history q.i. Refer to the i-th predecessor p.i as the i-th tuple, tuple because it is an h-tuple of tokens that precede token t.i.
6. For each token t.i for i>=0, there is a next token in the sequence r.i=t.i, which is the token itself.
7. Therefore, each token t.i has a predecessor q.i, defined above, and a subsequent token r.i.
8. The collection of tuples, Q={q.i: i=0, . . . ,n), defines a set of states in the tuple space. Similarly, the collection of tokens, R={r.i: i=0, . . . , n}, defines a set of states in the token space. Each token t.i represents a transition from the predecessor h-history of tokens, to the current token.
9. Define a stationary Markov model that has a probability of transitioning from a state q.i contained in the set Q, to an element in the token set R:

P(q, r)=probability of that the next token is r, given that the previous tokens are described by the tuple q.

10. The probability model is defined over the cross product of the tuples Q and the tokens R. In practice, there will be a subset of the observed tuples Q that are the most frequently seen tuples and a similar most-frequent subset of the tokens. Call these reduced sets Q.star and R.star. The primary consideration in choosing a strict subset Q.star of Q, or subset R.star of R, is to keep the computational load manageable. As compute power increases, or as the time available to perform computations increases, or as sparse matrix techniques becomes more widely available, then the need to reduce the tuple and token sets becomes less pressing. (Note that for certain applications some tokens may be deemed highly important even if they don't fall within the most frequent tuple set Q.star or the most frequent token set R.star. In other embodiments of the invention the sets Q.star and R.start may be augmented with such important tuples or tokens.)

11. Suppose the N is the reduced size of Q.star and R.star. For convenience label the tuples and tokens according to an indexing scheme. In practice it works well to designate item 0 to correspond to the most frequent tuple and token. Form the matrix a[i,j], where a[i,j]=probability of transitioning from tuple.i to token.j.

12. Observe that a[ ] is an N×N matrix. In practice, the transition matrix a[ ] tends to contain many zeros. In other words, the matrix is sparse.
13. Perform a principal component analysis on the matrix a[ ]. This is equivalent to computing the eigenvalues w.i, left eigenvectors u.i, and right eigenvectors v.i of the matrix a. In practice, it has been seen that the eigenvalues and eigenvectors are complex. It is convenient to normalize the eigenvectors to be of unit length. By virtue of the PCA and/or eigensystem analysis ( i.e. solving this eigenproblem), the eigenvectors will be orthogonal. In practice, there will be C<=N eigenvector pairs. Since the matrix a is real, the eigenvalues will either be real, in which case there is a corresponding left and right eigenvector pair, or there will be a complex conjugate pair of eigenvalues and a corresponding pair of complex left and right eigenvectors.
14. Define the "profile" of the input text block as follows: the N tuples and tokens chosen above, and the C eigenvector pairs computed above. C which denotes a component contains an eigenvalue and corresponding left and right eigenvectors. Thus, an ith component is (w.i, u.i, v.i).

Using the profile approach discussed above, consider this example. Consider the famous opening from a Dr. Seuss classic:

"I can read in red. I can read in blue. I can read in pickle color too."

After tokenizing, the following sequence of tokens is obtained, including the special token TERM that denotes the sentence delimiter.

i can read in red TERM i can read in blue TERM i can read in pickle color too TERM For example, a history window, h=2 was used. Construct the predecessor tuples q.i and tokens t.i as shown below in Table 1.

TABLE 1

Tuple to token state transitions.

| i | Predecessor (p.i) | Token (t.i) |
|---|---|---|
| 0 | TERM TERM | i |
| 1 | TERM i | can |
| 2 | i can | read |
| 3 | can read | in |
| 4 | read in | red |
| 5 | in red | TERM |
| 6 | red TERM | i |
| 7 | TERM i | can |
| 8 | i can | read |
| 9 | can read | in |
| 10 | read in | blue |
| 11 | in blue | TERM |
| 12 | blue TERM | i |
| 13 | TERM i | can |
| 14 | i can | read |
| 15 | can read | in |

TABLE 1-continued

Tuple to token state transitions.

| i | Predecessor (p.i) | Token (t.i) |
|---|---|---|
| 16 | read in | pickle |
| 17 | in pickle | color |
| 18 | pickle color | too |
| 19 | color too | TERM |

The tokens R can be written a shown in Table 2.

TABLE 2

The set of tokens and frequency of occurrence.

| j | Tokens (r.j) | Frequency |
|---|---|---|
| 0 | i | 3 |
| 1 | can | 3 |
| 2 | read | 3 |
| 3 | in | 3 |
| 4 | TERM | 3 |
| 5 | red | 1 |
| 6 | blue | 1 |
| 7 | pickle | 1 |
| 8 | color | 1 |
| 9 | too | 1 |

The set of tuples Q can be written as shown in Table 3.

TABLE 3

The set of tuples and their frequency of occurrence.

| j | Tuples (q.i) | Frequency |
|---|---|---|
| 0 | TERM i | 3 |
| 1 | i can | 3 |
| 2 | can read | 3 |
| 3 | read in | 3 |
| 4 | in red | 1 |
| 5 | red TERM | 1 |
| 6 | in blue | 1 |
| 7 | blue TERM | 1 |
| 8 | in pickle | 1 |
| 9 | pickle color | 1 |
| 10 | color too | 1 |
| 11 | TERM TERM | 1 |

Define a stationary Markov model that transitions from state q.i to r.j with probability P.i.j.

For example, the probability P.3.5 of transitioning from tuple q.3, "read in," (see j=3 in Table 3) to token r.5, "red," (see j=5 in Table 2) is ⅓. The ⅓ is derived as follows. From Table 1 we see that at i=4, 10, and 16 is the p.i term "read in". Similarly, at these three values of i=4, 10, and 16, only at i=4 is the t.i term "red". At i=10 it is "blue" and at i=16 it is "pickle". Thus, the probability of transition from "read in" to "red" is ⅓.

As another example, the probability P.3.4 of transitioning from "read in," to "TERM," is 0. Again looking at Table 1 "read in" never transitions to TERM (i.e. 0/3).

TABLE 4

The transition probability matrix.

| | | | Tokens r.j | | | | | | | | |
|---|---|---|---|---|---|---|---|---|---|---|---|
| | | | j = 0<br>i | 1<br>can | 2<br>read | 3<br>in | 4<br>TERM | 5<br>red | 6<br>blue | 7<br>pickle | 8<br>color | 9<br>too |
| Tuples (q.i) | i = 0 | TERM i | 1 | | | | | | | | | |
| | 1 | i can | | 1 | | | | | | | | |
| | 2 | can read | | | 1 | | | | | | | |
| | 3 | read in | | | | | | 0.33 | 0.33 | 0.33 | | |
| | 4 | in red | | | | | 1 | | | | | |
| | 5 | red TERM | 1 | | | | | | | | | |
| | 6 | in blue | | | | | 1 | | | | | |
| | 7 | blue TERM | 1 | | | | | | | | | |
| | 8 | in pickle | | | | | | | | | 1 | |
| | 9 | pickle color | | | | | | | | | | 1 |
| | 10 | color too | | | | | 1 | | | | | |
| | 11 | TERM TERM | | | | | | | | | | |

One of skill in the art will recognize that in the absence of truncating terms that the summation across any row in the transition probability matrix (see for example Table 4) will be 1.

Generally, longer input sequences will have many more tuples than tokens, because a tuple derives from several tokens in the "history window," h. In its full form the transition matrix has a number of rows equal to the number of tuples. Although this example is relatively small, the technique of reducing the computational load will be illustrated. One can approximate the 12×10 transition matrix by a 10×10 transition matrix. In practice, one may find that the results do not change much, especially if the most frequent tuples and tokens are retained. One such approximation with smaller dimension is the following as illustrated in Table 5.

TABLE 5

A probability transition matrix of reduced dimensionality.

| | i | can | read | in | TERM | red | blue | pickle | color | too |
|---|---|---|---|---|---|---|---|---|---|---|
| TERM i | 1 | | | | | | | | | |
| i can | | 1 | | | | | | | | |
| can read | | | 1 | | | | | | | | |
| read in | | | | | | 0.33 | 0.33 | 0.33 | | |
| in red | | | | | 1 | | | | | |
| in blue | | | | | 1 | | | | | |
| in pickle | | | | | | | | | 1 | |
| pickle color | | | | | | | | | | 1 |
| color too | | | | | 1 | | | | | |
| TERM TERM | | | | | | | | | | |

Figure 3:
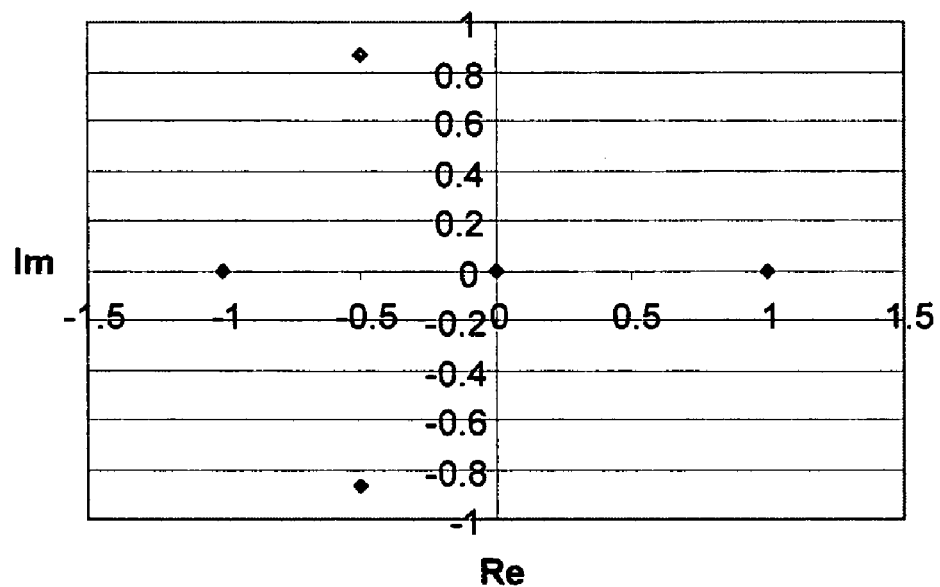
FIG. 3 illustrates eigenvalues in the complex plane for an example of the present invention.

Solving the eigenproblem arising from this matrix yields 10 complex-valued eigenvalues, as shown in Table 6. The location of the eigenvalues in the complex plane are shown in FIG. 3.

TABLE 6

Eigenvalues.

| Component | Real Part | Imaginary Part |
|---|---|---|
| 0 | −0.5 | 0.87 |
| 1 | −0.5 | −0.87 |

TABLE 6-continued

Eigenvalues.

| Component | Real Part | Imaginary Part |
|---|---|---|
| 2 | 1 | 0 |
| 3 | 0 | 0 |
| 4 | 1 | 0 |
| 5 | −1 | 0 |
| 6 | 0 | 0 |
| 7 | 1 | 0 |
| 8 | 1 | 0 |
| 9 | 1 | 0 |

For convenience, one can normalize all the eigenvectors to unit magnitude. Each eigenvalue has a corresponding left eigenvector and right eigenvector. The components of the left eigenvector correspond to the tuples. Similarly, the components of the right eigenvector correspond to the tokens. Together, the left and right eigenvectors corresponding to each eigenvalue can be interpreted in terms of the tuple-to-token state transitions. This is especially true in a simple example such as this one. For example, it can be seen that the unit eigenvalue 1+0i has several left-right eigenvector pairs. One of them has a left eigenvector with unit magnitude corresponding to the "i can" tuple, and a right eigenvector has unit magnitude corresponding to the "read" token.

TABLE 7

An eigenvalue with its left and right eigenvalues.

| Component | Real part | Imaginary part |
|---|---|---|
| Eigenvalue | | |
| 7 | 1 | 0 |
| | Re | Im |
| Left eigenvector | | |
| I can | 1 | 0 |
| Right eigenvector | | |
| read | 1 | 0 |

This arises from the original transition matrix due to the "i can read" token sequence. Another eigenvector pair associated with the 1+0i eigenvalue has the left eigenvector with unit magnitude in the "pickle color" direction, with corresponding right eigenvector with unit magnitude in the "too" tuple direction. Just as in the "I can read" example, this component of the eigenproblem arises from the "pickle color too" sequence.

TABLE 8

Another eigenvalue, with left and right eigenvectors.

| Component | Real part | Imaginary part |
|---|---|---|
| Eigenvalue | | |
| 8 | 1 | 0 |
| | Re | Im |
| Left eigenvector | | |
| pickle color | 1 | 0 |
| Right eigenvector | | |
| too | 1 | 0 |

An interesting pair of left and right eigenvectors is shown below in Table 9.

TABLE 9

A complex eigenvalue, with left and right eigenvectors.

| Component | Real part | Imaginary part |
|---|---|---|
| Eigenvalue | | |
| 0 | −0.5 | 0.866 |
| | Re | Im |
| Left eigenvector | | |
| read in | −0.655 | 0 |
| TERM i | 0.327 | −0.566 |
| in red | 0.109 | 0.189 |
| color too | 0.109 | 0.189 |
| in blue | 0.109 | 0.189 |
| Right eigenvector | | |
| can | −0.447 | 0 |
| blue | 0.224 | 0.387 |
| pickle | 0.224 | 0.387 |
| red | 0.224 | 0.387 |
| TERM | 0.224 | −0.387 |

This example has illustrated how to construct a "profile" of the source text in terms of tuples, tokens, eigenvalues, left eigenvectors, and right eigenvectors. Computing a profile entails solving the eigenproblem of the state transition matrix, and may be computationally intensive. However, observe that for most inputs the transition matrix tends to have many zero elements. That is, the matrix is sparse, which offers many opportunities for computationally efficient algorithms.

In the next section, is a discussion on how to use a profile to compute a numerical measure of how "similar" another token sequence is to the one used to construct the profile. The similarity computation does not require solving an eigenproblem. As a consequence, it is relatively inexpensive from a computational standpoint. This may be advantageous in many applications where a profile is computed once and used many times to measure similarity against other token sequences.

Similarity

Shown here is how in one embodiment of the invention, an input block of text, which one may refer to as the "target," may be used to compute a similarity score against a given profile.

1. Process the target block of text in the same manner as was done in the process to compute the profile, up to the point where the transition probability matrix was derived. To avoid confusion, refer to this transition probability matrix as b ( ), $b(p, q)$=observed probability of tuple $p$ transitioning to token $q$ in the target block of text.

2. Obtain a previously computed profile, consisting of the tuples, tokens, eigenvalues, left eigenvectors, and right eigenvectors. Refer to the text used to create the profile as the reference text.

3. Compute the similarity score of the target text against the reference as follows. For each eigenvalue w.i in the profile, obtain the left eigenvector u.i and right eigenvector v.i.

Similarity score=sum($i$, $\|u.i.\text{conjugate}*a*v.i\|^2$), where each term of the summation is the transition matrix premultiplied by the complex conjugate of the i-th left eigenvector, and postmultiplied by the i-th right eigenvector. The norm squared $\|.\|^2$ is the square of the magnitude of the complex number resulting from the i-th term in the sum.

4. A low similarity score indicates that the target text has little or nothing in common with the reference text. A high similarity score indicates that there are many common tuple-token combinations that appear in the target text, that also appear in the reference text.

Here is an example of how in one embodiment of the invention, the similarity computation works. Consider the text of the second page of the Dr. Seuss work:

I can read in bed. And in purple. And in brown. I can read in a circle and upside down!

As before, tokenize and form the transition matrix for this sequence. Observe that the matrix is sparse, which lends itself to computationally efficient routines.

TABLE 10

Probability transition matrix of the target text.

| | can | read | in | bed | a | TERM | purple | circle | brown | circle | ... |
|---|---|---|---|---|---|---|---|---|---|---|---|
| TERM i | 1 | | | | | | | | | | |
| i can | | 1 | | | | | | | | | |
| can read | | | 1 | | | | | | | | |
| read in | | | | 0.5 | 0.5 | | | | | | |
| TERM and | | 1 | | | | | | | | | |
| in purple | | | | | | 1 | | | | | |
| in brown | | | | | | 1 | | | | | |
| in bed | | | | | | 1 | | | | | |
| and in | | | | | | | 0.5 | | 0.5 | | |
| in a | | | | | | | | 1 | | | |
| ... | | | | | | | | | | | |

The similarity score may be obtained by using the formula,

Similarity score=sum($i$, $\|u.i.\text{conjugate}*a*v.i\|^2$).

The i-th term of the sum uses the i-th left eigenvector of the profile to premultiply the transition matrix, and the i-th right eigenvector of the profile to postmultiply the transition matrix. For example, component #7 of the profile has the following left and right eigenvectors as shown in Table 11:

TABLE 11

Complex conjugate of left eigenvector, and right eigenvector.

| | Re | Im |
|---|---|---|
| Left eigenvector (complex conjugate) | | |
| I can | 1 | 0 |
| Right eigenvector | | |
| read | 1 | 0 |

Observe that the transition matrix has value a[(i can), read]=1, hence that component contributes 1 to the sum, as the squared magnitude. In general, $\|x+iy\|^2 = x^2 + y^2$ where x is a real part, and y is an imaginary part. In this notation, "i" denotes complex math and not an index. For example, 1+0i has a squared magnitude of 1.

So 1+0i has a squared magnitude of 1.

In contrast, component #8 contributes nothing to the similarity score because neither the tuple (pickle color), nor the token "too" appears in the current sample.

Component #0 premultiplies by the following left eigenvector as shown in Table 12.

TABLE 12

Left eigenvector corresponding to a complex eigenvalue.

| | Re | Im |
|---|---|---|
| Left eigenvector (complex conjugate) | | |
| read in | −0.655 | 0 |
| TERM i | 0.327 | 0.566 |
| in red | 0.109 | −0.189 |
| color too | 0.109 | −0.189 |
| in blue | 0.109 | −0.189 |

This yields the following row vector as shown in Table 13.

TABLE 13

Result of left eigenvector and transition probability matrix.

| | can | read | in | bed | a | TERM | purple | circle | brown | circle | ... |
|---|---|---|---|---|---|---|---|---|---|---|---|
| Re | 0.327 | | | 0.327 | 0.327 | | | | | | |
| Im | 0.566 | | | 0 | 0 | | | | | | |

Multiply by the right eigenvector as shown in Table 14.

TABLE 14

Right eigenvector.

| | Re | Im |
|---|---|---|
| Right eigenvector | | |
| can | −0.447 | 0 |
| blue | 0.224 | 0.387 |
| pickle | 0.224 | 0.387 |
| red | 0.224 | 0.387 |
| TERM | 0.224 | −0.387 |

The sole non-zero term resulting from the row vector and the column vector arises from the "can" term, (0.327+0.566i)*(−0.447+0i)=0.146+0.253i. The contribution of the squared magnitude is 0.085.

Combining all the components of the profile, the similarity score for page 1 relative to the computed profile for page 0 is 2.240. In practice it has been observed that a similarity score greater than one tends to indicate a noticeable congruence between the profile text and a given target.

In the illustration below are the compute profiles for all the pages of this venerable Dr. Seuss classic, and also are computed the similarity of all the other pages in the work.

TABLE 15

Text of "I can read with my eyes shut!"

| Page | Text |
|---|---|
| 0 | I can read in red. I can read in blue. I can read in pickle color too. |
| 1 | I can read in bed. And in purple. And in brown. I can read in a circle and upside down! |
| 2 | I can read with my left eye. I can read with my right. I can read Mississippi with my eyes shut tight. |
| 3 | Mississippi, Indianapolis and hallelujah, too. I can read them with my eyes shut! That is very hard to do! |
| 4 | But it's bad for my hat and makes my eyebrows get red hot. So reading with my eyes shut I don't do an awful lot. |
| 5 | And when I keep them open I can read with much more speed. You have to be a speedy reader 'cause there's so, so much to read! |
| 6 | You can read about trees and bees and knees. And knees on trees! And bees on threes! |
| 7 | You can read about anchors. And all about ants. You can read about ankles! And crocodile pants. |
| 8 | You can read about hoses and how to smell roses and what you should do about owls on noses. |
| 9 | Young cat! If you keep your eyes open enough, oh, the stuff you will learn! The most wonderful stuff! You'll learn about fishbones and wishbones. You'll learn about trombones, too. You'll learn about Jake the Pillow Snake and all about Foo-Foo the Snoo. |
| 10 | You'll learn about ice. You can learn about mice. Mice on ice. And ice on mice. |
| 11 | You can learn about the price of ice. |
| 12 | You can learn about sad and glad and mad. There are so many things you can learn about. But you'll miss the best things if you keep your eyes shut. |
| 13 | The more that you read the more things you will know. The more that you learn, the more places you'll go. |
| 14 | You might learn a way to earn a few dollars. Or how to make doughnuts or kangaroo collars. |
| 15 | You can learn to read and play a Hut-Zut if you keep your eyes open. But not with them shut. |
| 16 | If you read with your eyes shut you're likely to find that the place where you're going is far, far behind. |
| 17 | So that's why I tell you to keep your eyes wide. Keep them wide open at least on one side. |

Figure 4:
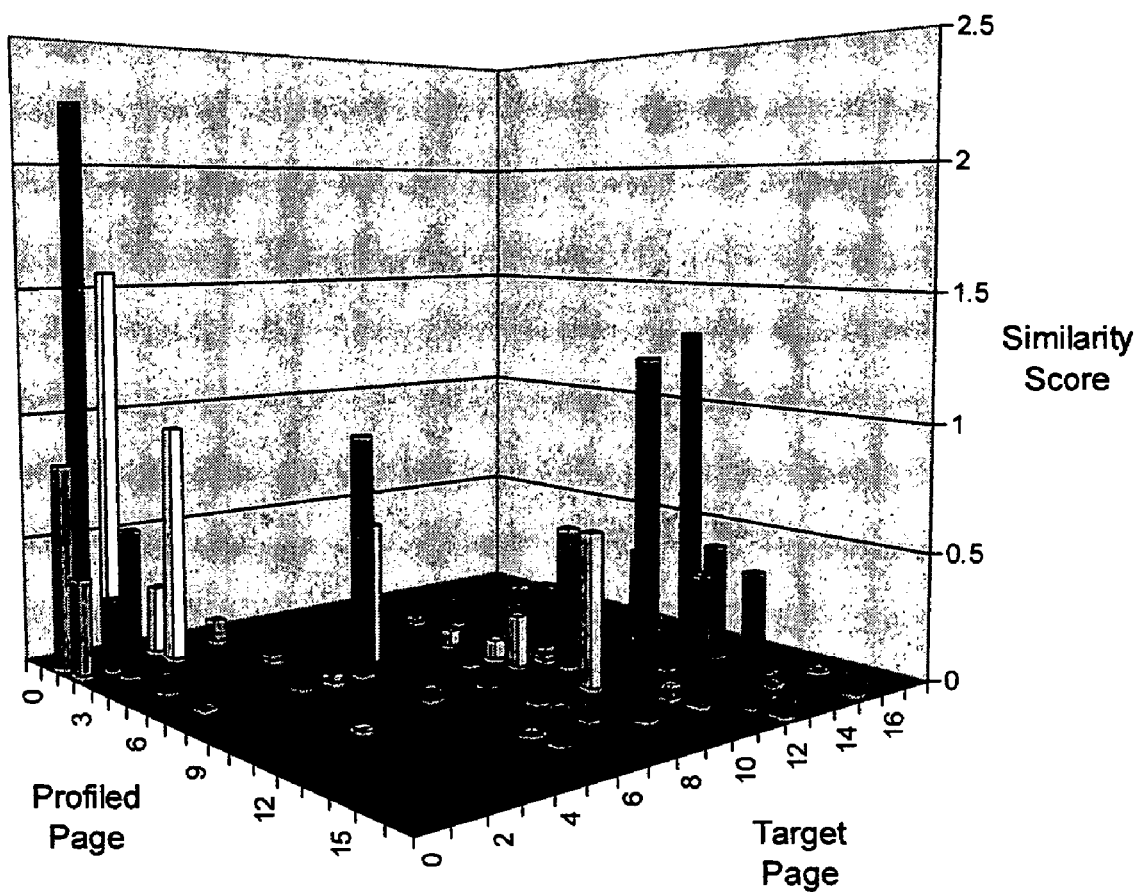
FIG. 4 shows a page versus page similarity comparison where exact same page to page matches (i.e. page N v. page N) have been suppressed for an example of the present invention.

The results are shown in FIG. 4, where the base of the graph depicts all the page combinations, and the height of the bar represents the similarity score computed using the procedure above. Note that FIG. 4 shows a page versus page similarity comparison where exact same page to page matches (i.e. page N v. page N) have been suppressed.

Some of the notable matches from the above example are shown below in Table 16, arranged with the highest similarity pairs at the top. One can observe that as the similarity measure diminishes the profile text and the target text become less alike.

TABLE 16

Similarity between profile and a target.

| Profile Text | Target Text | Similarity |
|---|---|---|
| i can read in red. i can read in blue. i can read in pickle color too. | i can read in bed. and in purple. and in brown. i can read in a circle and upside down! | 2.24 |
| i can read in red. i can read in blue. i can read in pickle color too. | i can read with my left eye. i can read with my right. i can read mississippi with my eyes shut tight. | 1.56 |
| you can learn about the price of ice. | you can learn to read and play a hut-zut if you keep your eyes open. but not with them shut. | 1.31 |
| you can learn to read and play a hut-zut if you keep your eyes open. but not with them shut. | young cat! if you keep your eyes open enough, oh, the stuff you will learn! the most wonderful stuff! you'll learn about fishbones and wishbones. you'll learn about trombones, too. you'll learn about jake the pillow snake and all about foo-foo the snoo. | 1.30 |
| you can read about anchors. and all about ants. you can read about ankles! and crocodile pants. | you can read about trees and bees and knees. and knees on trees! and bees on threes! | 0.95 |
| i can read with my left eye. i can read with my right. i can read mississippi with my eyes shut tight. | mississippi, indianapolis and hallelujah, too. i can read them with my eyes shut! that is very hard to do! | 0.94 |
| i can read in bed. and in purple. and in brown. i can read in a circle and upside down! | i can read in red. i can read in blue. i can read in pickle color too. | 0.81 |
| you can learn about sad and glad and mad. there are so many things you can learn about. but you'll miss the best things if you keep your eyes shut. | you'll learn about ice. you can learn about mice. mice on ice. and ice on mice. | 0.60 |

TABLE 16-continued

Similarity between profile and a target.

| Profile Text | Target Text | Similarity |
| --- | --- | --- |
| mississippi, indianapolis and hallelujah, too. i can read them with my eyes shut! that is very hard to do! | i can read in bed. and in purple. and in brown. i can read in a circle and upside down! | 0.58 |
| you can read about trees and bees and knees. and knees on trees! and bees on threes! | you can read about anchors. and all about ants. you can read about ankles! and crocodile pants. | 0.56 |
| you'll learn about ice. you can learn about mice. mice on ice. and ice on mice. | you can learn about the price of ice. | 0.56 |
| if you read with your eyes shut you're likely to find that the place where you're going is far, far behind. | you can learn about sad and glad and mad. there are so many things you can learn about. but you'll miss the best things if you keep your eyes shut. | 0.50 |
| you can learn to read and play a hut-zut if you keep your eyes open. but not with them shut. | you can learn about the price of ice. | 0.49 |
| you can learn about sad and glad and mad. there are so many things you can learn about. but you'll miss the best things if you keep your eyes shut. | you can learn to read and play a hut-zut if you keep your eyes open. but not with them shut. | 0.45 |
| i can read with my left eye. i can read with my right. i can read mississippi with my eyes shut tight. | i can read in red. i can read in blue. i can read in pickle color too. | 0.38 |
| young cat! if you keep your eyes open enough, oh, the stuff you will learn! the most wonderful stuff! you'll learn about fishbones and wishbones. you'll learn about trombones, too. you'll learn about jake the pillow snake and all about foo-foo the snoo. | you can learn to read and play a hut-zut if you keep your eyes open. but not with them shut. | 0.37 |
| i can read with my left eye. i can read with my right. i can read mississippi with my eyes shut tight. | i can read in bed. and in purple. and in brown. i can read in a circle and upside down! | 0.28 |
| you can read about hoses and how to smell roses and what you should do about owls on noses. | you can learn about the price of ice. | 0.28 |
| i can read in bed. and in purple. and in brown. i can read in a circle and upside down! | mississippi, indianapolis and hallelujah, too. i can read them with my eyes shut! that is very hard to do! | 0.26 |
| you can read about hoses and how to smell roses and what you should do about owls on noses. | you can learn about sad and glad and mad. there are so many things you can learn about. but you'll miss the best things if you keep your eyes shut. | 0.26 |
| young cat! if you keep your eyes open enough, oh, the stuff you will learn! the most wonderful stuff! you'll learn about fishbones and wishbones. you'll learn about trombones, too. you'll learn about jake the pillow snake and all about foo-foo the snoo. | you'll learn about ice. you can learn about mice. mice on ice. and ice on mice. | 0.20 |
| you can read about anchors. and all about ants. you can read about ankles! and crocodile pants. | you can learn to read and play a hut-zut if you keep your eyes open. but not with them shut. | 0.14 |
| you can learn to read and play a hut-zut if you keep your eyes open. but not with them shut. | you can read about trees and bees and knees. and knees on trees! and bees on threes! | 0.13 |
| you can learn about sad and glad and mad. there are so many things you can learn about. but you'll miss the best things if you keep your eyes shut. | you can read about hoses and how to smell roses and what you should do about owls on noses. | 0.13 |
| you can read about trees and bees and knees. and knees on trees! and bees on threes! | you can learn about sad and glad and mad. there are so many things you can learn about. but you'll miss the best things if you keep your eyes shut. | 0.12 |

TABLE 16-continued

Similarity between profile and a target.

| Profile Text | Target Text | Similarity |
| --- | --- | --- |
| but it's bad for my hat and makes my eyebrows get red hot. so reading with my eyes shut i don't do an awful lot. | you can learn about sad and glad and mad. there are so many things you can learn about. but you'll miss the best things if you keep your eyes shut. | 0.11 |
| you can learn about sad and glad and mad. there are so many things you can learn about. but you'll miss the best things if you keep your eyes shut. | the more that you read the more things you will know. the more that you learn, the more places you'll go. | 0.09 |
| so that's why i tell you to keep your eyes wide. keep them wide open at least on one side. | you can learn to read and play a hut-zut if you keep your eyes open. but not with them shut. | 0.08 |
| i can read in bed. and in purple. and in brown. i can read in a circle and upside down! | and when i keep them open i can read with much more speed. you have to be a speedy reader 'cause there's so, so much to read! | 0.08 |
| you can read about hoses and how to smell roses and what you should do about owls on noses. | you'll learn about ice. you can learn about mice. mice on ice. and ice on mice. | 0.08 |
| and when i keep them open i can read with much more speed. you have to be a speedy reader 'cause there's so, so much to read! | i can read in bed. and in purple. and in brown. i can read in a circle and upside down! | 0.07 |
| so that's why i tell you to keep your eyes wide. keep them wide open at least on one side. | you can learn about sad and glad and mad. there are so many things you can learn about. but you'll miss the best things if you keep your eyes shut. | 0.07 |
| you can read about trees and bees and knees. and knees on trees! and bees on threes! | you'll learn about ice. you can learn about mice. mice on ice. and ice on mice. | 0.06 |
| you'll learn about ice. you can learn about mice. mice on ice. and ice on mice. | you can read about hoses and how to smell roses and what you should do about owls on noses. | 0.06 |
| you might learn a way to earn a few dollars. or how to make doughnuts or kangaroo collars. | you can learn about the price of ice. | 0.05 |
| you might learn a way to earn a few dollars. or how to make doughnuts or kangaroo collars. | you can read about hoses and how to smell roses and what you should do about owls on noses. | 0.05 |
| you can learn about the price of ice. | if you read with your eyes shut you're likely to find that the place where you're going is far, far behind. | 0.04 |
| you'll learn about ice. you can learn about mice. mice on ice. and ice on mice. | you can read about trees and bees and knees. and knees on trees! and bees on threes! | 0.04 |
| young cat! if you keep your eyes open enough, oh, the stuff you will learn! the most wonderful stuff! you'll learn about fishbones and wishbones. you'll learn about trombones, too. you'll learn about jake the pillow snake and all about foo-foo the snoo. | the more that you read the more things you will know. the more that you learn, the more places you'll go. | 0.04 |
| you can learn about the price of ice. | you might learn a way to earn a few dollars. or how to make doughnuts or kangaroo collars. | 0.04 |
| you can learn about the price of ice. | young cat! if you keep your eyes open enough, oh, the stuff you will learn! the most wonderful stuff! you'll learn about fishbones and wishbones. you'll learn about trombones, too. you'll learn about jake the pillow snake and all about foo-foo the snoo. | 0.03 |
| you can read about anchors. and all about ants. you can read about ankles! and crocodile pants. | and when i keep them open i can read with much more speed. you have to be a speedy reader 'cause there's so, so much to read! | 0.03 |
| you'll learn about ice. you can learn about mice. mice on ice. and ice on mice. | if you read with your eyes shut you're likely to find that the place where you're going is far, far behind. | 0.02 |

TABLE 16-continued

Similarity between profile and a target.

| Profile Text | Target Text | Similarity |
|---|---|---|
| you might learn a way to earn a few dollars. or how to make doughnuts or kangaroo collars. | you can learn to read and play a hut-zut if you keep your eyes open. but not with them shut. | 0.02 |
| but it's bad for my hat and makes my eyebrows get red hot. so reading with my eyes shut i don't do an awful lot. | and when i keep them open i can read with much more speed. you have to be a speedy reader 'cause there's so, so much to read! | 0.02 |
| young cat! if you keep your eyes open enough, oh, the stuff you will learn! the most wonderful stuff! you'll learn about fishbones and wishbones. you'll learn about trombones, too. you'll learn about jake the pillow snake and all about foo-foo the snoo. | you can learn about the price of ice. | 0.02 |
| mississippi, indianapolis and hallelujah, too. i can read them with my eyes shut! that is very hard to do! | you can learn about the price of ice. | 0.02 |
| you can learn to read and play a hut-zut if you keep your eyes open. but not with them shut. | if you read with your eyes shut you're likely to find that the place where you're going is far, far behind. | 0.02 |
| you can learn to read and play a hut-zut if you keep your eyes open. but not with them shut. | you might learn a way to earn a few dollars. or how to make doughnuts or kangaroo collars. | 0.01 |
| you can read about anchors. and all about ants. you can read about ankles! and crocodile pants. | but it's bad for my hat and makes my eyebrows get red hot. so reading with my eyes shut i don't do an awful lot. | 0.01 |
| you can read about hoses and how to smell roses and what you should do about owls on noses. | young cat! if you keep your eyes open enough, oh, the stuff you will learn! the most wonderful stuff! you'll learn about fishbones and wishbones. you'll learn about trombones, too. you'll learn about jake the pillow snake and all about foo-foo the snoo. | 0.01 |
| you might learn a way to earn a few dollars. or how to make doughnuts or kangaroo collars. | you can read about trees and bees and knees. and knees on trees! and bees on threes! | 0.01 |
| you might learn a way to earn a few dollars. or how to make doughnuts or kangaroo collars. | you can learn about sad and glad and mad. there are so many things you can learn about. but you'll miss the best things if you keep your eyes shut. | 0.01 |
| the more that you read the more things you will know. the more that you learn, the more places you'll go. | you can learn about the price of ice. | 0.01 |
| you'll learn about ice. you can learn about mice. mice on ice. and ice on mice. | so that's why i tell you to keep your eyes wide. keep them wide open at least on one side. | 0.01 |
| you can learn about the price of ice. | mississippi, indianapolis and hallelujah, too. i can read them with my eyes shut! that is very hard to do! | 0.01 |
| you can read about anchors. and all about ants. you can read about ankles! and crocodile pants. | i can read in bed. and in purple. and in brown. i can read in a circle and upside down! | 0.01 |

Computational Cost

An estimate concerning the number operations required to compute a similarity measure is now discussed. Suppose that one has already computed a profile, and has decided to retain k components in the profile. Recall that this means that these are stored: k eigenvalues, k left eigenvectors, and k right eigenvectors. Each eigenvector can have up to k non-zero elements, but note that in practice the sparseness of the transition probability matrix leads to the eigenvectors being sparse as well.

The cost of computing the similarity of a k component profile against an n word target text is as follows. It takes O(n) operations (O denotes big-O the order of magnitude of the operation) to tokenize and parse the target text. Each operation is relatively inexpensive, and consists of forming new tuples and tokens as they are encountered. In addition, tally the occurrence of each tuple-token pair. The result of parsing is a sparse representation of the transition probability matrix.

Computing the similarity entails 2*k vector-matrix operations, where each vector matrix operation is a k-vector against a k-by-n sparse matrix, or O(2*k*k) operations, or simply O(k^2). Notice that because the k-by-n matrix is sparse, a non-zero term only arises when there is a tuple in the eigenvector that matches a tuple in the matrix, or when there is a token in the eigenvector that matches a token in the matrix.

Adding the contribution of the parsing cost O(n) and the similarity computation cost O(k^2), one gets the overall cost of O(n)+O(k^2) to compute a single similarity measure.

In practice, it is possible to reuse the results of the parsing step for several similarity computations. For example, parse an email, contract, or patent document once to compute the sparse transition matrix, and apply the similarity computation for many candidate profiles to determine the best match. In other words, the cost to run an n-token target text against m possible profiles, each of which uses k components has the following cost:

Cost of computing similarity=$O(n)+O(m*k^2)$,

Where n=number of tokens in the target input
m=number of profiles to compare against
k=number of components in each profile.

Additional Applications

Term Value Extraction

Discussed below is an example of one embodiment of the present invention for term value extraction.

Even when contracts are executed in electronic form or are transformed into blocks of machine-readable text using OCR techniques, there remains the problem of extracting the values of terms contained within it. What is the effective date of the contract? When does the contract expire? Who is the supplier? A trained human would have little difficulty answering these questions. Multiply the problem by the hundreds of suppliers that typically serve a large organization and the myriad of existing and expired contracts that reside on file. Consider also the problem of two companies merging their operations, a straightforward business query asks to identify all the common suppliers with expiration dates that have not yet come due. A manual solution to this problem entails significant time and expense, essentially becoming a huge data entry undertaking. Automatic extraction of term values within the raw contract text saves time and money.

In one embodiment of the present invention, this example of an algorithm may be used to extract term values from a block of text.

1. Begin with one or more examples where the term value appears. Use these as the training set.
2. Use the profiling algorithm described earlier in a special way as described here. Choose a window of w words that precedes the term value. Consider the following marker for the effective date in the introductory clause in a contract: [effective-date]. Replace the marker, [effective-date], with the token TT_TV. Tokenize w words that precede the marker, and w words that follow this marker. For example, if w=4, then tokenize the following text block:

is effective on the TT_TV (effective date)

The token TT_TV is used to denote the term value itself. Similarly, (and) are used as tokens to represent the open and close parenthesis, respectively.

3. Compute and save the profile for the text block described above.
4. To extract the effective date from a block of text, perform the following search over the text block, trying out different candidate term values. In particular, a candidate term value can be thought of as starting at the s-th starting token, and proceeding for t tokens. For example, the term value candidate (5,2) consists of the two tokens commencing on the $5^{th}$ token—in other words, the $5^{th}$ and $6^{th}$ tokens.
5. For each possible candidate (s,t) pairs, where s varies from 1, corresponding to the first token, to the Nth token in the target block, and t varying from a length of 1 up to the maximum length the term value is assumed to be, compute the similarity score for each such (s,t).
6. Choose the (s,t)* that gives the largest similarity score.
7. Extract the term value by starting from the s-th token and selecting the next t tokens.

EXAMPLE

Here is an example of some training clauses (a, b, and c).

(a) This Materials and/or Equipment Contract is effective on the [effective-date] (Effective Date) [buyer] a corporation organized and existing under the laws of the state of [buyer-state] (hereinafter Company) and [seller] a corporation organized and existing under the laws of the state of [seller-state] (hereinafter Supplier) . . . [source: Master Materials and/or Equipment]

(b) This Purchase Agreement shall be effective [effective-date]; is made (Agreement Date), by and between [buyer]. (Buyer), a [buyer-state] corporation, having principal offices at [buyer-address] and [supplier], having principal offices at [supplier-address] . . . [source: AGREEMENT Purchasing Short]

(c) This Volume Purchase Agreement (VPA) is made this [effective-date] by and between [buyer], having principal offices at [buyer-address] (buyer) and [supplier] (Supplier), having principal offices at [seller-address] . . . [source: volume purchase agreement]

Shown in FIG. 5 is a target clause with the desired business term values underlined.

Shown in Table 17 is what the algorithm obtained as the extracted business term values.

TABLE 17

Results of the term extraction procedure.

| | |
|---|---|
| Effective date | ☐22nd day of January 2003☐ ☐ |
| Seller | ☐Advanced Tire Products Inc a☐ |

Quick Similarity Searching

Discussed below are several embodiments of the invention illustrating similarity searching. The present invention is not limited to only these embodiments.

Assume that a contract has been transformed into machine-readable form. Each clause now needs to be matched with its closest counterpart in an existing library of contract clauses. In one embodiment of the invention, a straightforward, albeit brute-force, approach to this problem may be used which computes the similarity score of each of the M clauses in the target contract against each of the N clauses in a standard clause library.

In another embodiment of the invention the approach here may be used to solve this search problem in substantially M*log(N) time, instead of the M*N time of the straightforward approach. This approach involves pre-computing an indexing structure around the profiles and proceeds thusly:

1. Start with N text blocks.
2. Given a target text block T. The goal is to find the closest text block of T among the N text blocks.
3. Concatenate the N blocks to form a single text block.
4. Compute the profile of the single block.
5. Obtain the C<=N eigenvalues from the profile, and sort them by their magnitude. Call them w.0, . . . , w.C−1, where w.0 is the eigenvalue with the largest magnitude.
6. For each of the N text blocks t.i, compute the transition probability matrix, b.i.

7. Starting from the largest eigenvalue w.0, compute the partial sum, s.i for each text block.

$$s.i = u.\text{transpose}.0 * b.i * v.0$$

8. Each of the s.i is a complex number in the complex plane. Partition the complex plane down the imaginary axis, the half with non-negative real part and the other half with negative real part. Each of the s.i will fall on one side or the other. Count the fraction f that falls on the non-negative real part side. One may say that there is a sufficiently good partitioning of the n points, if the fraction f falls within a predetermined range [0.3, 0.7] for example. If there is a good partitioning, then select left and right eigenvalue pair corresponding to w.0 as the "partitioning component."
9. If w.0 does not yield a good partitioning, then proceed to the eigenvector with the next largest magnitude. Do this iteratively until the k-th left/right eigenvector pair that yields a good partition is found. This is the partitioning component.
10. In practice, there will always be a largest component k. This follows from the properties of how the principal component analysis technique chooses the eigenvectors in the first place, or this follows from the definition of the left and right eigenvectors themselves.
11. Once the partitioning component is determined, use it to partition the n text blocks into the each respective half-plane.
12. Take each subset of text blocks and repeat the steps 3-11 above.
13. Repeat this procedure on each subset until each subset contains only one text block. In essence the final partition computes the specific profile for that sole text block T.

In another embodiment of the present invention, the technique used for searching relies on the observation than computing a profile is relatively more expensive that computing similarity. Therefore, an approach that computes a profile once and uses it many times is introduced. Computing similarity of a given profile over a larger block of text entails computing the probability transition matrix over the text. In practice the probability transition matrix is sparse, which keeps the memory requirement from growing too rapidly as the text block size increases.

This algorithm exploits the ability of a profile to be used repeatedly over a collection and so is referred to as a shufflesearch.

1. Start with N text blocks.
2. Assume a given target text block T. The goal is to find the block among the N that is most similar to T. Compute a profile for T.
3. Partition the N text blocks into equal sized sets. There are known perfect shuffle algorithms that may accomplish this. Concatenate the text of a given partition into a single block. For convenience, call the resulting blocks red and black. Run the profile for T over red and black. Determine the set that has the higher similarity. Tally a vote for each member of the set scoring the higher similarity.
4. Pick a different partition of the N text blocks. Repeat step 0 until a predetermined number of votes are taken. A good approach is to take more votes for larger size N, such as log(k*N), where k is a small fudge factor.
5. When the votes have completed, sort the N text blocks according to the number of votes that each obtained. Pick the top fraction f of N, where 0<f<1. A value like f=0.5 or f=0.75 works well. Eliminate the bottom 1-f portion of the N text blocks.
6. Repeat steps 0-0, until all but a small number of K text blocks have been eliminated, where K is a small number like 4 or 8.
7. For each of the K remaining text blocks compute the similarity using the profile of T.
8. Sort by similarity. The result is the closest matching text blocks to the target block T.

This technique searches a set of size N in approximately log(N) time. As noted previously, it has the additional advantage that the profile of the target T is computed once and used many times.

This technique has another advantage when the same set of N blocks is searched repeatedly with different targets, which is common in practice. For example, the N blocks might be a list of N company names and incoming blocks of text are different fragments of company names, possibly with misspellings, obtained via optical character recognition. One optimization is to cache the partitions and sub-partitions of the N. In other words, as the search targets T are processed, different partitions of N will be computed. Computing the similarity entails constructing the terms of the probability transition matrix for the concatenated text blocks corresponding to a given partition. Instead of discarding the transition matrix values, save them according to the partition. When memory is finite, a good scheme may be to define a memory quota and to save the most recently used transition matrix values for their partitions. This approach will minimize the number of times that the probability transition matrix will need to be recomputed from scratch.

As an example, the shuffle search technique was used to obtain the most similar matching pages in Table 16, shown earlier.

Text Similarity

In one embodiment of the present invention it may be used as described above to identify similar blocks of text. For example, in the operation of a company it is common to have legal contracts with customers and suppliers. After a contract has been executed, it is common for the paper contract to sit untouched in a filing cabinet. But during the lifetime of the contract, business situations change which may necessitate reviewing the terms of the contract. A company may find it necessary to audit its existing contracts to determine which of them use a particular kind of liability clause, or a certain wording of a termination clause, say, for its suppliers. Or, a company merges with another, and there is suddenly an overlap of contracts between the merging companies with their common suppliers. Finding a particular clause is difficult when the specific wording varies. For example, the word, termination appears in multiple places in a contract. Of those occurrences, a smaller handful of clauses contain the relevant termination clause. Different section titles mark the clause: Termination of an order or Termination of request for services. Even within the body of the clause, one clause may use the phrase, at any time, upon issuance of written notice, while another may state, at any time, without cause, terminate an Order in whole or in part upon written notice.

In one embodiment of the invention, this procedure may be used for identifying the paragraphs in a document, viewed as a collection of text blocks:

1. Assemble paragraphs as text blocks to form the paragraph library.
2. For each text block in the library, compute a profile and save it.

3. Construct a similarity tree as defined previously.
4. Given a target contract to identify, break it into clauses by manual or automatic means. Manual means may be that a person selects the points where one paragraph (clause) ends and the next start. Automatic means may be that the paragraph and section formatting information is used to deduce the end of one clause and the beginning of the next clause.
5. For each paragraph (clause) in the target document, use one of the searching approaches described above to identify the most closely matching clauses.

Generalizations and Extensions

One of skill in the art will appreciate that the prior examples and prior discussion were limited in scope and applicability in order to convey the essence of the present invention in a form that was readily understood. The present invention is not so limited, and so here generalization and extensions of the present invention are discussed.

Any observable process whose behavior can be represented by a sequence of tokens can be parsed and recognized using the techniques described here. It can be seen that a block of text is a special case of a sequence of tokens.

Applications of Technique

HTML/XML as a Sequence of Tokens

For example, a common problem occurs in migrating web content that entails extracting content-rich portions of HTML into XML. It is typical for blocks of content to be represented as tables, or tables nested within tables. Web pages often use tables to create sidebars or related links. The challenge that arises in extracting this content is to recognize occurrences of such tables. An HTML table is a rooted tree of elements. One can apply the similarity techniques described earlier if an HTML table can be converted into a sequence of tokens. Here is one way to do this. Tokenize the HTML beginning from the root. Tokenize each HTML element as a special token for example, <table> is parsed as the token H-table and <tr> becomes H-tr. Tokenize the text contained within and between elements in the same way as normal text parsing. For example, use the techniques described earlier. All closing HTML elements such as </td> and </table> are tokenized as H-END. Consider an example.

Example of an HTML table.

| 1 | 2 |
| 3 | 4 |

In HTML, this is written as,

```
<table>
    <tr><td>1</td><td>2</td></tr>
    <tr><td>3</td><td>4</td></tr>
</table>
```

After tokenization, this is
H-table
   H-tr H-td 1 H-END H-td 2 H-END H-END
   H-tr H-td 3 H-END H-td 4 H-END H-END
H-END Notice that the whitespace does not matter. To make it easy to compare with the original HTML, the same indentation structure was used. Notice how the common H-END token denotes the closing of an HTML element.

By using this approach, HTML similarity can be computed in exactly the same way that the earlier example computed text similarity.

Observed Behavior as Sequence of Tokens

To illustrate the point that many kinds of problems can be recast as a sequence of tokens, if one wanted to study how someone flips channels while watching television, one can represent their behavior as, What channel am I tuned to at time t? One can interpret turning the television off as completing a sentence. A new sentence begins when the television is turned on.

In this application there would be profiles to describe different modes of television watching. There is the profile associated with, Im really captivated by this movie and dont change the channel at all. Another profile might be, Im interested, but every time theres a commercial break, I surf off to another channel to see whats going on. Yet another profile might be, Im really bored, and cannot find anything to watch, so I continuously surf through all the movies that are currently playing.

Extensions

In practice, the Applicant has found that the procedure described above has excellent performance, correctly representing textual similarity in numerical terms. Upon deeper examination of the procedure, it will be noted that it is possible to expand the way that the probability transition matrix a[ ] is computed. For instance, when a history window of h tokens is used to compose a tuple, and the probabilistic transition to the subsequent token, a model of (h+1)-gram token sequences is built. Given a current tuple, the model accounts for the possible transitions to the next word. One possible disadvantage of such a formulation may be the precision itself. The phrases, read in pickle color, and read in colorare entirely different, for example. One approach to compensate for this over-preciseness may be to widen the transition window. Instead of tallying the words that fall exactly in the next position following a given tuple, a somewhat more forgiving model may tally all the words that fall within r tokens of the originating tuple. When r=1 then the model described earlier results. For r>1 one can capture the idea that the transition from the tuple read in to the token color is essentially equivalent in the phrases, read in color and read in pickle color.

By introducing the parameter r for the size of the window to tally transitions from tuple to token, a continuum of models for the underlying token sequence is introduced. As already noted r=1 yields the original model described. Going to the other extreme of very large r, one will note that in the limit $r \to \infty$ encompasses the entire text. And if the text has essentially the same word frequencies throughout, then observe that in the limit, all rows of the transition matrix will tend to converge to the frequency distribution of the words that comprise the text. In other words, the classic word frequency model has been derived. One of skill in the art will appreciate how novel it is to define a general model as was done here that embeds the stationary Markov n-gram model on one extreme (r=1), and the word frequency model at the other extreme ($r=\infty$). Between these extremes, the present invention in various embodiments can adjust the model to represent locality at the phrase level (r=4, for example), or at the sentence level (r=20, for example), or at the paragraph level (r=200, for example). Small values of r will produce very discriminating similarity profiles, while large values of r will yield broadbrush similarity measures.

Nor is this the full range of embodiments of the present invention.

Other embodiments of the present invention are possible. For example, notice that a token transition window of width r, as discussed earlier, is substantially a step function of width r that assigns an equal weight 1/r to a token at the 1, 2, □, r locations. In other embodiments of the invention, it is possible to give greater weight to nearby tokens compared to farther away tokens, by using a transition weight function s(i), where 0<=s(i)<=1, for i=1, □,r, and normalized so that sum (i=1, □,r; s(i))=1.

What is to be appreciated is that embodiments of the present invention are applicable to ANY observable process whose behavior can be represented by a sequence of tokens.

Figure 6:
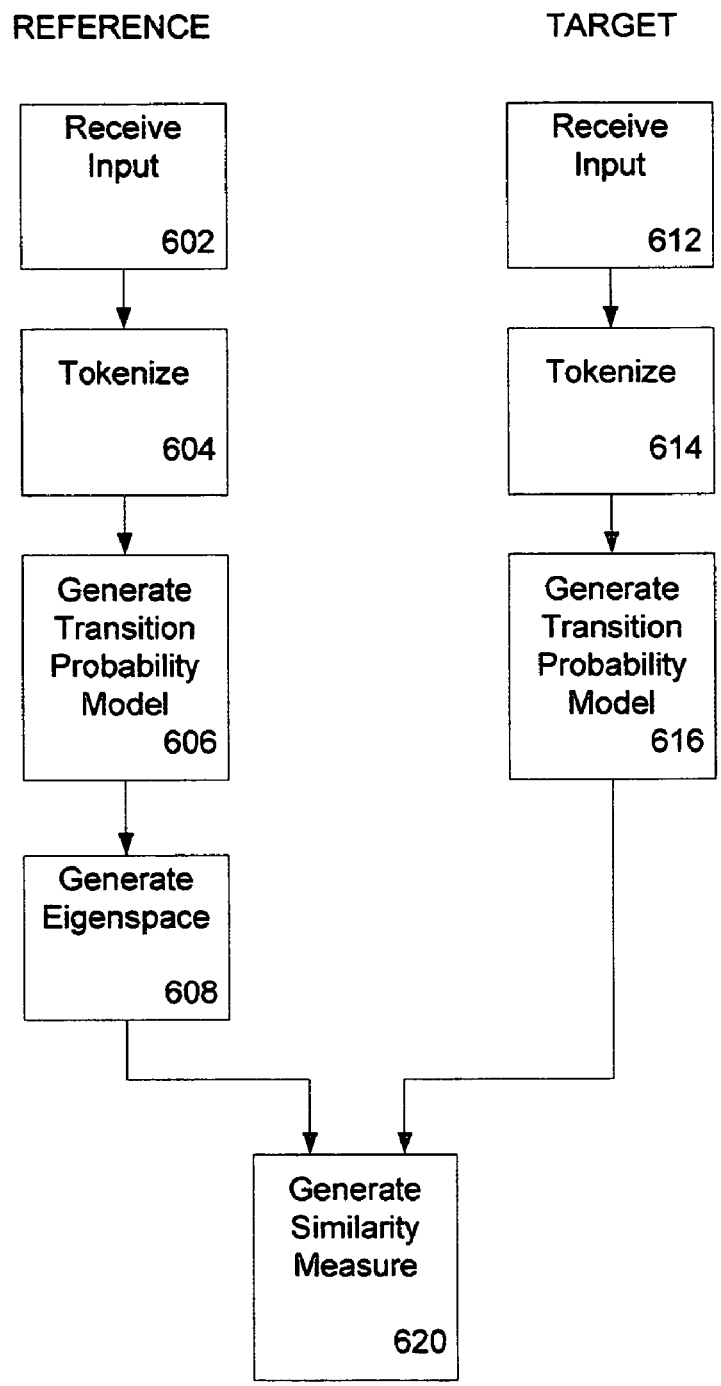
FIG. 6 illustrates one embodiment of the invention in flow chart form.

FIG. 6 illustrates one embodiment of the invention in flow chart form. Two columns of flow are indicated, one for Reference, the other for Target. Reference input is received at 602, at 604 the reference input received at 602 is tokenized. At 606 a transition probability model of the tokens from 604 is generated. At 608 an eigenspace is generated based on the transition probability model from 606. Target input is received at 612, at 614 the target input received at 612 is tokenized. At 616 a transition probability model of the tokens from 614 is generated. At 620 input is received from the eigenspace at 608 and from the transition probability model at 616 and a similarity measure is generated.

In other embodiments, a profile at 608 as represented by an eigenspace may be pre-computed and used to generate a similarity measure 620 against a Target input. In other embodiments, as previously described a shuffle operation may occur, for example, between blocks 614 and 616.

FIG. 7 through FIG. 10 illustrate embodiments of the invention showing two different possible search approaches (denoted Search I and Search II). Both Search I and Search II address a similar problem. Namely, assume that there are NO reference text blocks that are known in advance. If one is then given a target text block T, the problem is to find the most similar block from the N in O(log(N)) time.

Figure 7:
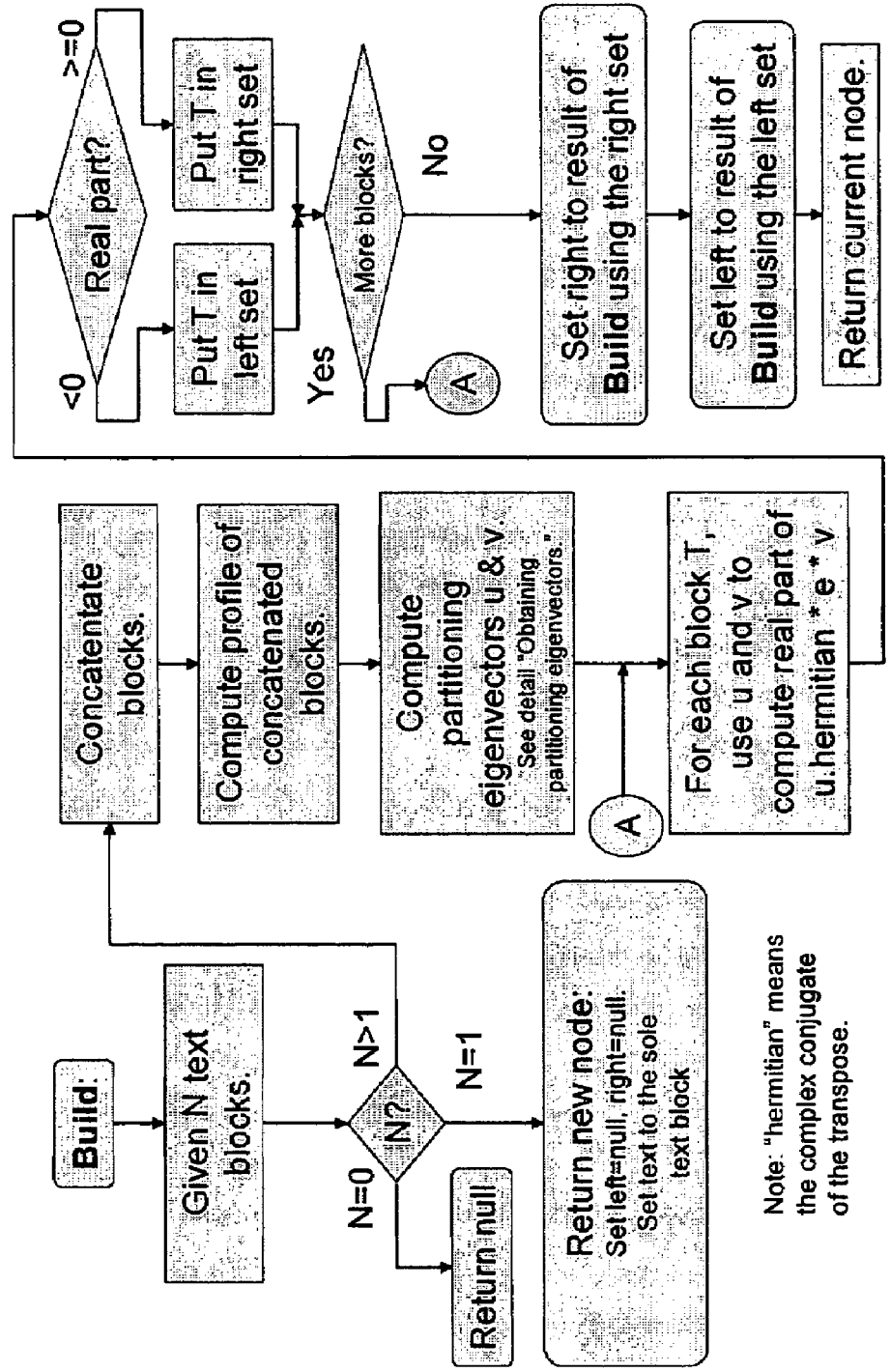
FIG. 7, FIG. 8, FIG. 9, and FIG. 10 illustrate embodiments of the invention showing two different possible search approaches.
Figure 8:
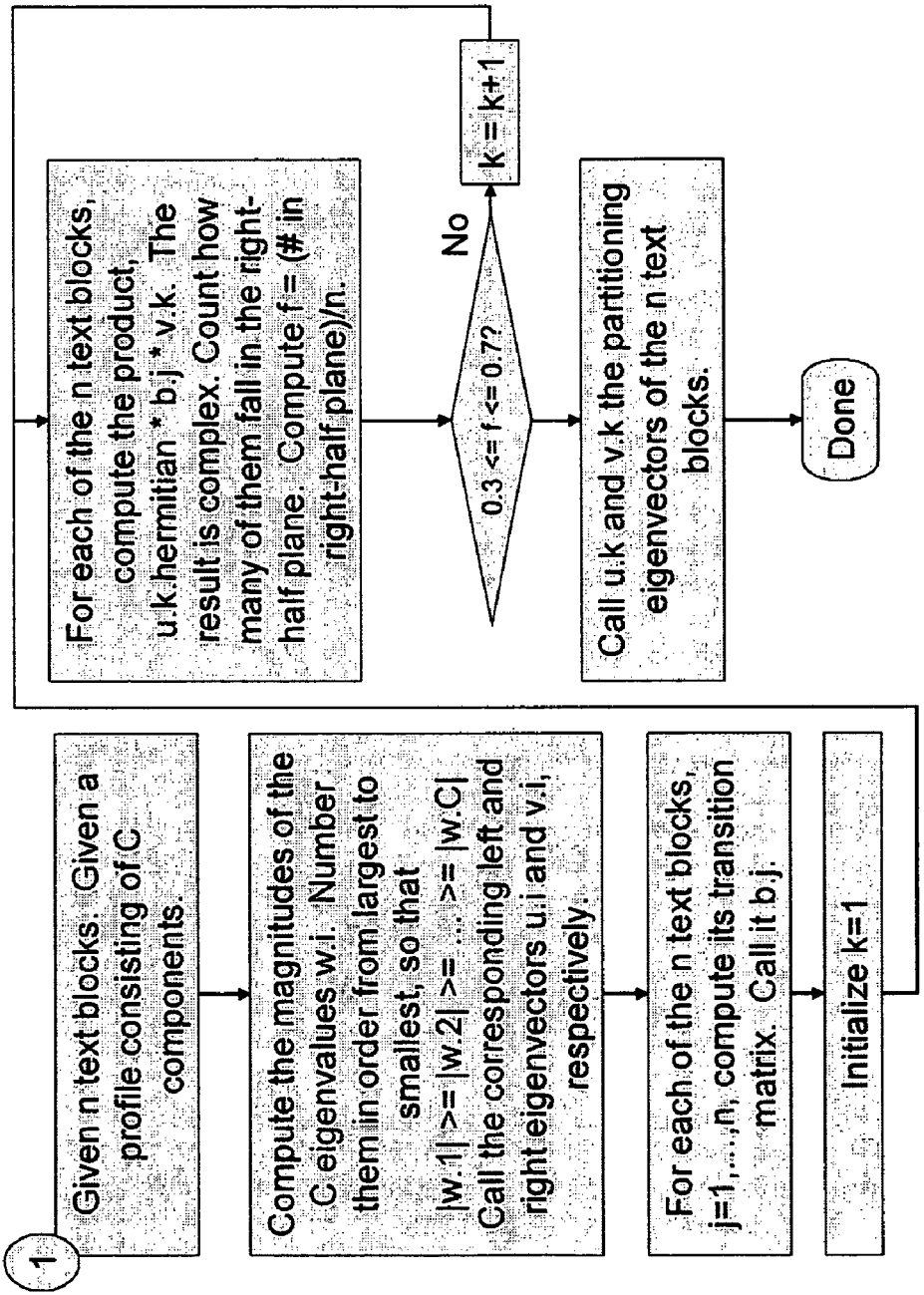
Figure 9:
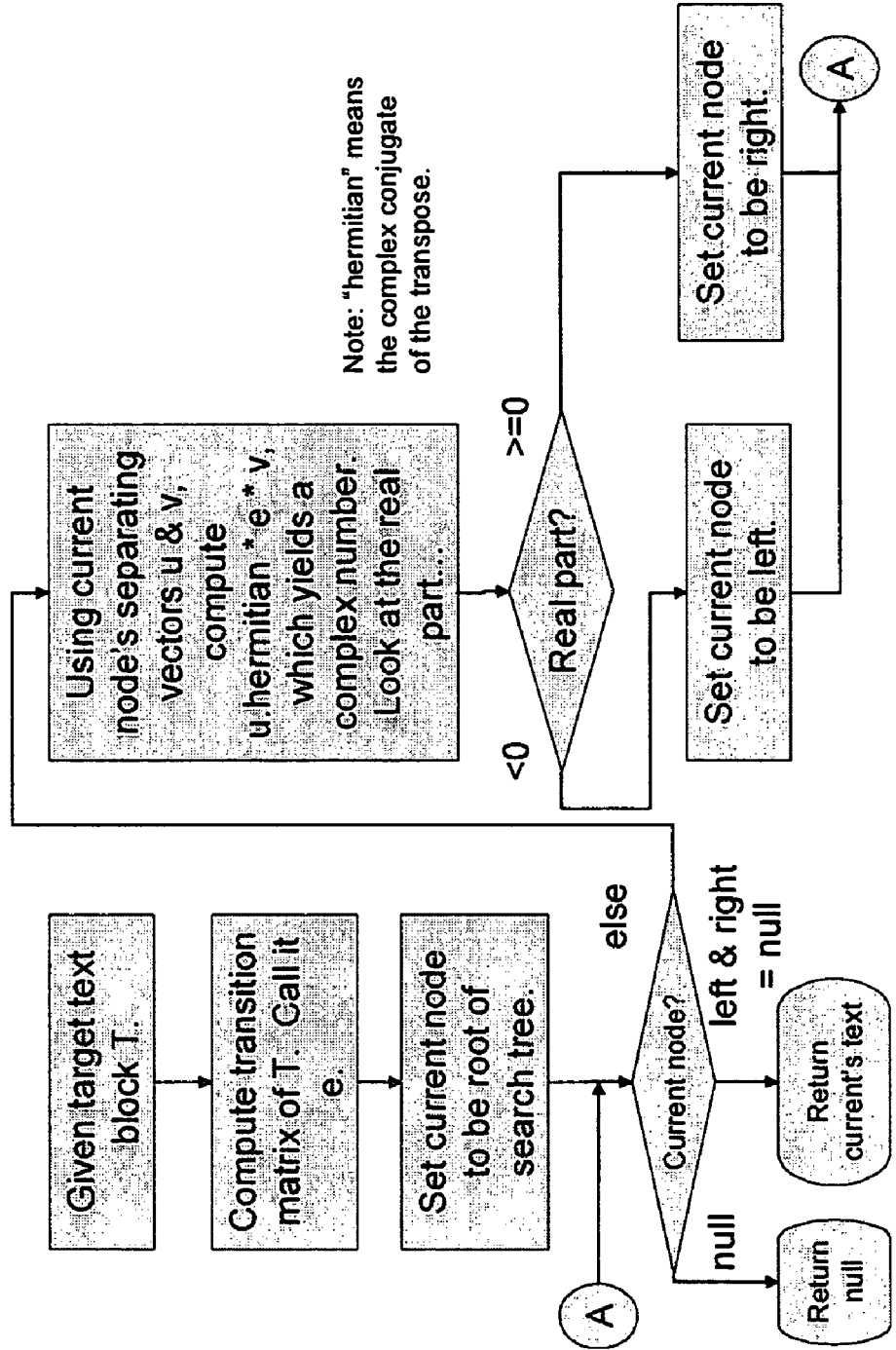

Search I as illustrated in FIG. 7, FIG. 8, and FIG. 9 entails two main phases. In the first phase, is built a binary tree which indexes the text blocks. In the second phase, knowing the target T, one traverses the tree to find the closest matching block.

FIG. 7 illustrates building a binary tree. The idea is to use an left/right eigenvector pair within a profile to partition the set of N blocks into f*N blocks, where f is in the interval [0.3, 0.7]. In general, one wants it to be in 0.5+/− delta, for some delta. So the approach is to concatenate all N text blocks, and to compute a profile of that. Obtain the eigenvalues and arrange them in decreasing magnitude. Starting from the eigenvalue with the largest magnitude, obtain the corresponding left and right eigenvectors u and v. Iterate through the N blocks and compute the transition matrix B. Compute u.hermitian *B*v, which gives a complex number. Use the real component of this complex number to consider a particular block as in the right-half (real part>=0), or as in the left-half (real part<0). Compute f. If f is in the interval 0.5+/− delta, then use the u and v as the separating eigenvectors. Otherwise, go on to the next smaller eigenvalue. Eventually, a suitable u and v are found. This partitions the set of N blocks into two smaller sets.

The approach above is applied to each of the left and right sets. Eventually, the result is singleton sets. In another embodiment, one may say that for some threshold, say 4, to just individually compute the similarity, instead of using the partitioning approach. In either approach the net result is that a binary tree has been built.

FIG. 8 illustrates one embodiment of the invention to obtain partitioning eigenvectors. This approach was described above.

FIG. 9 illustrates one embodiment of the invention showing how to use a binary tree. Given a binary tree built as described earlier, the problem is to find the closest matching reference block. Start from the root, and apply the partitioning eigenvectors at each node in the tree to the transition matrix of the target block T. Use that to the real part of the product u.hermitian *B.T*v to decide whether to go left or right. Continue recursively, until a node is found that just holds one text block. That is the closest match.

Figure 10:
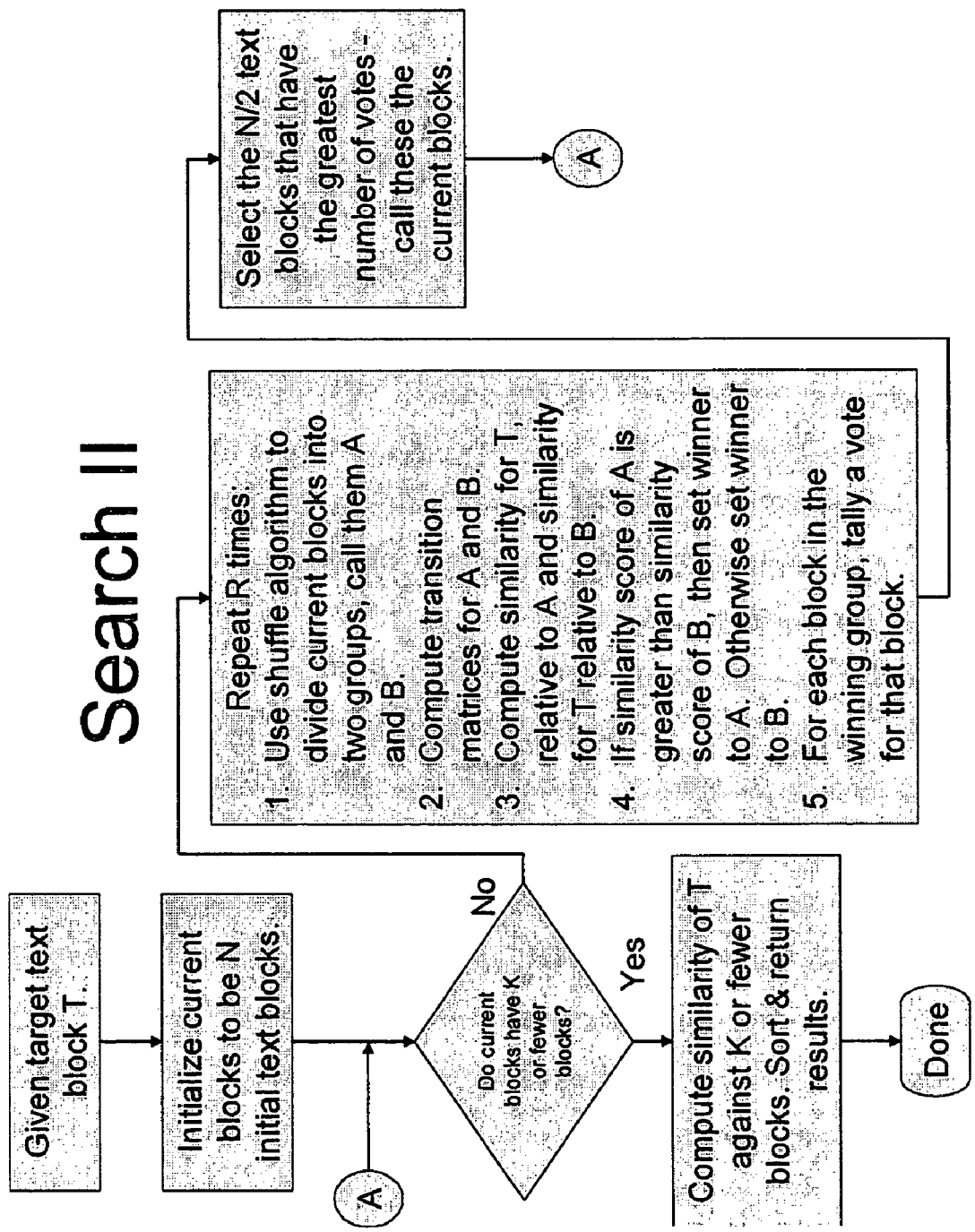

FIG. 10 illustrates on embodiment of the invention showing a search approach denoted Search II. This approach uses the same idea as in Search I, except that instead of computing profiles for the reference blocks, one instead computes a profile of a target block T. For the profiles, use the transition matrices of different aggregations of the N blocks. Take N blocks, shuffle them into two sets; call them A and B. Concatenate each set. Compute a transition probability matrix for each set. Compare T's profile against A and B. If A has a higher similarity score, tally a vote for each member of A. Same thing if B has a higher similarity score. Repeat the random shuffles some number of times R. R is typically a small number like 4 or 8. Or R can be determined dynamically, by seeing when clear winners begin to emerge.

Once the voting has completed, retain the highest vote getters. Say the N/2 reference blocks receive the most votes. Now repeat the procedure using the smaller set. Eventually, one gets K surviving blocks. These are the K most similar blocks. In another embodiment, one can compute the similarity of each of the K to get a detailed ranking of the K blocks.

Figure 11:
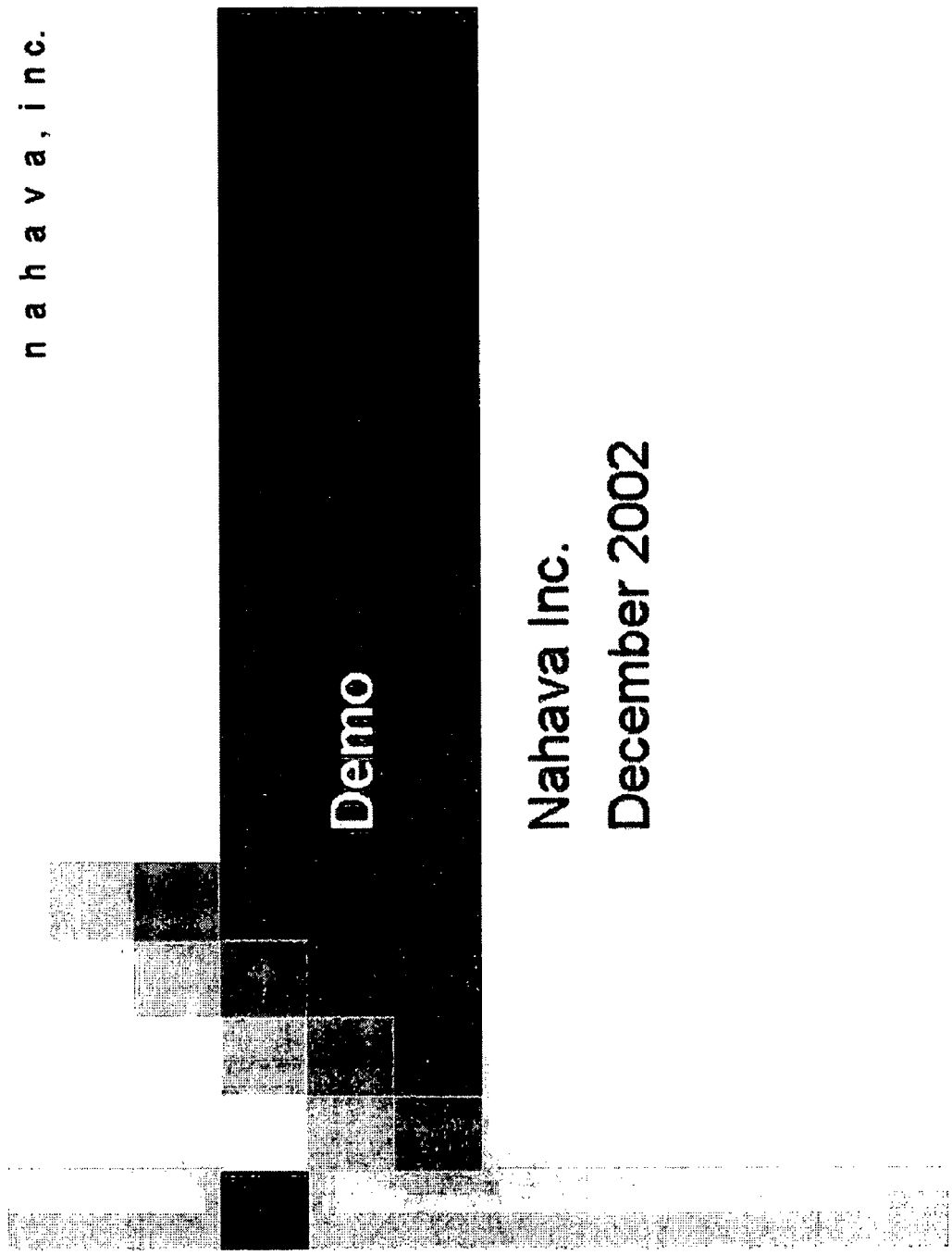
Figure 13:
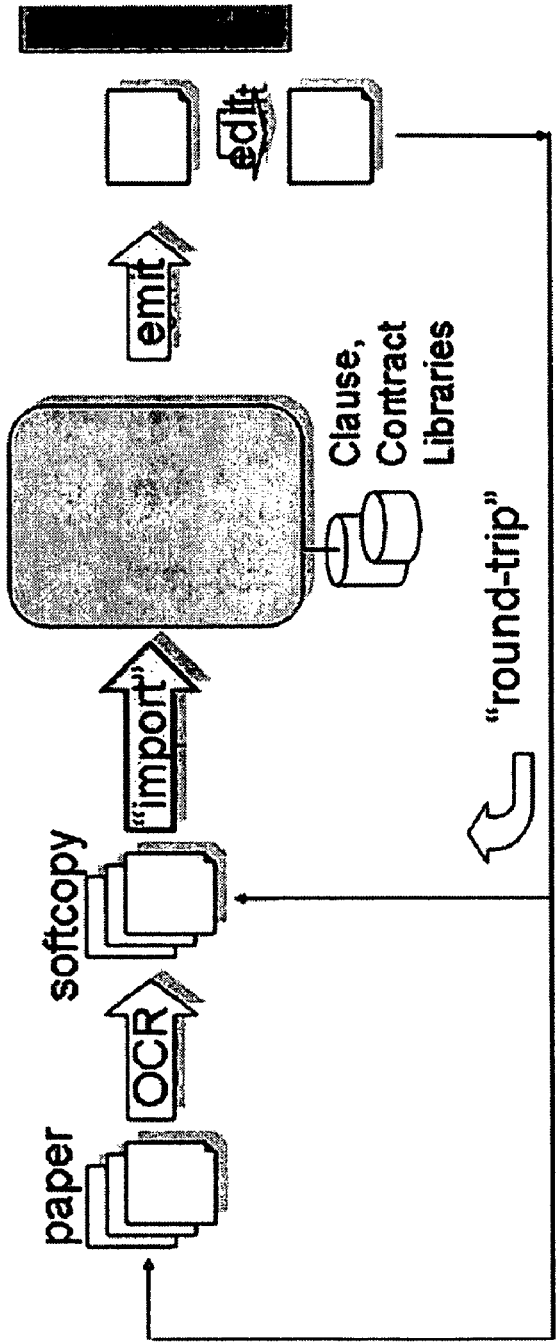
Figure 16:
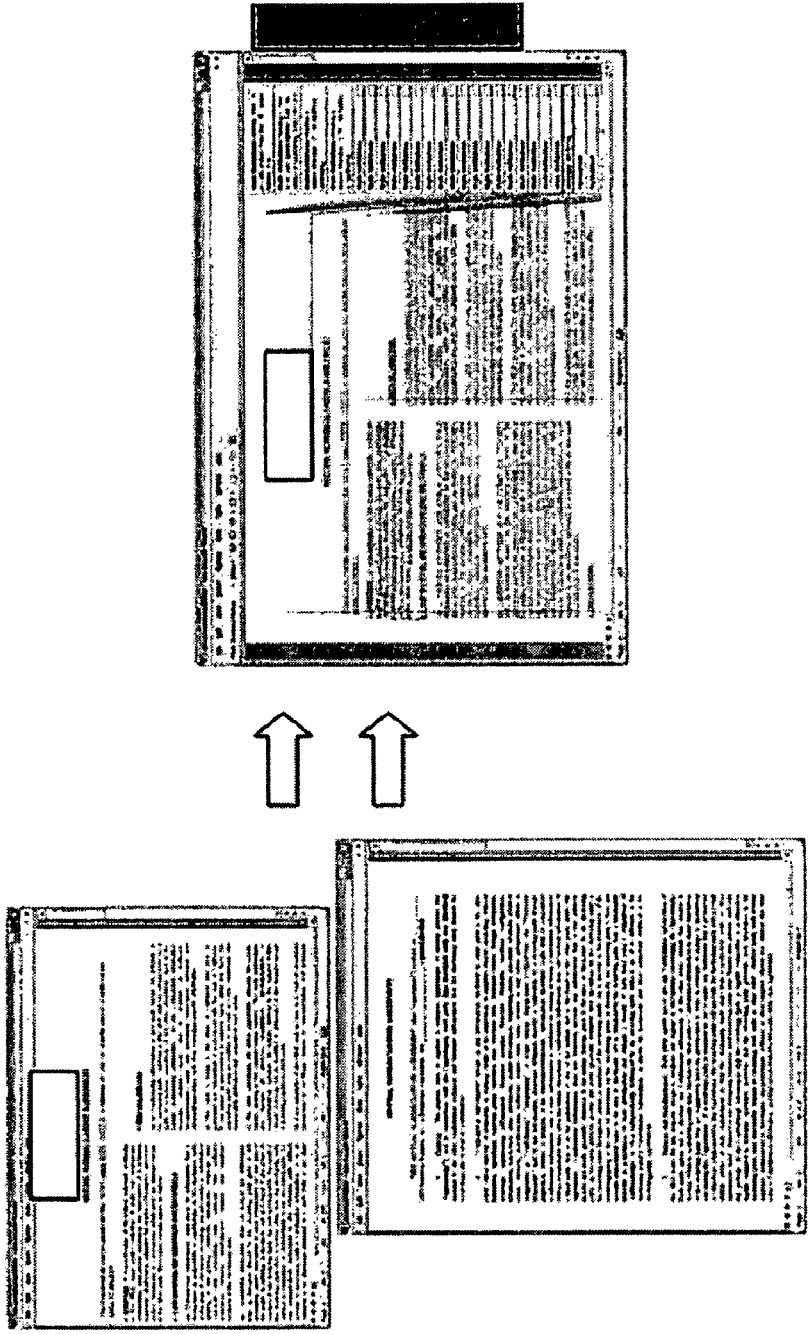
Figure 17:
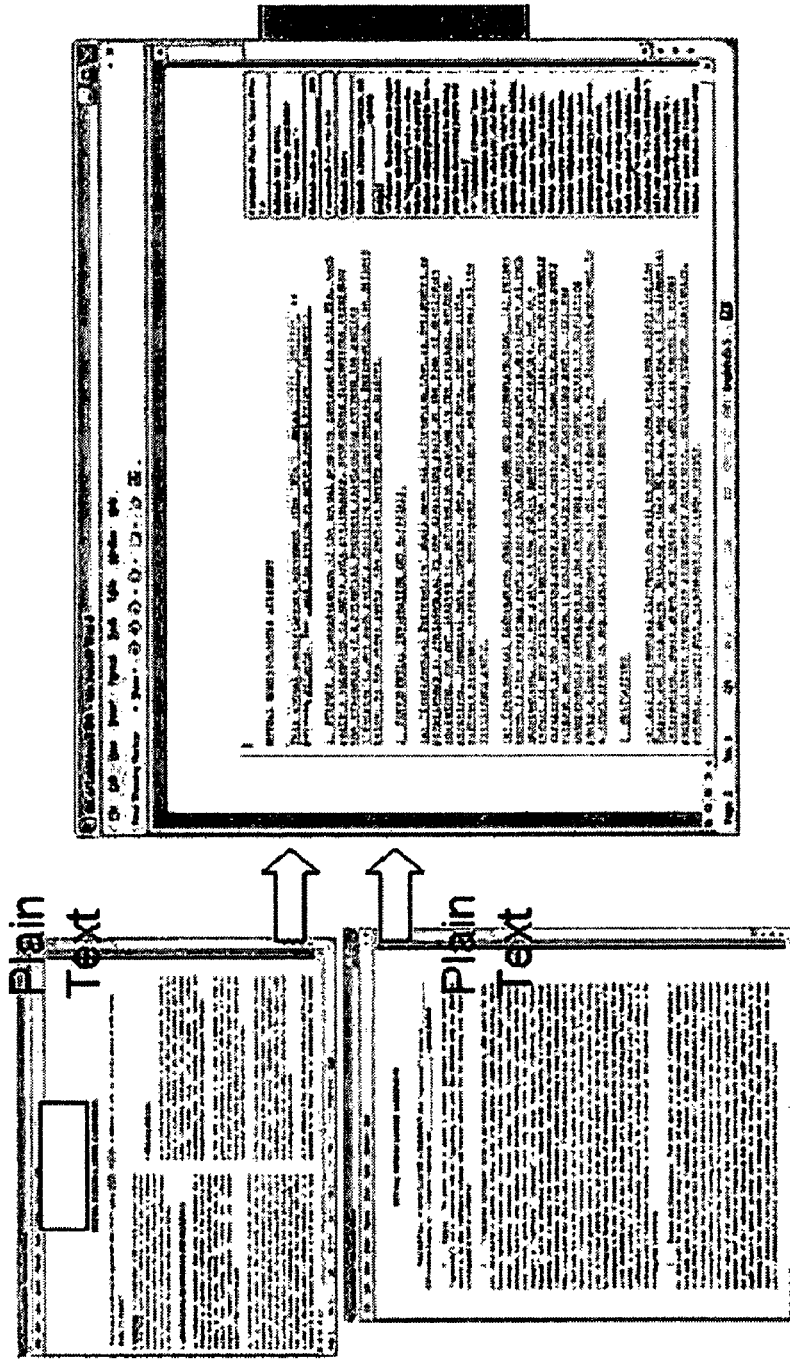

FIG. 11 through FIG. 35 illustrate one embodiment of the invention as a demonstration. FIG. 11 is the title page for demo walkthrough. FIG. 12 states one usage of text similarity is to help import contracts into a management system. FIG. 13 illustrates the flow of contract content, from paper and electronic softcopy into a contract management repository. The repository becomes a source of controlled, indexed clauses which are emitted into a contract document. After editing, the contract can be reimported into the repository. FIG. 14 shows a sample contract that might be imported into the contract management system. FIG. 15 summarizes some of the problems with current approaches. FIG. 16 shows how conventional comparison tools do not handle differences well, such as formatting shown here. FIG. 17 shows that using a comparison tool after pre-converting both inputs to plain unformatted text doesnt improve the comparison.

Figure 18:
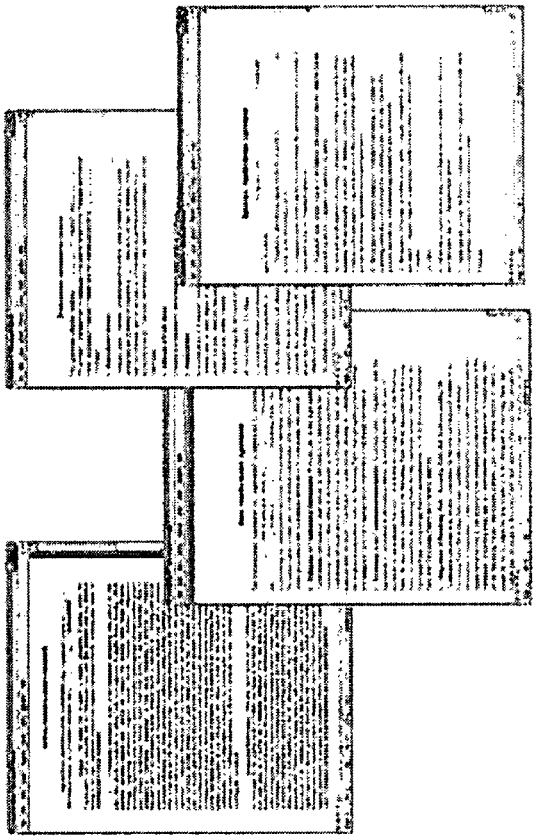
Figure 19:
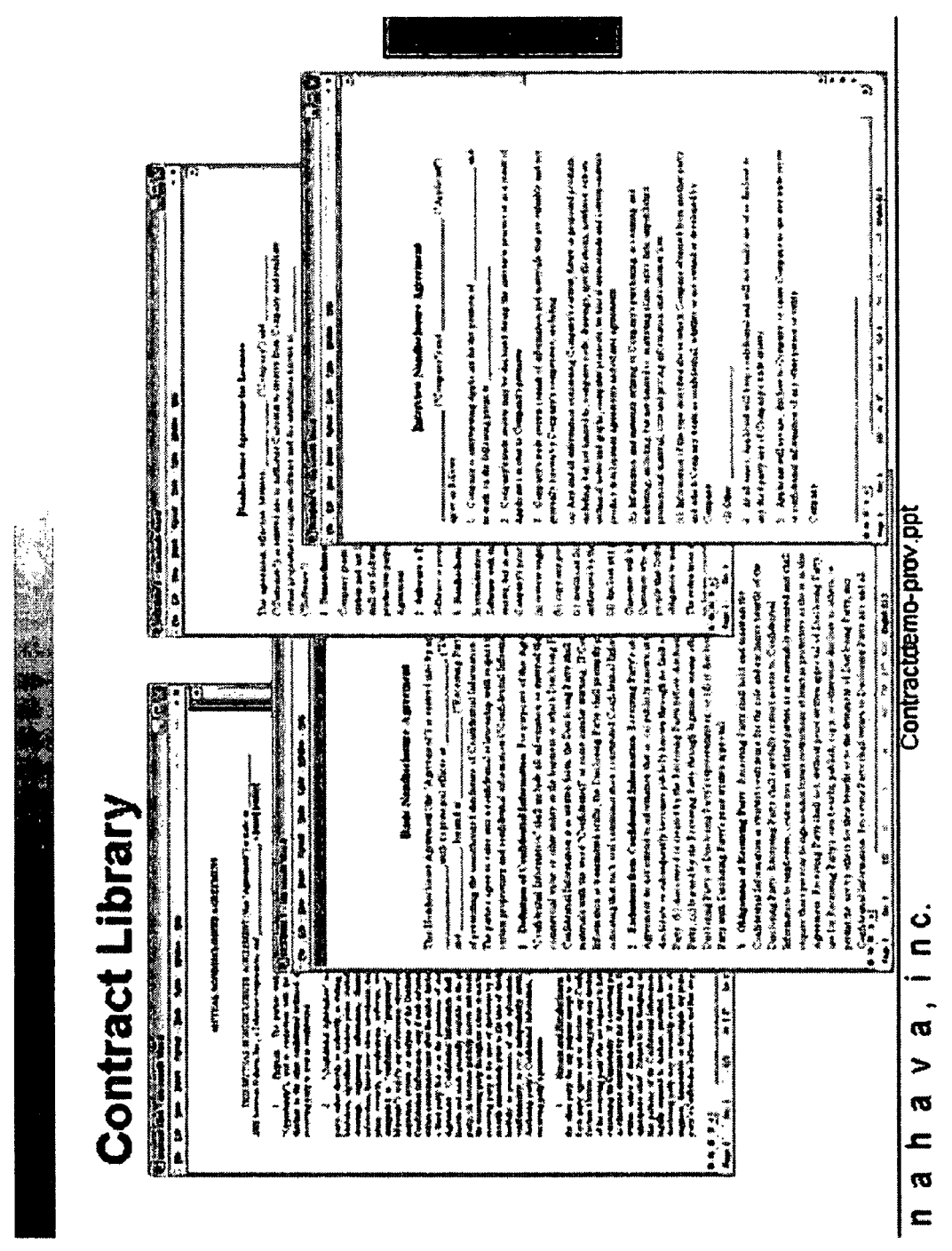
Figure 20:
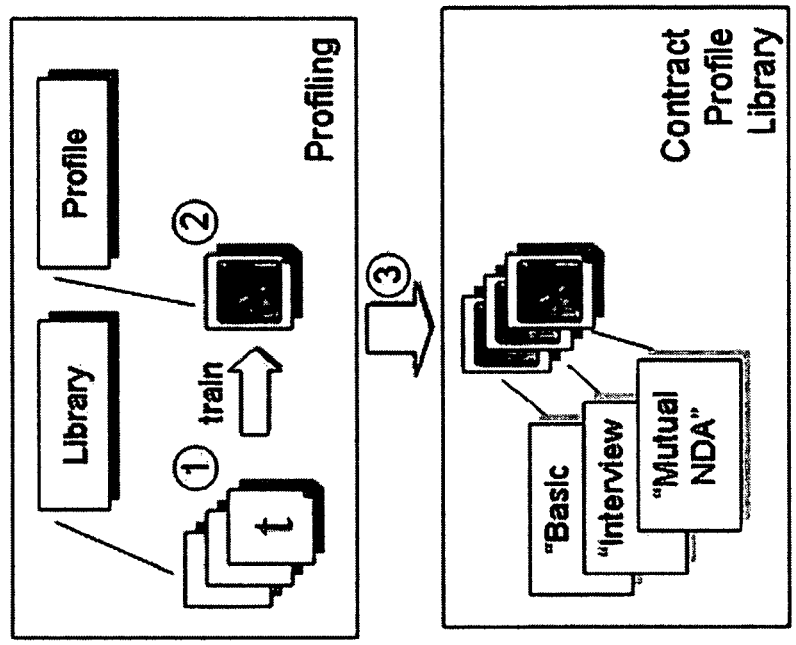
Figure 21:
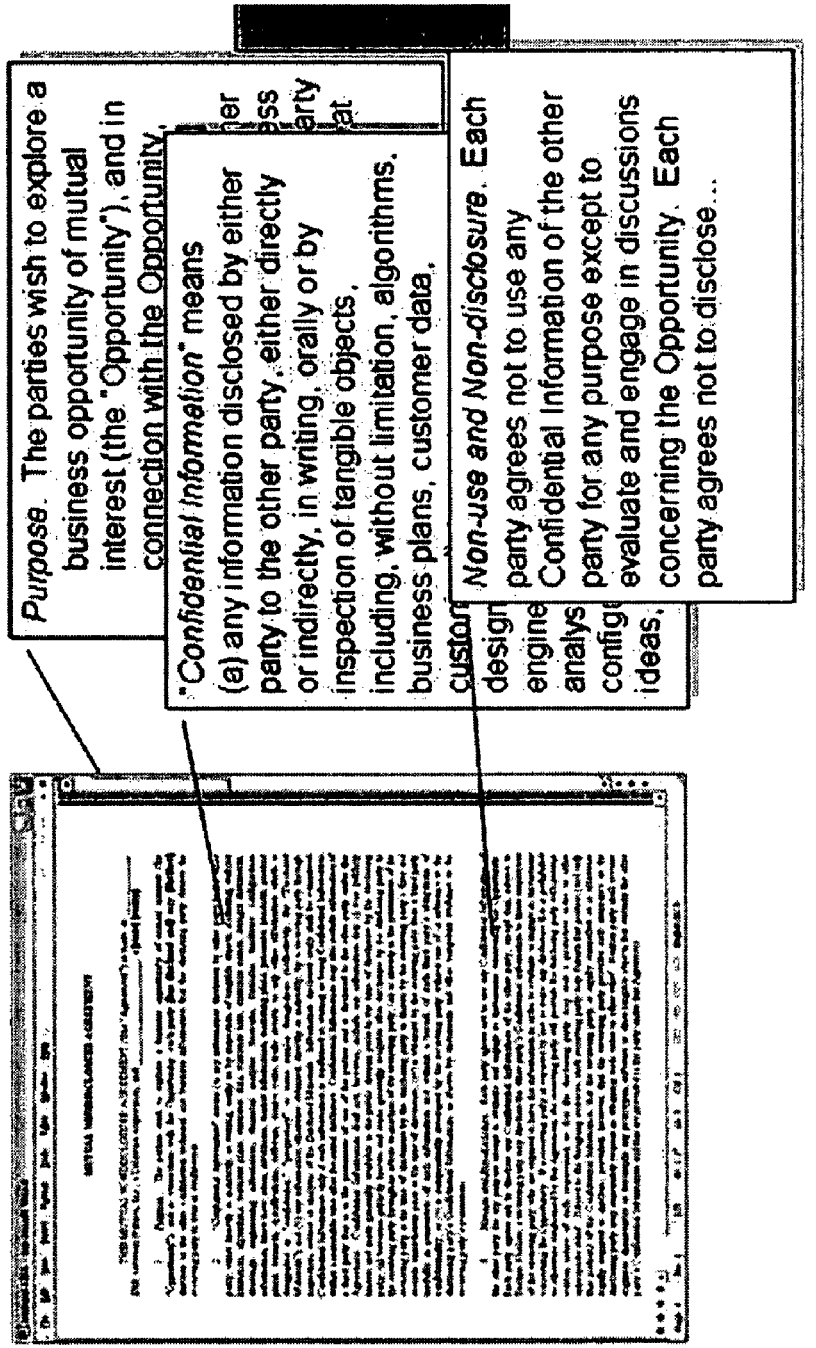
Figure 22:
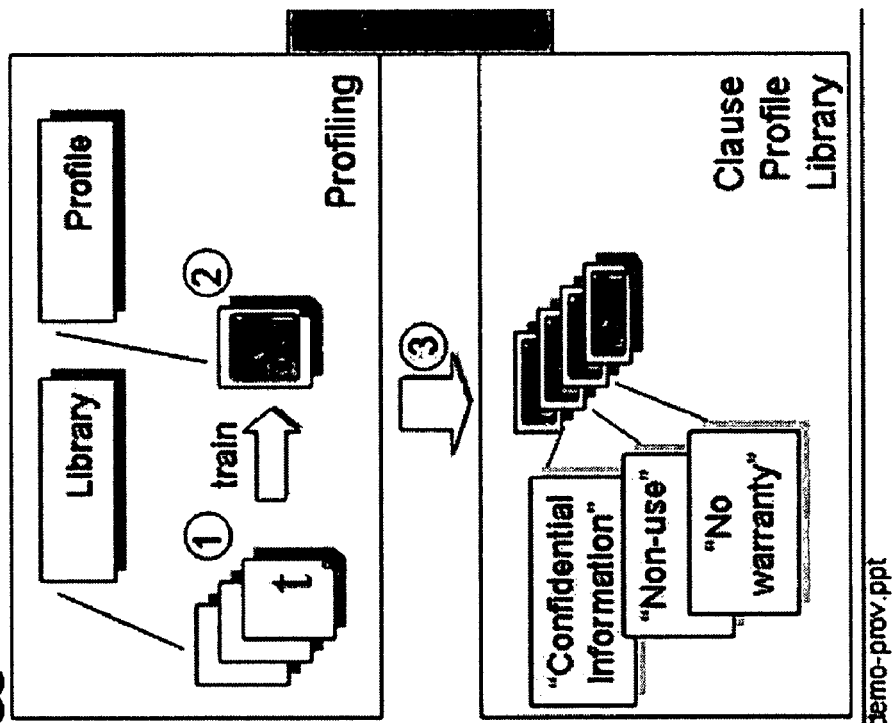
Figure 23:
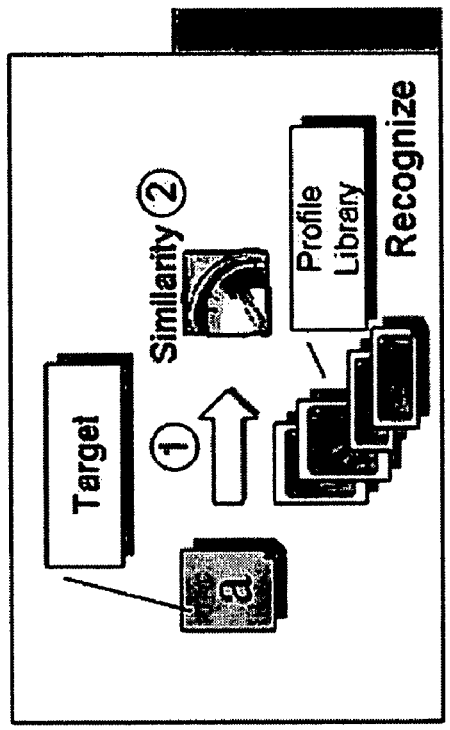

FIG. 18 illustrates how one embodiment of the invention may provide a solution that uses a library of contracts both as whole contracts and as individual clauses. Profiles are computed based on the whole contracts and on the clauses. FIG. 19 shows a sample collection of contracts in the library of contracts, which forms the training set. FIG. 20 shows how to generate profiles based on the contracts in the contract library. FIG. 21 shows how to break contracts down into individual clauses, and construct a library of clauses. FIG. 22 shows how to generate profiles based on the clauses in the clause library. FIG. 23 shows how to recognize a target contract, which is generally a contract not in the contract library, and compute the similarity of the target against pre-computed contract profiles.

Figure 25:
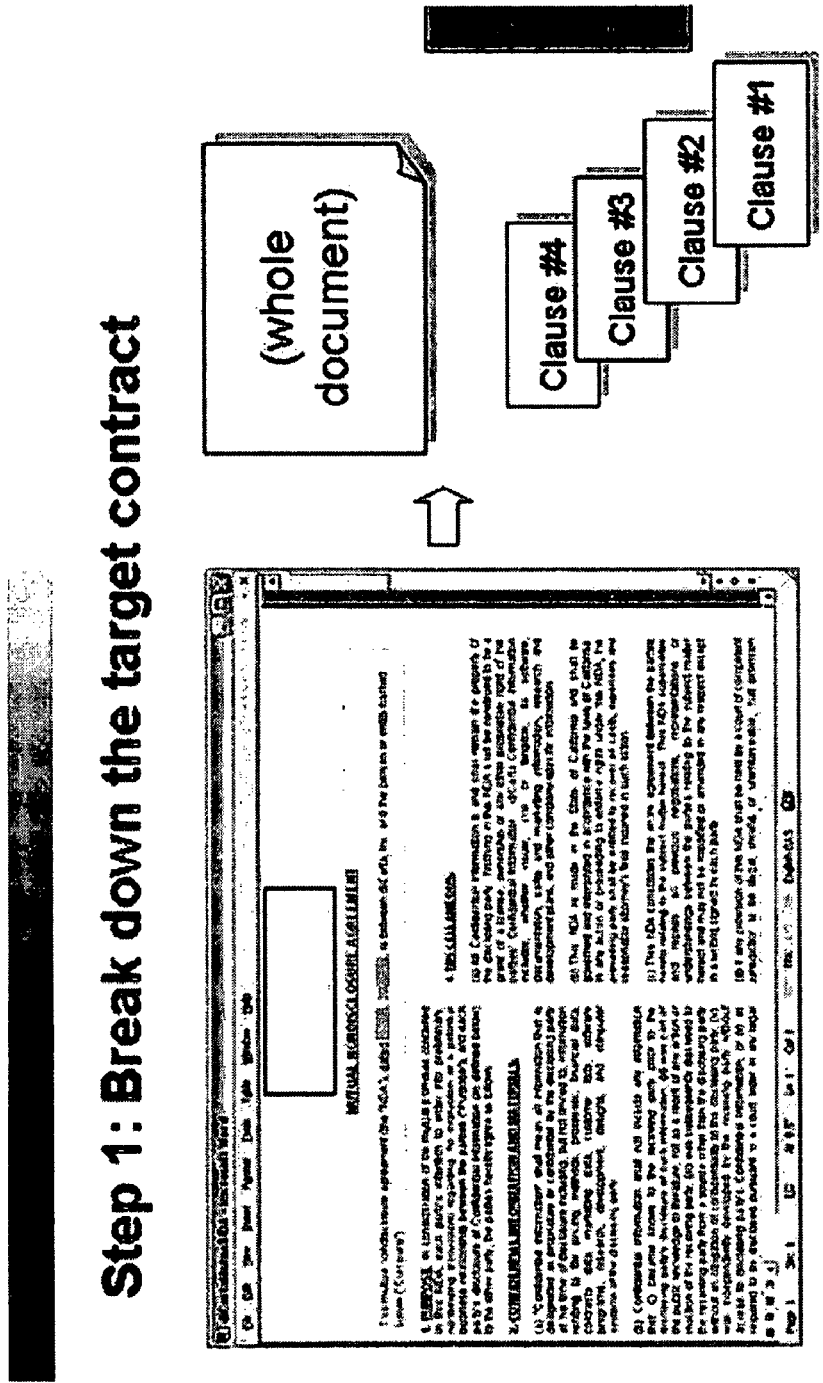
Figure 26:
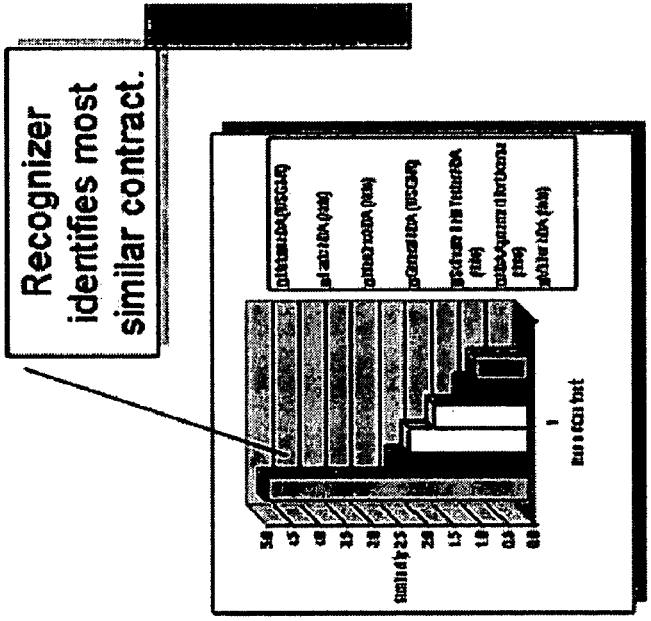
Figure 27:
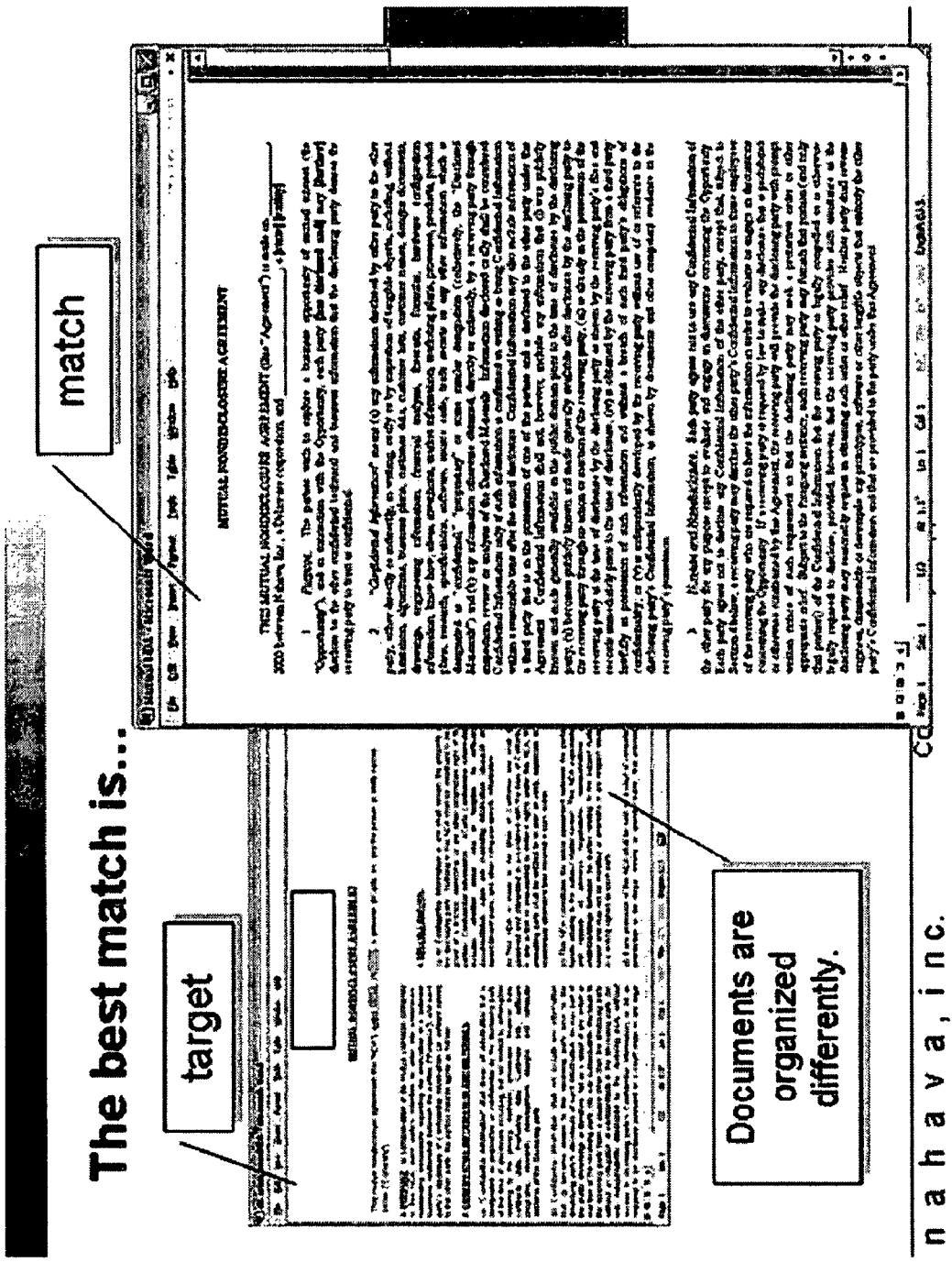
Figure 29:
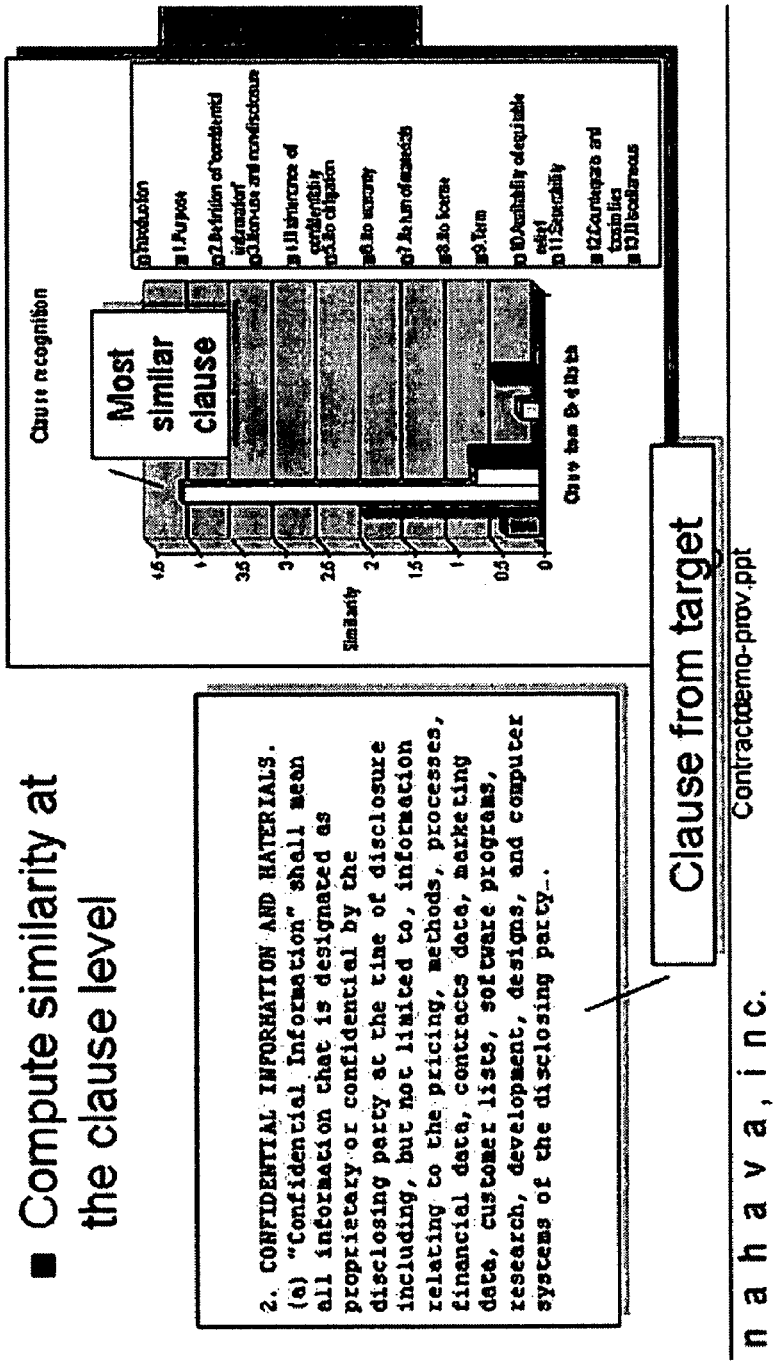
Figure 30:
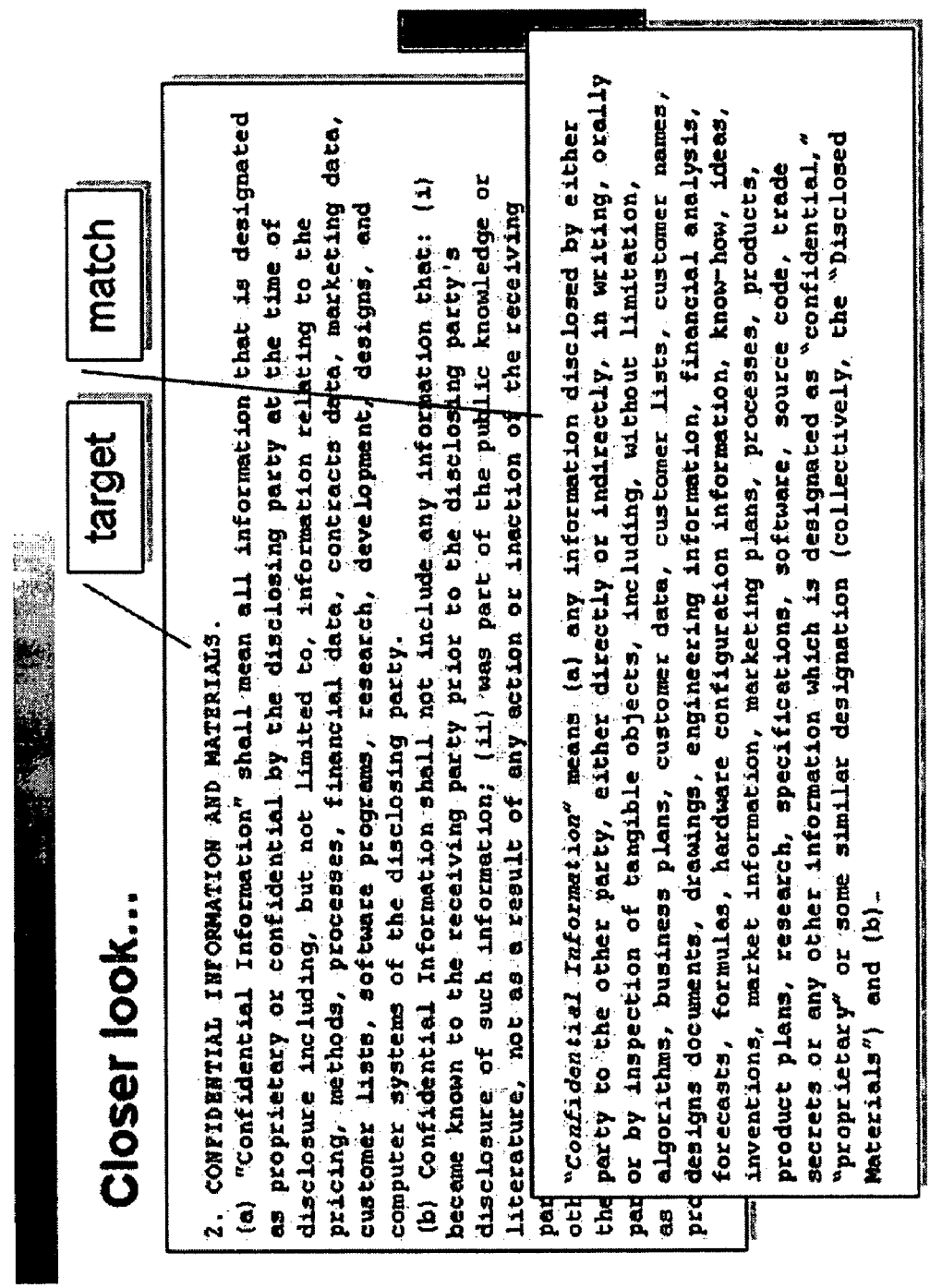

FIG. 24 illustrates an overview that summarizes the main steps of the procedure: compute similarity of the target at the contract level, and then compute similarity of individual clauses of the target at the clause level. FIG. 25 illustrates a target contract being processed as a whole and as individual clauses. FIG. 26 has a graph showing the numerical similarity score of contracts in the library against the target. FIG. 27 illustrates the target contract and its closest match in the library. FIG. 28 shows that the matching contract in the library has a different internal structure from the target contract. FIG. 29 has a graph showing the numerical similarity scores of clauses from the clause library relative to one of the target clauses. FIG. 30 shows the matching clauses—note that neither is a word-for-word match for the other. FIG. 31 shows another clause from the clause library that had a good match against the target clause.

Figure 32:
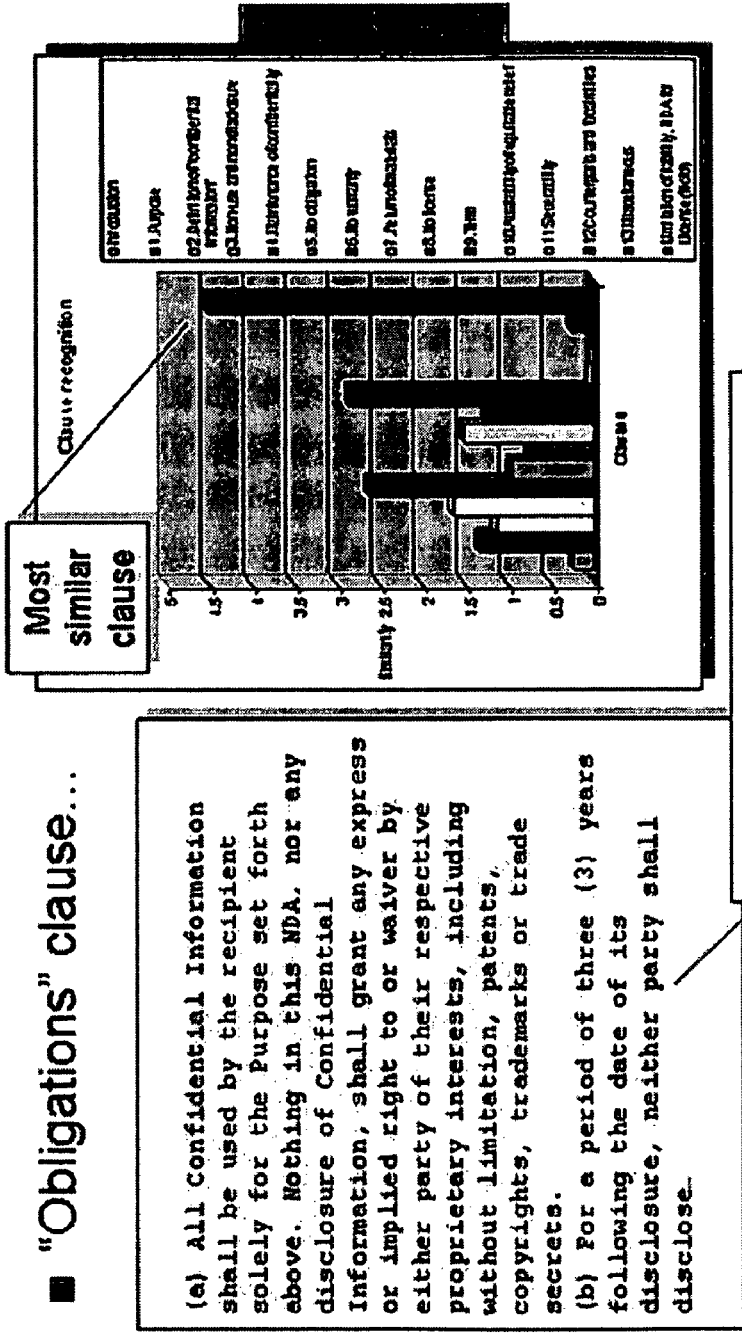

FIG. 32 illustrates a different clause from the target contract, and the numerical similarity scores of clauses from a contract in the contract library. FIG. 33 has a detailed view of the most similar clause in the clause library, where 1, 2, 3, and 4 are labels for the clauses. FIG. 34 shows a comparison of the previous figure with the target clause where 1, 2, 3, and 4 are labels for clauses that most correspond to those of the previous figure. FIG. 35 summarizes the main points—build a contract library and compute similarity of a target at the contract level and at the clause level.

Figure 36:
Figure 39:
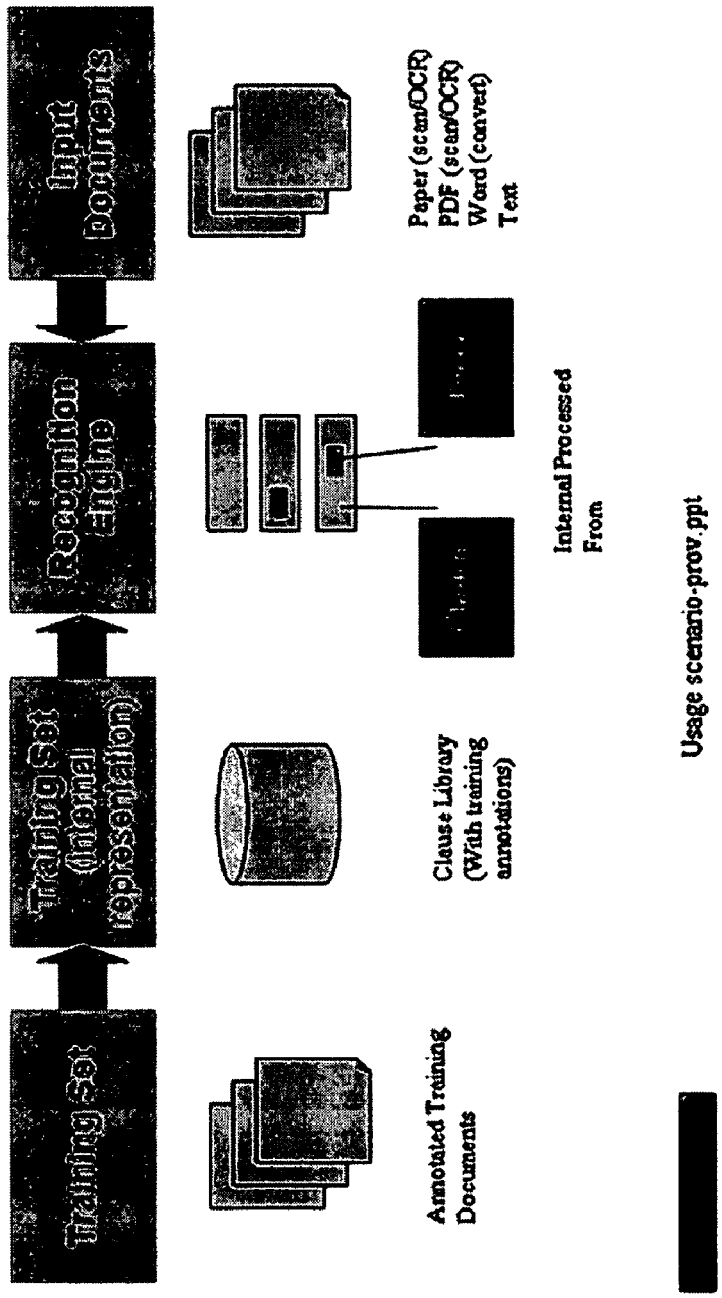

FIG. 36 is a cover sheet from a scenario walkthrough. FIG. 37 shows a clause that has been annotated with markers for the locations where business term values (BTV) occur as does FIG. 38. FIG. 39 shows the overall flow of data-annotated training documents on the left, input contracts on the right, which are processed by the recognition engine to compute similar clauses and to extract BTV's.

Figure 42:

FIG. 40 is a cover sheet from a overview of the business term value (BTV) extraction technology. FIG. 41 indicates the internal status of various embodiments of the invention as of Jan. 24, 2002. FIG. 42 illustrates the overall process flow of the BTV procedure. FIG. 43 shows an example of a clause that has been annotated with BTV markers (also referred to as "tags"). FIG. 44 shows a training set for BTVs that occur within the introduction clause in a contract. FIG. 45 is an example of a target clause—the goal will be to extract the BTVs contained within this clause. FIG. 46 shows the results of the BTV extraction for the "effective date." FIG. 47 is another example of a target clause—the goal is to extract the supplier name. FIG. 48 shows the annotated clauses for the "agreement term" BTV. This is the training set. FIG. 49 shows the results of the BTV extraction for the "agreement term." FIG. 50 lists further embodiments of the invention as of Jan. 24, 2003.

Figure 51:
Figure 53:
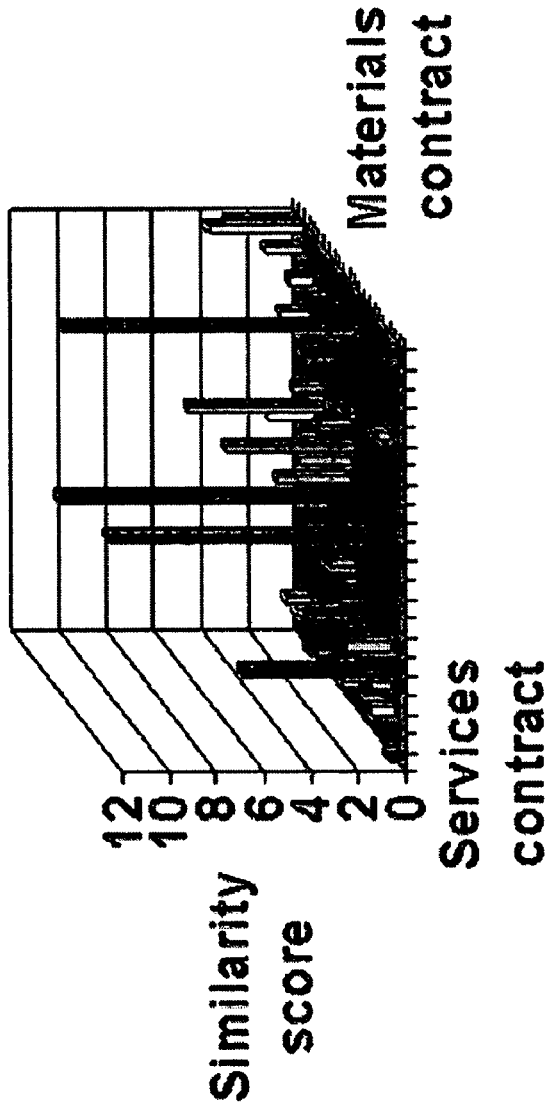
Figure 54:
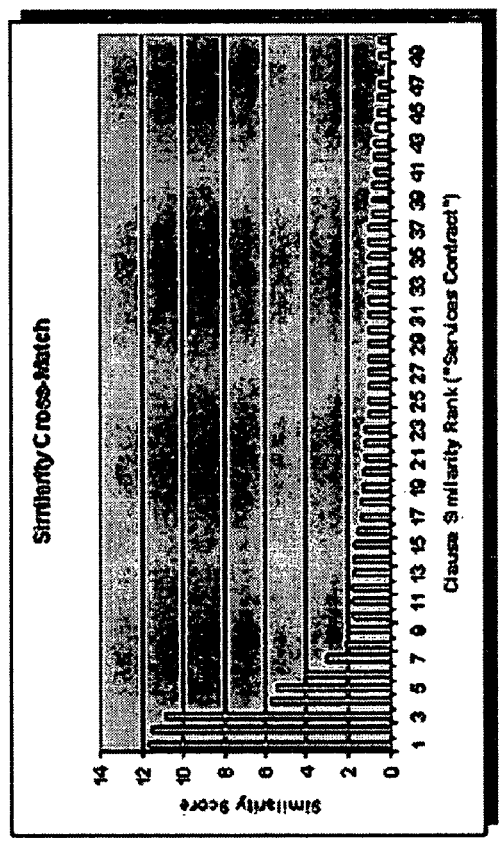
Figure 56:
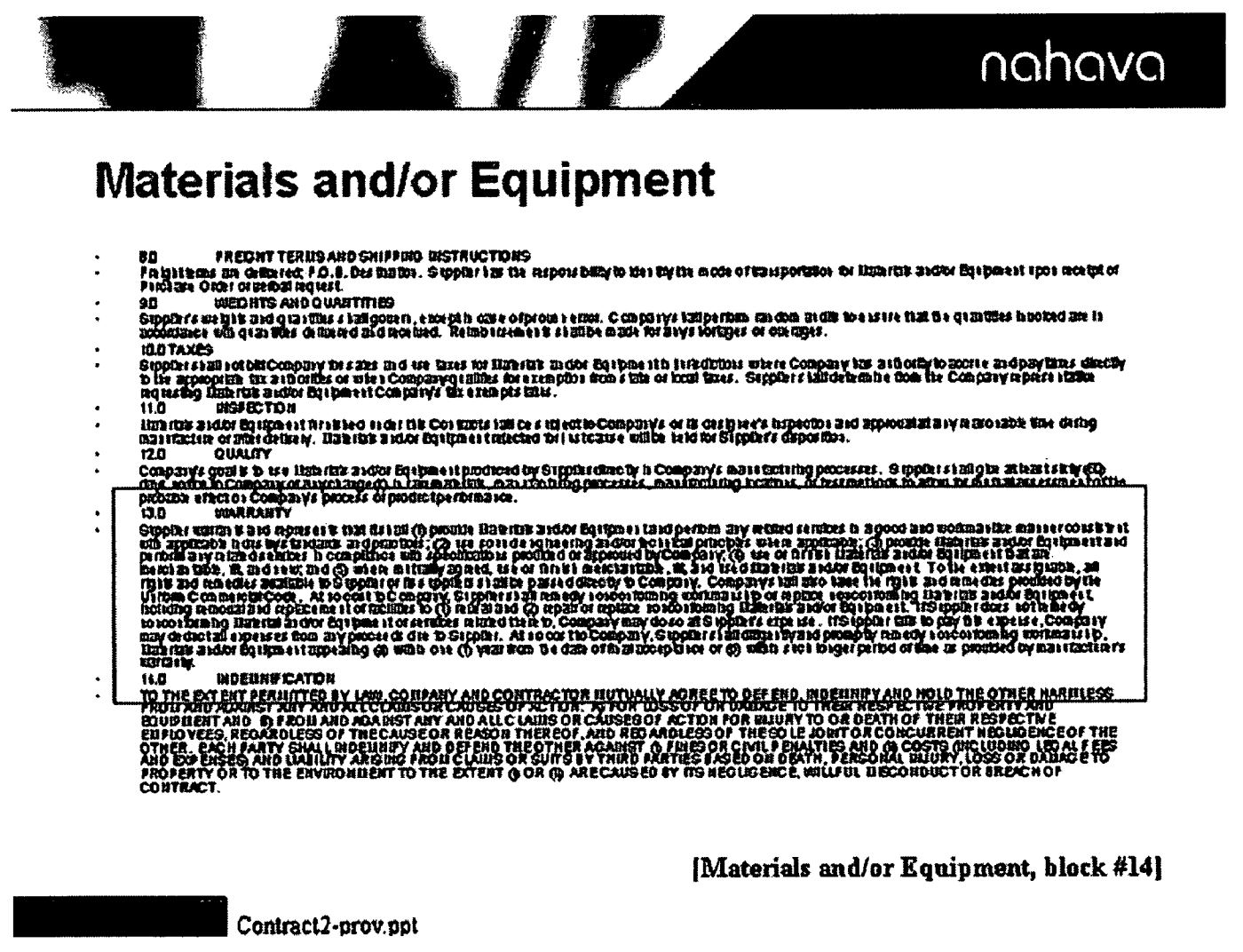

FIG. 51 is a cover sheet for a contract analysis walkthrough. FIG. 52 shows the results of comparing two contracts at the clause level, showing the pairs of clauses that have high similarity scores. FIG. 53 is a graphical representation of the matching pairs of clauses. FIG. 54 is a rank order plot of the clause similarities. FIG. 55 shows a clause from the services contract—it is the warranty clause. FIG. 56 shows the most similar clause from the materials contract, relative to the previously shown clause. FIG. 57 shows another clause from the materials contract that was also similar to the warranty clause in the services contract.

FIG. 58 shows another clause from the services contract—it contains the term and termination clauses. FIG. 59 shows the most similar clause from the materials contract. FIG. 60 shows a clause from the services contract which is similar. FIG. 61 shows a similar clause from the materials contract.

FIG. 62 is an example of a target clause for which a BTV extraction will be done. FIG. 63 shows the results of the BTV extraction: effective date and seller. FIG. 64 is an example of a training clause for the effective date, buyer, seller, and seller state BTVs. FIG. 65 shows more examples of training clauses.

Figure 68:
Figure 69:
Figure 71:

FIG. 66 shows an overview of a procedure to compute similarity of two text blocks. FIG. 67 illustrates one way to tokenize. FIG. 68 shows an example of an input text tokenized. FIG. 69 shows a procedure to compute a profile. FIG. 70 shows the tokens and tuples that result from the n-gram and probability state transition analysis. FIG. 71 shows other operations that may be performed.

FIG. 72, FIG. 73, and FIG. 74 is an XML representation of a profile in one embodiment of the invention. It has sections showing the definitions of the tokens, the tuples, the eigenvalues, the left eigenvectors, and the right eigenvectors. At 1 is a token definition section with 6 tokens (v id="0" through "6"). For example, token "1" is TT_TERM. At 2 is a tuples definition section with 7 tuples (V id="0" through "6"). For example, tuple "4" is show.our. At 3 is an indicator that there are 7 components (10, and others starting at 20, 30 (FIG. 73), 40 (FIG. 73), 50 (FIG. 74), 60 (FIG. 74) and 70 (FIG. 74)). The first component 10 has an eigenvalue 7, left eigenvectors 5, and a right eigenvectors 6 associated with it.

At 7 is an eigenvalue and an indication that there are 9 parts to this first component 10 (component count="9"). Eigenvalue 7 has an imaginary value (eim="0.0"), a magnitude value (ema="1.0000000000000018"), and real value (ere="1.0000000000000018").

Left eigenvectors 5 has five eigenvectors (v id="0", "5", "3", "4", and "6"). Each eigenvector has several parameters listed. For example, at 8 a single eigenvector has:

| | |
|---|---|
| v id = "0" | A tuple identification |
| im = "0.0" | The imaginary part of the eigenvector |
| ma = "0.4472135954999585" | The magnitude of the eigenvector |
| ph = "−3.141592653589793" | The phase of the eigenvector (in radians) |
| re = "−0.4472135954999585" | The real part of the eigenvector |
| sym = "TT_TERM.TT_TERM." | What the tuple identification represents |

Right eigenvectors 6 has four eigenvectors (v id="0", "4", "3", and "5"). Each eigenvector has several parameters listed similar to the left eigenvectors.

FIG. 75 is an XML representation of a null profile.

FIG. 76, FIG. 77, FIG. 78, FIG. 79, and FIG. 80 is another example of an XML representation of a profile.

Thus a method and apparatus for fundamental operations on token sequences: computing similarity, extracting term values, and searching efficiently have been described.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
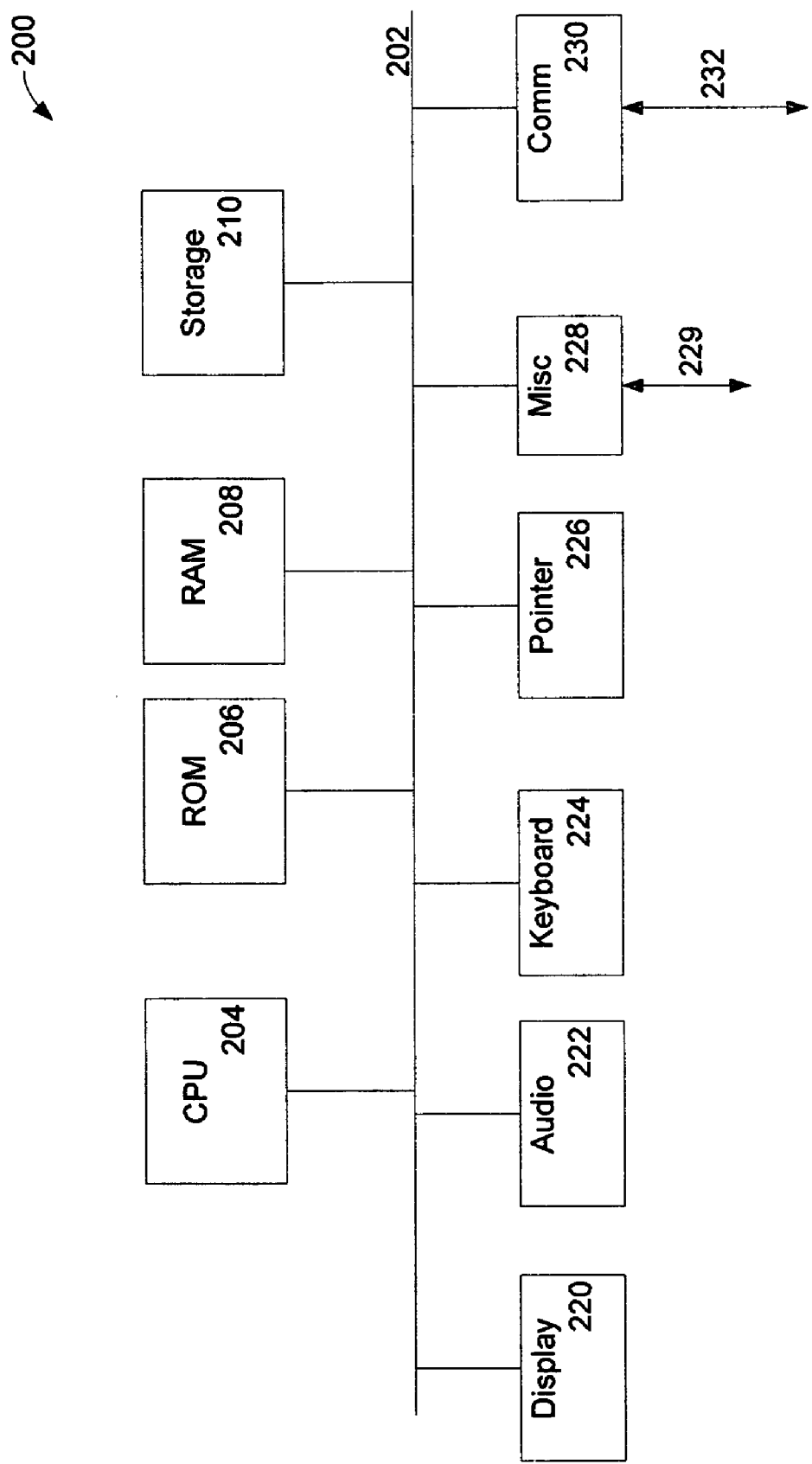
FIG. 2 is a block diagram of a computer system which may be used for implementing some embodiments of the invention.

FIG. 2 illustrates a computer system 200 in block diagram form, which may be representative of any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

As used in this description reference to a transition probability matrix is referring to a transition probability model which is represented in the form of a matrix. To succinctly denote this, transition probability matrix is often used instead of calling it a transition probability model represented as a matrix. Thus, the term transition probability matrix is used to denote a transition probability model which may be represented conveniently as a matrix, however it is not limited to only a matrix representation. What is to be understood is that as used with tokens, the transition probability matrix is a model of a token to another token transition sequence.

As used in this description reference to "eigenspace," "Eigenspace," or similar phrases with reference to a profile of k components refers to k eigenvalues, k left eigenvectors, and k right eigenvectors for such a profile. Thus, the term eigenspace is used to denote the various eigenvalues and eigenvectors associated with a profile. What is to be appreciated is that an eigensystem analysis of a transition probability model transforms the state space of tokens into the eigenspace. As one of skill in the art knows such a transform has admirable qualities such as orthogonal basis elements.

As used in this description reference to "eigensystem analysis," "solving the eigenproblem,"'"singular value decomposition," or similar phrases are to be understood as performing those operations on an eigenspace or space represented in another form so as to yield the results discussed. The terms are used interchangeably and their meaning will be evident to one of skill in the art based on the surrounding context. For example, one of skill in the art will appreciate that solving a square matrix can be formulated as an eigenproblem, while solving a non-square matrix can be formulated as a singular value decomposition problem. In embodiments of the present invention, whether the transition matrix is square or non-square depends on whether the number of tokens happens to equal the number of tuples, and by how much one may reduce dimensionality for practical considerations.

As used in this description reference to "component", "C", or similar phrases with respect to eigenvectors pairs refers to entities that may make up the component. These entities are a real eigenvalue and the corresponding left and right eigenvector pair, or a complex conjugate pair of eigenvalues and a corresponding pair of complex left and right eigenvectors. Thus, an ith component may be represented by (w.i, u.i, vi), where w.i is the ith eigenvalue(s), u.i is the left eigenvector(s), and v.i is the ith right eigenvector(s).

What is to be appreciated is that depending upon the granularity or level of recognition or similarity that one wants, the present invention by allowing a range of arbitrarily tokenized inputs allows for similarity measurements. For example, if an entire document is to be classified as to a major category, for example, Non-Disclosure Agreement (NDA), Purchase Order (PO), or Contract (K) then the target document (X) would be compared to the NDA, PO, and K profiles by the methods described. If the classification is to be, for example, by paragraph, then paragraph profiles of the NDA, PO, and K would be compared to the target paragraphs. What is to be appreciated is that the profiles may be pre-computed and used many times against the more easily generated transition probability model of the target. Additionally, the paragraphs or clauses of the profiled documents and the targets need not be the same nor does the tokenization process or the windowing for the profiles or references need to be the same as for the targets. For convenience in describing the invention, the phrase "clause" may be used to indicate an entire document, a paragraph, or any group of information. Additionally, for ease in understanding the invention, the phrase "text" while often used to indicate actual alphanumeric strings, is not so limited and may more generally be considered any data.

The description of the invention in the discussion has illustrated how to locate a high degree of similarity between a profile and a target, one of skill in the art will recognize that the present invention could also be used to determine the least similarity between a profile and a target.

Temporal aspects of the present invention have not been largely discussion, however one of skill in the art will appreciate that computationally profiles are more time consuming than generation of transition probabilities. Thus, off-line or pre-generated profiles which are then compared against substantially real-time generated transition probabilities may be efficient use of compute power providing the user with a more rapid response than real-time generation of both profiles and transition probabilities.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus a method and apparatus for fundamental operations on token sequences: computing similarity, extracting term values, and searching efficiently have been described.

What is claimed is:

1. An apparatus for deriving a similarity measure comprising:
   means for inputting an eigenspace analysis of a reference;
   means for inputting a transition probability model of a target;
   means for operating on said eigenspace analysis and said transition probability model; and
   means for displaying said similarity measure to a user.

2. A machine-readable medium having stored thereon information representing the apparatus of claim 1.

3. A hardware based apparatus comprising:
   a first block having an input and an output, said first block input capable of receiving a vector space;
   a second block having an input and an output, said second block input capable of receiving a probability space; and
   a third block having a first input, a second input, and an output, said third block first input coupled to receive said first block output, said third block second input coupled to receive said second block output, and said third block output capable of communication a similarity space; and
   a display capable of presenting to a user said similarity space.

4. A machine-readable medium having stored thereon information representing the apparatus of claim 3.

5. A computer implemented method comprising:
   generating a similarity metric based upon an eigenspace analysis and an n-gram model, said similarity metric capable of being stored in hardware on said computer and capable of being displayed to a user.

6. A computer implemented method comprising:
   receiving a profile;
   receiving a matrix; and
   generating a similarity indication between said profile and said matrix, said similarity indication capable of being stored in hardware on said computer and capable of being displayed to a user.

7. The method of claim 6 wherein said profile is an eigenspace.

8. The method of claim 6 wherein said matrix is a transition probability matrix.

9. The method of claim 6 wherein said profile is derived from tokens.

10. The method of claim 6 wherein said matrix is derived from tokens.

11. The method of claim 6 wherein said profile is derived from an n-gram analysis of text.

12. A computer implemented method for generating a similarity space, the method comprising:
    combining a vector space with a transition probability space, said similarity space capable of being stored in hardware on said computer and capable of being displayed to a user.

13. A computer implemented method comprising performing a mathematical operation using an eigenspace and transition probability matrix to generate a similarity index, said similarity index capable of being stored in hardware on said computer and capable of being displayed to a user.

14. A computer implemented method for generating a similarity score comprising:
    receiving a profile having eigenvalues (w.i);
    receiving a transition matrix (a);
    generating a left eigenvector (u.i) for each said w.i;
    generating a right eigenvector (v.i) for each said w.i;
    generating a complex conjugate of said u.i;
    generating said similarity score according to a formula:
    similarity score=sum(i, $\|u.i.conjugate*a*v.i\|^2$),
    where each term of said summation is said transition matrix premultiplied by said complex conjugate of i-th said left eigenvector, and postmultiplied by i-th said right eigenvector and wherein norm squared $\|.\|^2$ is a square of magnitude of a complex number resulting from said i-th term in said sum;
    storing said similarity score in hardware on said computer; and
    presenting to a user said similarity score.

15. The method of claim 14 wherein said profile has parameters selected from the group consisting of tuples, tokens, eigenvalues, left eigenvectors, and right eigenvectors.

16. The method of claim 14 wherein said transition matrix is a probability transition matrix.

17. The method of claim 14 wherein said profile represents a reference text and said transition matrix represents a target text, and a lower similarity score indicates that said target text has little or nothing in common with said reference text versus a higher similarity score indicating that there are common tuple-token combinations that appear in said target text that also appear in said reference text.

18. An apparatus for generating a similarity measure comprising:
    means for performing a computation on a target input and a profile; and
    means for presenting to a user said similarity measure.

19. The apparatus in claim 18 wherein said computation is substantially linear in order of magnitude with respect to a plurality of target inputs against said profile.

20. The apparatus of claim 18 wherein said target input comprises a transition probability matrix of said target input tokenized.

21. The apparatus of claim 18 wherein said profile comprises an Eigenspace.

22. A means for computing a similarity measure wherein said computing means is substantially $O(\log(n))$ for n target inputs against a pre-computed profile, and means for presenting to a user said similarity measure.

23. The means of claim 22 wherein said pre-computed profile is an eigenspace and said one or more target inputs are one or more transition probability matrices.

24. The means of claim 23 wherein said one or more transition probability matrices are derived from one or more sets of shuffled tokens from one or more target inputs.

25. A computer implemented method comprising:
    tokenizing a target input;
    generating a transition probability matrix for said tokens;
    operating on a profile and said transition probability matrix; and
    generating a measure of similarity between said profile and said matrix, said measure of similarity capable of being stored in hardware on said computer and capable of being displayed to a user.

26. The method of claim 25 wherein said profile comprises:
    tokenizing a reference input;
    generating a transition probability matrix for said reference tokens; and
    generating an eigenspace for said transition probability matrix for said reference tokens.

27. The method of claim 25 wherein said target input is selected from the group consisting of letters, groups of letters, words, phrases, sentences, paragraphs, sections, spaces, punctuation, one or more documents, XML, textual input, HTML, SGML, and sets of text.

28. The method of claim 26 wherein said reference input is selected from the group consisting of letters, groups of letters, words, phrases, sentences, paragraphs, sections, spaces, punctuation, one or more documents, XML, textual input, HTML, SGML, and sets of text.

29. A computer implemented method for modeling comprising:
using a history window of h tokens to compose a tuple; and
tallying all words that fall within r tokens of said tuple wherein r is between r=1 (which is a Markov n-gram model), and r substantially approaching infinity (which is a word frequency model), said tallying all words capable of being stored in hardware on said computer and capable of being displayed to a user.

30. The method of claim 29 wherein said r is a step function token transition window of width r.

31. The method of claim 29 wherein said r is a non-step function.

32. The method of claim 31 where said non-step function gives greater weight to nearby tokens and lesser weight to farther away tokens.

33. The method of claim 29 wherein said r is a transition weight function s(i), where 0<=s(i)<=1, for i=1, . . . ,r, and normalized so that sum(i=1, . . . ,r; s(i))=1.

34. A computer implemented method for generating a similarity measure between a reference profile and a target input by performing an operation on an eigenvalue space representation of said reference profile and a transition probability model of said target input, said similarity measure capable of being stored in hardware on said computer and capable of being displayed to a user.

35. The method of claim 34 wherein said transition probability model represents a tokenized representation of said target input.

36. The method of claim 35 wherein said tokenized representation is further generated by shuffling of tokens representing said target input.

37. The method of claim 36 wherein a plurality of similarity measures is generated based on said reference profile and one or more said shuffled tokenized representations as said transition probability model.

38. A computer implemented method for determining a high similarity measure, the method comprising:
(a) pre-generating a fixed set of eigenspace profiles representing known references;
(b) generating a series of tokens representing clauses from a target input;
(c) dividing said series of tokens into two groups, group A and group B;
(d) generating a transition probability model for group A and group B;
(e) generating a similarity measure for group A versus said profiles, and for group B versus said profiles;
(f) retaining group A if it has a similarity measure equal to or higher than group B from (e), otherwise retaining group B;
(g) defining the retained group as said series of tokens and repeat (c) to (g) for a predetermined number of times;
storing said high similarity measure in hardware on said computer; and
presenting to a user said high similarity measure.

39. The method of claim 38 wherein said (c) dividing said series of tokens into two groups, group A and group B results in group A and group B being substantially the same size.

40. The method of claim 38 wherein said predetermined number of times is based upon a factor selected from the group consisting of a relationship to the number of said tokens representing clauses from said target input, and a predetermined minimum similarity measure.

41. The method of claim 38 wherein said dividing further comprises shuffling said tokens.

42. The method of claim 38 wherein said known references comprises N text blocks.

43. A computer implemented method comprising:
receiving N text blocks;
building a binary tree representing indexes of said N text blocks;
receiving a T text block;
computing a transition probability matrix for said T text block;
traversing said binary tree; and
finding a closest matching N text block for said T text block, said closest matching N text block capable of being stored in hardware on said computer and capable of being displayed to a user.

44. The method of claim 43 wherein said building further comprises:
concatenating said N text blocks;
computing a profile of said concatenated N text blocks; and
computing partitioning eigenvectors of said N text blocks.

45. A computer implemented method comprising:
receiving a T text block;
computing a profile for said T text block;
receiving N text blocks;
(a) shuffling randomly said N text blocks;
(b) dividing said shuffled randomly N text blocks into set A and set B;
(c) concatenating the text clocks in set A to form group A;
(d) concatenating the text clocks in set B to form group B;
(e) computing a transition probability matrix for said group A and for said group B;
(f) generating a similarity measure between said T text block and said group A and said group B;
(g) determining if group A or group B has a higher similarity measure;
(h) tallying an additional count for text blocks that are members of group A or group B having said determined higher similarity measure;
(i) repeating (a) through (h) R times;
(j) picking group A or group B with a highest count as a remaining group;
(k) using the remaining group now as said N text blocks;
(l) repeating (a) through (k) K times;
storing said similarity measure in hardware on said computer; and
presenting to a user said similarity measure.

46. The method of claim 45 wherein group A and group B are substantially a same size.

47. The method of claim 45 wherein R is less than 1025.

48. The method of claim 45 wherein R is determined dynamically.

49. The method of claim 45 wherein K is determined from the group consisting of dynamically, and a fixed count.

50. A method for determining a high similarity measure, the method comprising:
pre-generating one or more eigenspace profiles representing clauses from a known reference;
generating a series of tokens representing clauses from a target input;
(a) setting a counter n=0;
(b) setting counter n=n+1;
(c) dividing said series of tokens into two groups, group A(n) and group B(n);

(d) generating a transition probability model for group A(n) and group B(n);
(e) generating a similarity measure for group A(n) versus said profiles, and for group B(n) versus said profiles;
(f) awarding group A(n) a point if it has a similarity measure equal to or higher than group B(n) from (e), otherwise awarding group B(n) a point;
(g) shuffling said series of tokens representing clauses from said target input in substantially random order and repeat (b) to (g) for a predetermined number of times;
(h) picking those groups having a point and retaining tokens associated with said picked groups and defining said retained tokens as said series of tokens;
(i) repeating (c) to (h) until said high similarity measure is determined;

storing said high similarity measure in hardware on said computer; and presenting to a user said high similarity measure.

51. The method of claim 50 wherein said (c) dividing said series of tokens into two groups, group A and group B results in group A and group B being substantially the same size.

52. The method of claim 50 wherein said predetermined number of times is based upon a factor selected from the group consisting of a relationship to the number of said tokens representing clauses from said target input, and a predetermined minimum similarity measure.

53. The method of claim 50 wherein said method of claim 50 computation is substantially $M*\log(N)$, where N represents said clauses from said known reference, and where M represents said clauses from said target input.

* * * * *